(12) United States Patent
Bozeman

(10) Patent No.: US 8,768,840 B2
(45) Date of Patent: Jul. 1, 2014

(54) UNIVERSAL POSITIVE PAY MATCH, AUTHENTICATION, AUTHORIZATION, SETTLEMENT AND CLEARING SYSTEM

(76) Inventor: William O. Bozeman, St. Petersburg, FL (US)

(*) Notice: Subject to any disclaimer, the term of this patent is extended or adjusted under 35 U.S.C. 154(b) by 0 days.

(21) Appl. No.: 13/507,387

(22) Filed: Jun. 25, 2012

(65) Prior Publication Data
US 2013/0117183 A1 May 9, 2013

Related U.S. Application Data

(60) Continuation of application No. 12/893,837, filed on Sep. 29, 2010, now abandoned, which is a division of application No. 10/871,006, filed on Jun. 21, 2004, now abandoned, which is a continuation-in-part of application No. 09/983,065, filed on Oct. 23, 2001, now Pat. No. 6,754,640.

(60) Provisional application No. 60/243,722, filed on Oct. 30, 2000.

(51) Int. Cl.
*G06Q 40/00* (2012.01)
*G06Q 20/04* (2012.01)

(52) U.S. Cl.
USPC ............ 705/44; 705/39; 705/40; 705/45; 705/64; 705/65; 705/66; 705/37; 235/379; 382/137; 382/138

(58) Field of Classification Search
USPC ........ 705/39–40, 64–66, 44–45, 37; 235/379; 382/138, 137
See application file for complete search history.

(56) References Cited

U.S. PATENT DOCUMENTS

| | | | | |
|---|---|---|---|---|
| 4,727,243 A * | 2/1988 | Savar | ............... | 705/17 |
| 4,823,264 A * | 4/1989 | Deming | ............... | 705/39 |
| 5,093,787 A * | 3/1992 | Simmons | ............... | 705/33 |
| 5,193,121 A * | 3/1993 | Elischer et al. | ............... | 382/138 |
| 5,691,524 A * | 11/1997 | Josephson | ............... | 705/40 |
| 6,363,363 B1 * | 3/2002 | Haller et al. | ............... | 705/40 |
| 6,464,134 B1 * | 10/2002 | Page | ............... | 235/379 |
| 6,611,881 B1 * | 8/2003 | Gottfurcht et al. | ............... | 710/18 |
| 7,047,222 B1 * | 5/2006 | Bush | ............... | 705/64 |

* cited by examiner

*Primary Examiner* — Harish T Dass
(74) *Attorney, Agent, or Firm* — John W. Goldschmidt, Jr.; Ference & Associates LLC

(57) ABSTRACT

A Universal Positive Pay Database (UPPD) method, system and/or computer useable medium to reduce financial transaction fraud. A UPPD database is configured to store thereon transaction records associated with financial transactions corresponding to customers of the UPPD database. A particular financial transaction is initiated between a payer and a payee by providing parameters associated with the financial transaction to the UPPD database. An issue File is provided to the UPPD database that includes parameters associated with the particular financial transaction. A correspondence determination is made between the financial transaction parameters from the Issue File and the financial transaction parameters provided to the UPPD database at every point along the financial transaction clearing process. The customer, payer, payee, payee bank, drawee bank, and banking institutions intermediate the payee bank and the drawee bank are able to access the correspondence determination at every point along the financial transaction clearing process.

20 Claims, 73 Drawing Sheets

WHY DOES CHECK FRAUD WORK TODAY

FRAUD NOT GENERALLY PERPETUATED AT THE CUSTOMER'S BANK

NO CONNECTIVITY TO VERIFY AUTHENTICITY OF CHECK FRAUD

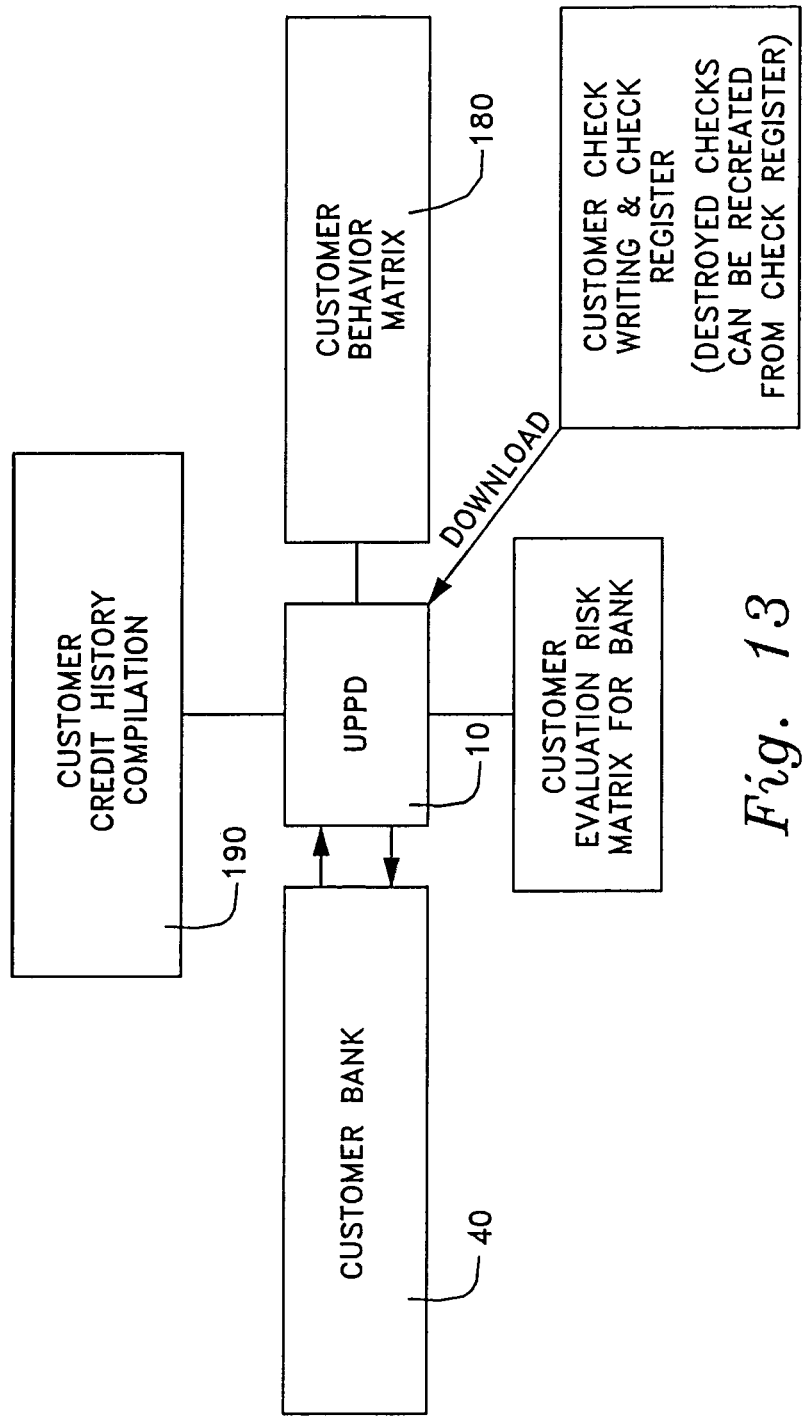

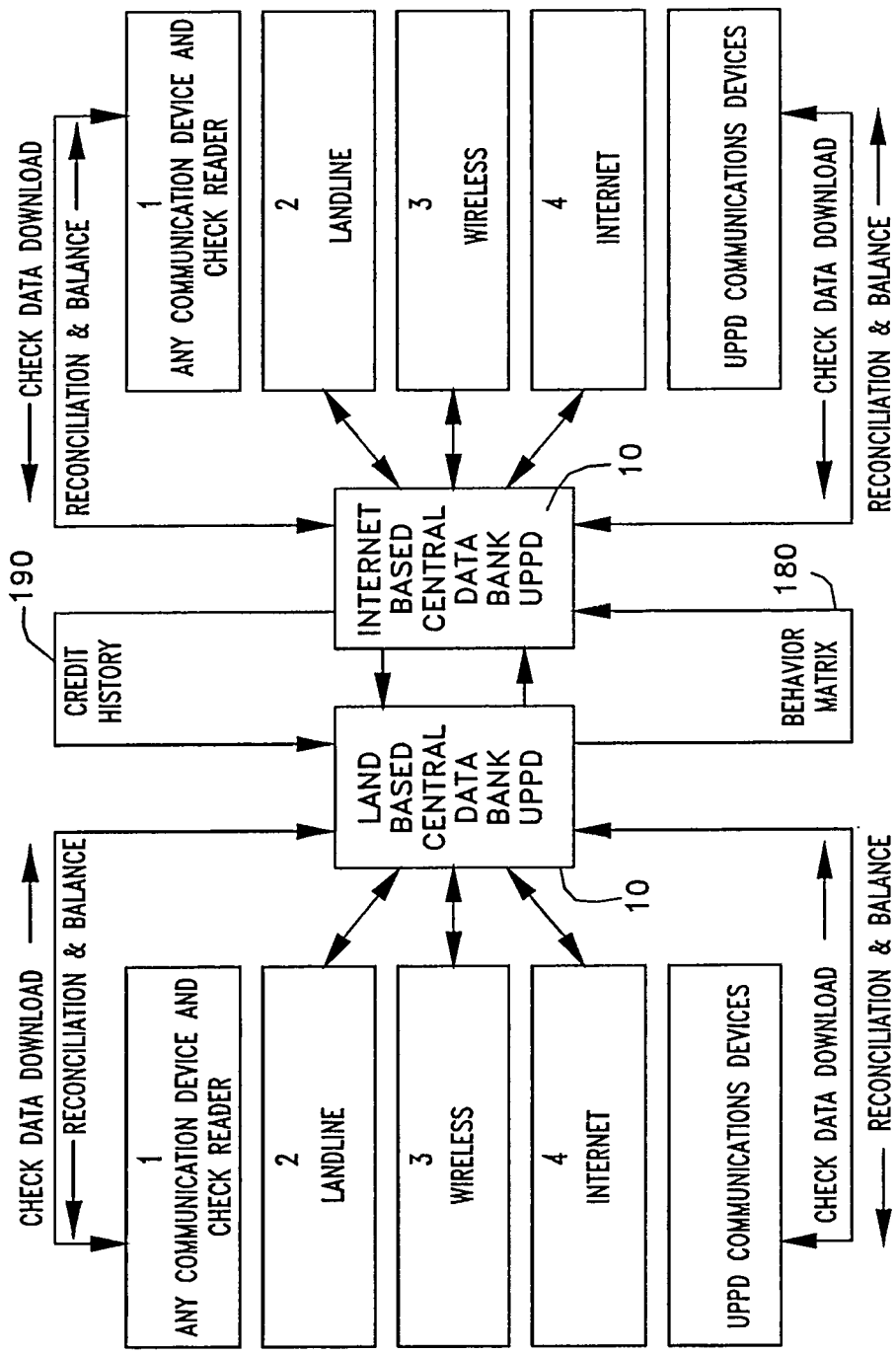

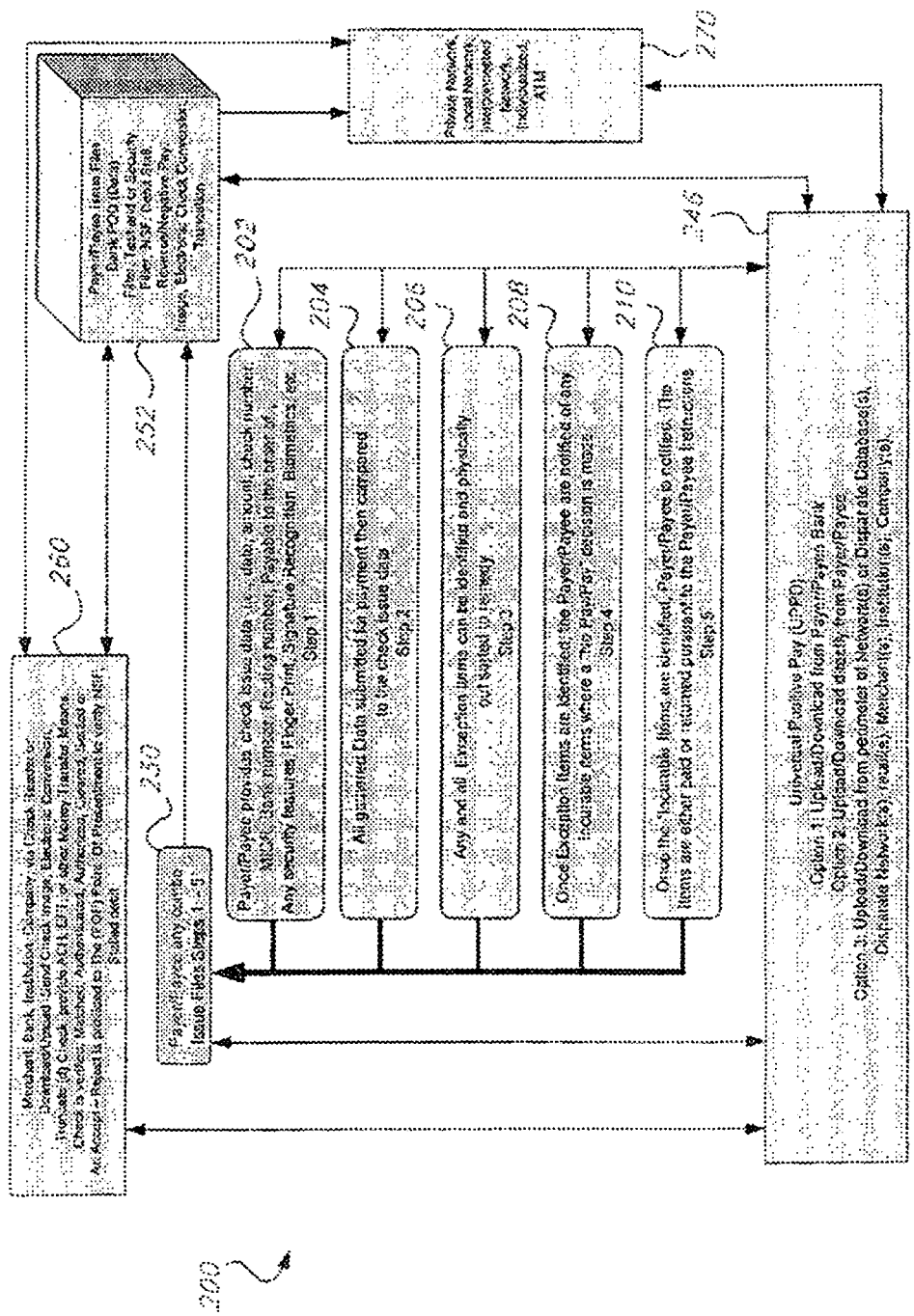

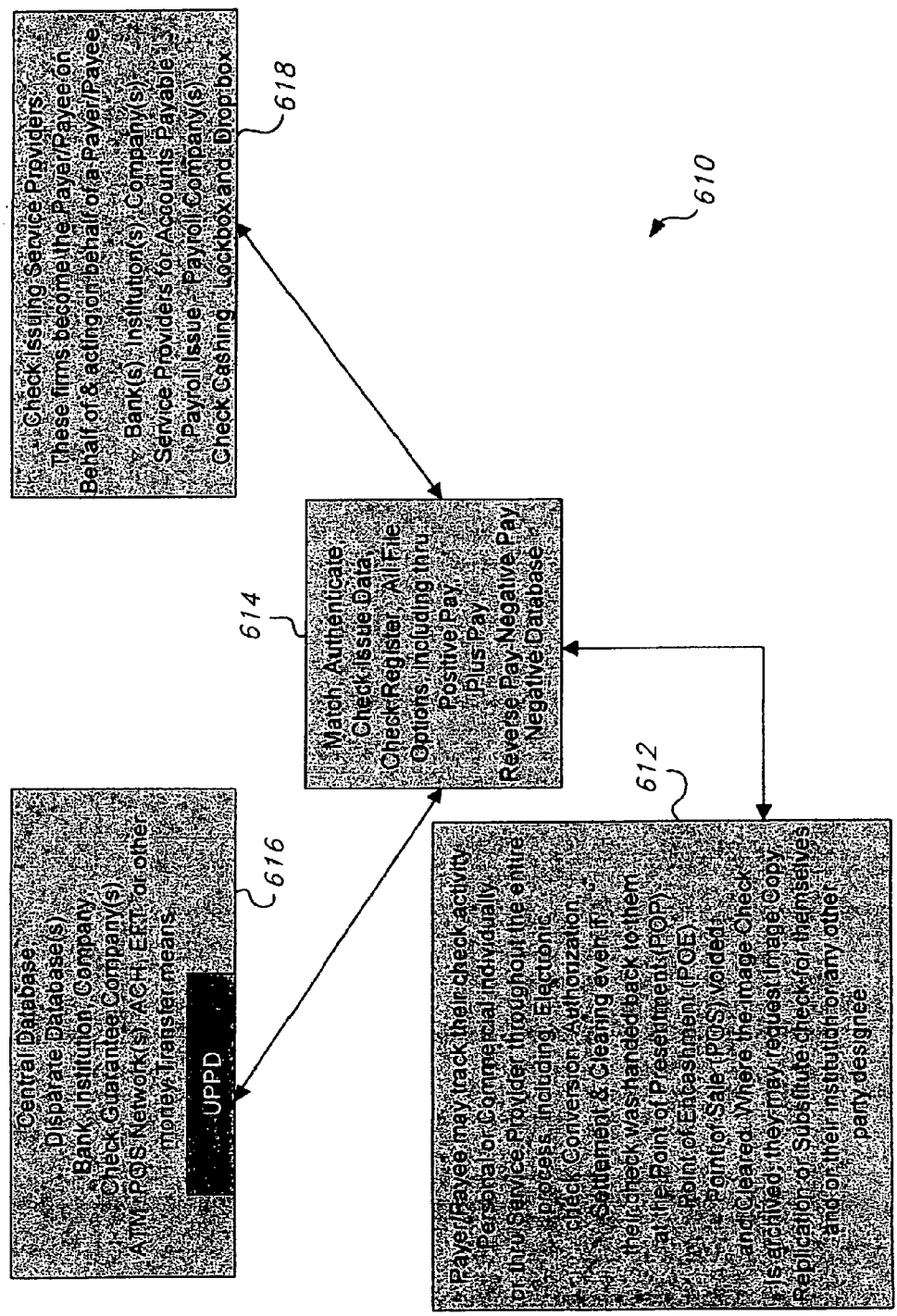

UNIVERSAL POSITIVE PAY MATCH, AUTHENTICATION, AUTHORIZATION, SETTLEMENT AND CLEARING SYSTEM

CROSS-REFERENCE TO RELATED APPLICATIONS

This application is a continuation of U.S. patent application Ser. No. 12/893,837 filed Sep. 29, 2010, now abandoned, which is a divisional of U.S. patent application Ser. No. 10/871,006 filed Jun. 21, 2004, now abandoned, which is a continuation in part of patent application Ser. No. 09/983,065, filed Oct. 23, 2001 and issued as U.S. Pat. No. 6,754,640, which claims the benefit of U.S. Provisional Patent Application Ser. No. 60/243,722, filed Oct. 30, 2000, each of which is incorporated herein by reference in its entirety.

BACKGROUND OF THE INVENTION

1. Field of the Invention

The present invention relates to a Universal Positive Pay Database method, system, and/or computer useable medium to reduce check fraud and verify checks, other financial instruments and documents.

2. Description of the Prior Art

Paper checks have been ingrained into our society for over one hundred years. Many young people take their first steps into financial adulthood with the opening of their first checking account. Consumers continue to write an average of 25 checks per month. Paper checks give consumers the ability to make purchases and live day to day without carrying around cash. It gives them the freedom to make purchases before deposits are recorded at their bank and earn interest before withdrawals. Unfortunately, all this freedom comes with a price—Check Fraud. With the increase in home computer technology and high quality laser printers, paper checks can be easily created, even to the point of fooling so called experts in the field. Law enforcement agencies have reported that check fraud is the most under-reported white color crime. Estimates range as high as 50 billion annually. Out of the 180 million checks written daily, 1.2 million are fraudulent. That is less than 1%, but enough to amount to a viral and very expensive problem. Federal law enforcement agencies have seen check fraud go from the individual acting alone to gangs acting in concert, stealing millions.

Besides all the fraud possibilities, paper checks are costly for everyone—financial institutions, retailers and ultimately consumers. As the use of paper checks continues to grow at 2-3% annually the problem will not go away, it will only increase. We need a solution encompassing all contact points in the processing of a paper check, a debit card, and a paper debit check, a complete and connective solution that does not just transfer the responsibility of check fraud, but stops the fraud.

Many techniques have been developed to inhibit check fraud, such as Positive Pay, different forms of electronic check verification and electronic check presentment with and without Automated Clearing House (ACH), but none eliminate fraud from the use of paper checks. All of these electronic methods have taken a positive step in the handling of paper checks. Each has made the process more efficient and less costly by not having to handle paper checks. One area where they all fall short is in the elimination of check fraud. Check electronification places the burden of check fraud on the other parties in the process. This may be good for an individual in the process, but not everyone. If a worthless check is processed or an account is closed pre-maturely, someone in the process is responsible.

Positive Pay is a technique where each corporate customer sends an electronic list of their outstanding checks to their financial institution. The corporate customer's financial institution then uses an Issue File to validate each check as it clears the financial institution. The issue File includes parameters associated with the outstanding checks of each corporate customer, such as check amounts, account numbers, routing numbers, check dates, signatures, etc. If a check does not validate correctly—the financial institution requests proper authorization from the corporation on how to handle the check. There are two main problems that exist here: (1) Positive Pay only works with the financial institutions corporate customers. No other entity in the process has knowledge of the Positive Pay matching capabilities. Under this scenario the person presenting the worthless check will receive the money and the merchant or his financial institution is left trying to recover the loss. (2) There are no standards for Positive Pay. Each financial institution implements its own Positive Pay rules and file formats. In essence, each financial institution is creating an island for itself and its corporate customers.

Check electronification means a number of different things, from verifying the check writers' history against a database to transmitting the account and transaction information electronically to a clearinghouse for settlement. The transmission can be as simple as the magnetic ink character recognition (MICR) line of the check to a full image of the check.

Check electronification processes try to verify that funds will be available when the check clears the bank account. The problem is that there is no check electronification process where the whole check processing system has knowledge of the other financial institutions' position. Prior to clearing the check the account could be closed, or funds withdrawn making the check have non-sufficient funds (NSF). The paper check is eliminated in the process, which will save financial institution time and money, however check fraud continues. The verification database is only as good as the information available. A warranty system is sometimes put in place to guarantee the merchant receives his money, hut again someone in the check process will be responsible for the worthless check. The cost of check fraud continues to be passed along the clearing chain, ultimately to the consumer.

Therefore, a need exists for a Universal Positive Pay Database (UPPD) method, system, and/or computer useable medium that can be universally applied in order to result in a more secure authorization system. The related art is represented by the following references of interest.

U.S. Pat. No. 4,109,238 issued Aug. 22, 1978 to Robert V. Creekmore, outlines the use of a check verification system for providing customer operated verification of checks at point of sale locations. The system enables a customer to verify several possible kinds of checking functions, including verification of payroll or government checks as well as certain types of personal checks for cash. The system utilizes a number of local point of use terminals which are operated by the customer and which communicate with a remotely located transaction processor, including a positive file of customers who are entitled to verify checks. The Creekmore patent does not suggest a UPPD method, system, and/or computer useable medium according to the claimed invention.

U.S. Pat. No. 5,237,620, issued Aug. 17, 1993 to David W. Deaton et al., describes a check reader and method for reading a check MICR code having a plurality of fields including a checking account number. A reader head detects a MICR code on a check and generates electrical signals representative of the MICR code. Circuitry omits portions of the MICR code except a predetermined portion thereof, such that the predetermined portion of the MICR code can be detected regardless of its location within the MICR code fields. The Deaton et al. patent does not suggest a UPPD method, system, and/or computer useable medium according to the claimed invention.

U.S. Pat. No. 5,586,222, issued Dec. 17, 1996 to Wei Zhang et al., describes a process for associating and storing an input pattern or two-dimensional pattern with use of associative matrices having the same size as that of an input pattern without converting it into a one-dimensional pattern, wherein the associative matrices are generated from the input pattern so as to maximize the Hamming distance between state invariants which correspond to each different storage pattern, and thereby a power of categorization that corresponds to each storage pattern can be enhanced, thus increasing the storage capability and robustness. The Zhang et al. patent does not suggest a UPPD method, system, and/or computer useable medium according to the claimed invention.

U.S. Pat. No. 5,677,955 issued Oct. 14, 1997 to John Doggett et al. outlines the use of an electronic instrument created in a computer-based method for effecting a transfer of funds from an account of a payer in a funds-holding institution to a payee. The electronic instrument includes an electronic signature of the payer, digital representations of payment instructions, the identity of the payer, the identity of the payee and the identity of the funds-holding institution. A digital representation of a verifiable certificate by the institution of the authenticity of the instrument of the instrument is appended to the instrument.

The Doggett et al. method and apparatus are associated essentially with a bank specific Positive Pay system, as opposed to the Universal Positive Pay Database system according to the claimed invention, wherein all parties are able to verify check register information of a customer, e.g., a payer, at every point along the path of a check clearing process, e.g., at the point of sale, at the payee's bank, at a Federal Reserve Clearing Division or a clearing house, and at the payer's bank. Bank specific Positive Pay systems restrict access by a customer to check register information for the customer. The Doggett et al. patent does not suggest a UPPD method, system, and/or computer useable medium according to the claimed invention.

U.S. Pat. No. 5,801,366 issued Sep. 1, 1998 to Wade L. Funk et al., outlines the use of an automated check processing system which includes an input device receiving checking account information and a check amount of a check provided for payment in a transaction. A transaction database coupled to the input device then electronically receives and stores the checking account information and check amount, which are then downloaded to a power encoder. The power encoder receives checking account information and check amounts for transactions occurring over a predetermined transaction period and then matches the checks with the electronic checking account information and check amounts.

The Funk et al. system is similar to the system described by Doggett et al., in that Funk et al. describes a bank specific Positive Pay system, as opposed to a Universal Positive Pay Database system according to the claimed invention, wherein all parties are able to verify check register information of a customer at every point along the path of a check clearing process. The Funk et al. patent does not suggest a UPPD method, system, and/or computer useable medium according to the claimed invention.

U.S. Pat. No. 6,036,344 issued Mar. 14, 2000 to David M. Goldenberg outlines the use of an apparatus and method for countering fraudulent check cashing schemes that includes a central processing center that is connected to a plurality of banks through secure communication channels. Each check drawn against the banks has information stored therein, with that information corresponding to a plurality of digits and characters for the central processing center. When a check is presented at a bank, the information on the check is sent through one of the secure communication channels to the central processing system, which determines whether or not the account has sufficient funds to allow the check to be drawn against the account. The Goldenberg patent does not suggest a UPPD method, system, and/or computer useable medium according to the claimed invention.

U.S. Pat. No. 6,213,391 B1, issued Apr. 10, 2001 to William H. Lewis, describes a system for identifying an individual by either generating an identification profile based on a distinctive biometric characteristic possessed by that person (e.g. voice analysis, finger print, facial scan. Deoxyribo-Nucleic Acid (DNA), etc.), or by verifying some digital "signature" representation assigned to that person. The biometric information or digital signature may then be used in a variety of functions to enhance both the security and convenience of conducting electronic transactions. The system may provide an algorithm for creating a personal identification number (PIN) for use as a preliminary or secondary identification steps, and/or an algorithm for generating unique tone codes for use in personal identification via telephone or modem. Further, security of online transactions may be greatly improved by placing access key information in a medium outside the computer host or client. The system further provides a device that facilitates a user's ability to change codes or methods of generating codes instantly, without having to contact their bank, credit card company, etc. The Lewis patent does not suggest a UPPD method, system, and/or computer useable medium according to the claimed invention.

World Intellectual Property Organization (WIPO) Patent Application Publication No. WO 97/055383, published Feb. 13, 1997, describes a method for checking and processing bank checks, wherein a secret code is computed, in the form of a CMC7 code thereof, and from an account number read off a check submitted for payment, by a dedicated chip in a check processing device held by a payee, then compared with a secret code input into the device by the check issuer to determine whether he or she is the rightful account holder. The WIPO '267 application does not suggest a UPPD method, system, and/or computer useable medium according to the claimed invention.

WIPO Patent Application Publication No. WO 97/36267, published Oct. 2, 1997, outlines the use of an automated positive check authorization system that includes an input device for receiving a check amount and checking account information pre-printed on a check drawing on a checking account presented in a transaction at the time of check presentment. The checking account information and check amount are electronically transmitted to a check verifier, which receives the check amount and checking account information from the input device and searches a checking account database for a current balance in the checking account. The WIPO '267 application does not suggest a UPPD method, system, and/or computer useable medium according to the claimed invention.

THE STATE OF UTAH UNIFORM ACCOUNTING MANUAL, revised on Apr. 1, 1997, describes how unclaimed tangible or "custodial property" is to be handled in Utah. THE STATE OF UTAH UNIFORM ACCOUNTING MANUAL does not suggest a UPPD method, system, and/or computer useable medium according to the claimed invention U.S. Public Law 108-100, 117 STAT. 1177, entitled the "Check 21 Act" (CHECK 21) was signed into law in the U.S. on Oct. 28, 2003, becomes effective on Oct. 28, 2004 (see U.S. Public Law 108-100, 117 STAT. 1177), and is incorporated herein by reference. CHECK 21 fosters innovation in the payments system and enhances its efficiency by reducing some of the legal impediments to check truncation. The law facilitates check truncation by a negotiable instrument called a "substitute check", which permits banks to truncate original checks, to process check information electronically, and to deliver substitute checks to banks that want to continue receiving paper checks. A "substitute check" is the legal equivalent of the original check and includes all the information contained on the original check. The CHECK 21 law does not require banks to accept checks in electronic form nor does it require banks to use the new authority granted by the act to create substitute checks. The CHECK 21 law does not suggest a UPPD method, system, and/or computer useable medium according to the claimed invention.

None of the above inventions and patents, taken either singly or in combination, is seen to describe the instant invention as claimed.

SUMMARY OF THE INVENTION

The present invention is a Universal Positive Pay Database (UPPD) method, system, and/or computer useable medium to reduce financial transaction fraud. A UPPD database is configured to store thereon transaction records associated with financial transactions associated with customers of the UPPD database. Each transaction record is configured to include parameters associated with a particular financial transaction. A particular financial transaction is initiated between a payer and a payee by providing parameters associated with the particular financial transaction to the UPPD database.

An Issue File is also provided to the UPPD database. The Issue File includes parameters associated with the particular financial transaction, and the particular financial transaction is associated with a drawee bank. A correspondence determination is made between the parameters associated with the particular financial transaction from the Issue File and the parameters associated with the particular financial transaction provided to the UPPD database to initiate the particular financial transaction at every point along a financial transaction clearing process. The customer, payer, payee, payee bank, drawee bank, and banking institutions intermediate the payee bank and the drawee bank are able to access the correspondence determination at every point along a financial transaction clearing process.

Accordingly, it is a principal aspect of the invention to provide a UPPD method, system, and/or computer useable medium that reduces financial transaction fraud and maintains financial transaction payment control.

It is another aspect of the invention to provide a UPPD method, system, and/or computer useable medium that can interchangeably be used by customers, financial institutions, commercial retail entities, the Federal Reserve, check verification services, insurance companies, pharmaceutical companies, and other entities.

It is a further aspect of the invention to provide a UPPD method, system, and/or computer useable medium that also provides a positive or negative financial transaction history rating on customer.

Still another aspect of the invention to provide a UPPD method, system, and/or computer useable medium configured to receive input data from a wide variety of technology.

Yet another aspect of the invention provide a UPPD method, system, and/or computer useable medium to perform a point of sale, point of presentment, and point of encashment financial transaction authorization.

It is another aspect of the invention to provide a UPPD method, system, and/or computer useable medium configured for use with any transaction instrument.

It is a further aspect of the invention to provide a UPPD method, system, and/or computer useable medium configured for a paper check conversion to an electronic check or an electronic check conversion to a paper check on an MICR laser printer utilizing the associated transaction record for the UPPD system.

Still another aspect of the invention to provide a UPPD method, system, and/or computer useable medium configured for use with security detectable inks, tamper-proof foils and threads, as well as holograms applied to a financial instrument to provide additional security against fraud.

Yet another aspect of the invention to provide a UPPD method, system, and/or computer useable medium configured for use with cell wallets, palm wallets, e-wallets, cam wallets, and other wireless devices.

It is a further aspect of the invention to provide a UPPD method, system, and/or computer useable medium configured for use with plastic card financial instruments such as credit cards, debit cards, stored value cards, payroll cards, cash cards, smartcards, etc.

It is another aspect of the invention to provide a UPPD method, system, and/or computer useable medium to provide a, service for bill presentment, bill payment, accounts payable, and payroll.

Still another aspect of the invention to provide as UPPD method, system, and/or computer useable medium configured to utilize a transaction instrument with a micro computer chip embedded within the surface of the transaction instrument, to contain digitized signatures, security, and Global Positioning System (GPS) data and transaction record(s).

Yet another aspect of the invention to provide a UPPD method, system, and/or computer useable medium to reduce the amount of paper and plastic involved when conducting banking transactions.

It is a further aspect of the invention to provide a UPPD method, system, and/or computer useable medium to implement a positive match of data exchange for insurance policies, medical information, and pharmaceutical information.

It is another aspect of the invention to provide UPPD method, system, and/or computer useable medium configured to enable a financial institution merchant and all parties to debit stall or stall debit on any and all debit card and check debit financial transactions.

It is an aspect of the invention to provide improved elements and arrangements thereof in a UPPD method, system, and/or computer useable medium for the purposes described which is inexpensive, dependable and fully effective in accomplishing its intended purposes.

These and other aspects of the present invention will become readily apparent upon further review of the following specification and drawings.

BRIEF DESCRIPTION OF DRAWINGS

FIG. 13 is a diagram indicating how a credit history compilation is used by a UPPD system.

FIG. 14 is an overview of a diagram showing different communications methods used by a UPPD system according to the 5 present invention.

FIGS. 15C, 15D, 15E, 15F, 15G, 15H, 15I, 15J, and 15K, are flow charts of UPPD processes according to the present invention.

FIG. 20 is a functional diagram of a UPPD process according to the present invention.

Similar reference characters denote corresponding features consistently throughout the attached drawings.

DESCRIPTION OF THE PREFERRED EMBODIMENTS

Figure 1:
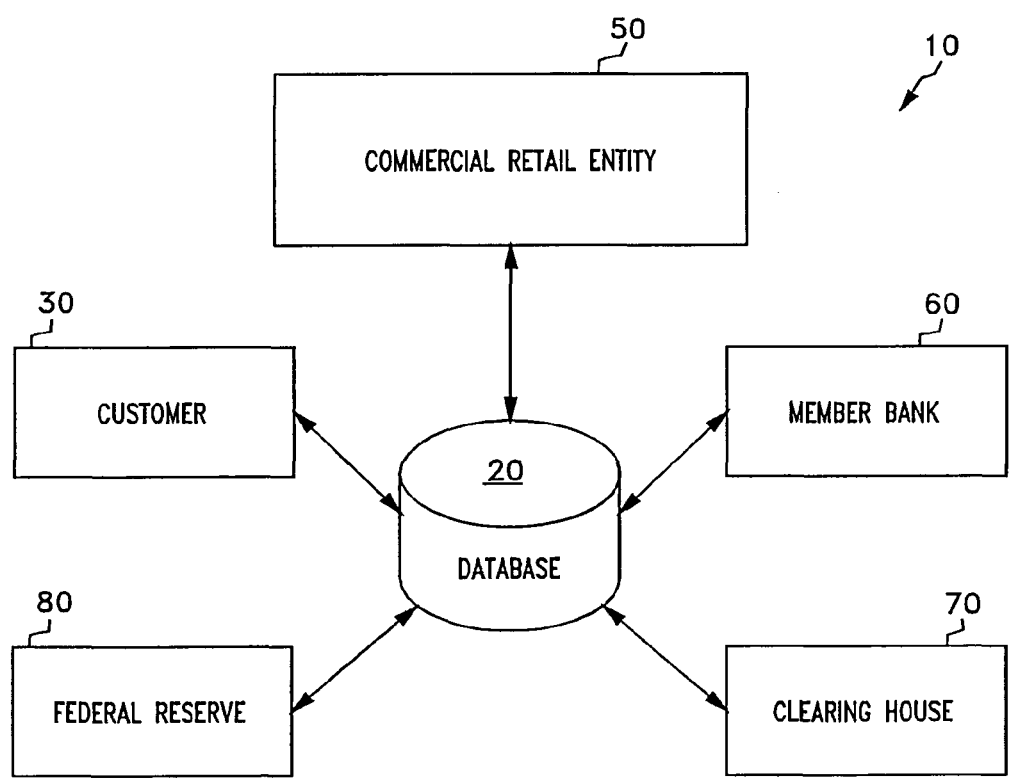
FIG. 1 a network diagram example of a UPPD system according to the present invention.

This present invention is a UPPD method, system, and/or computer useable medium. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Referring to the drawings, a UPPD system 10 for maintaining financial transaction control and preventing financial transaction fraud with connectivity between users is shown in FIG. 1. The UPPD system 10 includes a UPPD database 20 and provides match, authentication, authorization, settlement, and clearing processes for financial transactions initiated by customers of the UPPD database 20. UPPD customers, as used herein, are individuals, companies, businesses, organizations, government agencies, etc., who have access to the UPPD database 20.

The UPPD system 10 provides connectivity of information communication and verification by matching an issued item and/or files to parameters associated with a particular financial transaction, as presented at point of presentment (POP), point of encashment (POE), point of sale (POS), etc, the ability to ascertain whether a financial transaction is authentic, or whether it appears to be authentic. Any indication that a financial transaction has been altered, account closed, or insufficient funds exist, the financial transaction can be blocked immediately or a debit stalled preventing banks, banks customers, merchants, etc., from being held liable for worthless transaction instruments (e.g., checks, debit check (s), debit card transaction(s), debit/credit ticket(s)/slip(s), sales ticket(s)/receipt(s), etc.).

The UPPD system 10 is configured to enable multiple banks, consumers, and merchants a truly universal protection and security system. The UPPD system 10 provides the most cost effective way to virtually eliminate fraud, provide unprecedented security, and drastically reduce the cost of clearing financial transactions including paper and electronic official items, e.g., checks, debit cards, debit checks, money orders, gift certificates, cards and other official documents. The UPPD system 10 provides connectivity from banks to banks and merchants to banks instantly. The UPPD system 10 provides a source for connectivity, centralized and/or personalized data retrieval, match authentication, confirmation of sufficient funds, protection from identity theft, and other applications.

While the UPPD database 20 is illustrated as a single database, the UPPD database 20 may be configured as a plurality of separate or disparate databases interconnected through a network system via any number of switches, such as a local area network (LAN), a wide area network (WAN), an intranet, an extranet, the Internet, etc.

The UPPD system 10 includes a computer useable medium and a computer device with a processor. As used herein a "computer useable medium" includes a non-volatile medium (e.g., a magnetic medium, hard disk, a solid state disk, optical storage, Flash memory, electrically eraseable programmable read only memory (EEPROM), parameter random access memory (PRAM), etc.), a volatile medium (e.g., dynamic RAM (DRAM), Direct Rambus® DRAM (DRDRAM), double-data rate DRAM (DDR DRAM), double-data rate synchronous DRAM (DDR SDRAM), enhanced DRAM (EDRAM), enhanced synchronous DRAM (ESDRAM), extended data out (EDO) DRAM, burst EDO (BEDO) DRAM, fast page mode DRAM (FPM DRAM), Rambus DRAM (RDRAM), SyncLink® DRAM (SLDRAM), synchronous RAM (SRAM), synchronous DRAM (SDRAM), synchronous graphic RAM (SGRAM), video RAM (VRAM), window RAM (WRAM), etc.), or an installation medium (e.g., a CD-ROM, a floppy disk, a removable disk, etc.), on which computer programs are stored for loading into the computer device.

The computer device may be any type of computer device with a processor, such as a desktop computer, a laptop computer, a palmtop computer, a network computer, a personal digital assistant (PDA), an embedded device, a smart phone, or any other suitable computer device. For example, the UPPD system 10 may include one or more server computers with a processor, an area of main memory for executing program code wider the direction of the processor, a storage device for storing data and program code and a bus connecting the processor, area of main memory and the storage device. The UPPD database 20 may be stored on the storage device, as well as a data communications device, such as a modem, connected to the bus for wirelessly and/or non-wirelessly connecting the computer to a local area network (LAN), a wide area network (WAN), an intranet, an extranet, the Internet, etc. UPPD software is stored in the computer useable medium and executes under the direction of the processor.

The UPPD software causes the processor to provide and configure the UPPD database 20 to store thereon transaction records associated with financial transactions corresponding to customers of the UPPD database 20. Each transaction record is configured to include alphanumeric data pertaining to parameters associated with a particular financial transaction. Such parameters for one financial transaction include alphanumeric data grouped into fields associated with items that may include a payer name, a payee name, payer and/or payee personal specifics, a transaction instrument, an account number, a PIN, a digital signature, etc. Biometric information may also be provided as parameters, such as DNA, facial structure, iris, retina, finger print, voice, signature, etc. For example, parameters associated with a paper/electronic check may include a check number, an issue date, a payee, a routing number, an account number, etc.

A transaction instrument may be configured to operate with the UPPD system 10. A "transaction instrument", as used herein, means a paper and/or electronic check (paper/electronic check), an image of a paper/electronic check, a debit card, a debit check, a an intranet, an extranet, the Internet, etc. UPPD software is stored in the computer useable medium and executes under the direction of the processor.

The UPPD software causes the processor to provide and configure the UPPD database 20 to store thereon transaction records associated with financial transactions initiated by customers of the UPPD database 20. Each transaction record is configured to include alphanumeric data pertaining to parameters associated with a particular financial transaction. Such parameters for one financial transaction include alphanumeric data grouped into fields associated with items that may include a payer name, a payee name, payer and/or payee personal specifics, a transaction instrument, an account number, a PIN, a digital signature, etc. Biometric information may also be provided as parameters, such as DNA, facial structure, iris, retina, finger print, voice, signature, etc. For example, parameters associated with a paper/electronic check may include a check number, an issue date, a payee, a routing number, an account number, etc.

A transaction instrument may be configured to operate with the UPPD system 10. A "transaction instrument", as used herein, means a paper and/or electronic check (paper/electronic check), an image of a paper/electronic check, a debit card, a debit check, a smartcard, a credit card, a point of sale (POS) terminal, a point of escheat (POE) terminal, a point of presentment (POP) terminal, a bank point of data (POD) terminal, an automated teller machine (ATM), a personal digital assistant (PDA), a telephone, a cellular telephone, a cordless telephone, a pager, a watch, a television, a radio, a compact disc (CD) player, a tape player, a copier, a facsimile machine, or any other electronic device.

Account number parameters for transaction records of financial transactions for the UPPD system 10 may be associated with a checking account number, a savings account number, a credit card account number, a money market account number, as liability account number, a bills/payable account number, an asset account number, an invoice/receivables account number, a cash account number, an insurance policy account number, an account number for a will, an account number for a trust, or a number for any other financial account.

The UPPD system 10 is configured to operably utilize an Issue File substantially the same as Positive Pay files used with bank-specific Positive Pay services previously described, may have limited connectivity and/or may be universally available through connectivity via the UPPD system 10 between any party(s), such as bank(s), institution(s), company(s), third party(s), vendor(s), merchant(s), consumer(s), etc. An Issue File, as used herein, is configured for use with the UPPD system 10 and includes one or more transaction records associated with certain financial transactions, where the financial transactions are associated with a drawee bank. The transaction record(s) in an Issue File each include alphanumeric data pertaining to parameters associated with a certain financial transaction. The Issue File is established at the time the particular financial transaction is initiated between a payer and a payee by a customer of the UPPD database 20 by providing parameters associated with the particular financial transaction to the UPPD database 20.

For a particular financial transaction, a comparison or correspondence determination is made between the parameters associated with the particular financial transaction from the Issue File and the parameters associated with the particular financial transaction provided to the UPPD database 20 when the particular financial transaction was initiated. Such a correspondence determination is made at periodic intervals (e.g., fractions of a second), and at every point along the financial transaction clearing process. The correspondence determination is also available to the customer, payer, payee, payee bank, drawee bank, and banking institutions intermediate the payee bank and the drawee bank at any time, e.g., throughout the financial transaction clearing process.

The customer, payer, payee, payee bank, drawee bank, and banking, institutions intermediate the payee bank and the drawee bank can then determine whether the correspondence determination between the financial parameters from the Issue File and the financial transaction parameters provided to the UPPD database 20 when the particular financial transaction was initiated does not match and/or does not coincide below a minimum threshold, thereby enhancing security by facilitating an accurate determination as to whether the tampering or altering has occurred to the transaction record at every point along the financial transaction clearing process.

The UPPD software may also search and capture transaction records for compliance with escheat laws, automatically poll transaction records, transmit a partial or full reconciliation of the transaction records, locate lost, stolen, misplaced items, and items not presented and that remain outstanding, and archive and store transaction records, matching data, verification data, and authentication data for a predetermined period of time.

Currently a payments system, defined as the combined transaction-based processes, procedures, rules, and regulations employed by the financial institutions and, in the United States, the Federal Reserve System, is employed for the express purpose of moving funds among financial institutions and individuals in support of commerce. An electronification payments system environment has been evolving over time and has been influenced, by a need to reduce current item processing costs, reduction in the cost. of float by increasing the speed of the payments system process, the growth of point-purchase conversion volumes, the emergence of new technologies, particularly the use on the Internet, customer acceptance of multiple delivery channels, maturation of image technology as a viable processing platform, concerns about cybersecurity, and, in the United States, the Check Truncation Act (CTA).

As used herein, the 'electronification' of checks refers to the process of converting paper checks into some form of an electronic financial transaction, such as an image-based transaction or image exchange, Automated Clearing House (ACH) debit or electronic check presentation (ECH) debit. An 'electronic check' refers to one of several types of electronic financial transactions including an ACH-based electronic check, an electronic network electronic check, and Internet or telephone initiated payments. The ACH-based electronic check begins as a paper check and is converted into, or truncated to, an ACH debit entry. The paper check is not processed. An Internet or telephone initiated payment is a financial transaction initiated over the Internet or by telephone, with the debit carried out electronically, usually by an ACH debit. Some users categorize payments initiated via the Internet or telephone, but that are effected by paper drafts, as electronic checks, even though the debit is paper-based. Electronic check may also refer to any attempt to initiate payment through a personal computer, computer system, or the Internet.

In the United States, the CTA facilitates check truncation by eliminating some of the legal impediments to the use of electronics in check processing, in order to allow all financial institutions to participate in an environment in which the truncation of checks can occur at any point in the payment process. In addition, the CTA seeks to ensure that financial institutions which have not, or may not, invest in imaging do not have to make a large financial investment to develop the system infrastructure needed to support check truncation.

Check imaging is a process whereby check images are captured via image camera and stored in a digitized format. This process may be accomplished on medium to high speed processing equipment, such as equipment manufactured by IBM, NCR, Unisys. Banc Tec, etc., is normally done in financial institution back offices for the capture, sorting, and distribution of checks and other MICR encoded documents. The benefits of imaging over microfilm are quality, transportability, availability, and timeliness. The capturing financial institution can keep an archival copy of every document processed. A copy of a customer's check can be included in the statement mailing. Checks drawn on other financial institutions can be exchanged with those financial institutions in lieu of physical documents. Check imaging reduces the risk inherent in the payments system by considerably reducing the time during which checks are presented and paid.

An ACH debit entry, electronic funds transfer (EFT), and/or other money transfer processes initiated by an originator, such as a merchant, is known as a point of presentment (POP) financial transaction. A POP financial transaction is initiated as a single entry authorization, and uses a check as a source document. The MICR line information is captured and provided by the originating merchant to the paying bank at the POP to effect a transfer of funds from a consumer account of the paying bank. This type of financial transaction may only be used for non-recurring, in person (i.e., at the POP) entries for which there are no standing authorizations with the originating merchant for the origination of the ACH entries to the consumer's account.

A POP conversion is a process in which checks are converted into electronic debits and processed using the ACH network. POP conversion may be effected when the merchant keeps the original check or when the consumer receives the check after the conversion process. When the consumer receives the check after the conversion process, the consumer submits an original check and signs an authorization document, a copy of which is returned to him/her when the financial transaction is completed. The merchant scans the written check through a special reader that captures the account, check, and routing number, as well as the purchase amount.

The check data are then sent to an agent for authorization of the amount. Once authorized, the amount is converted to an electronic financial transaction and sent through the ACH network for payment. The consumer signs the separate authorization document and receives the original check back, which has been stamped "void" by the merchant. With this type of financial transaction, the paying bank does not have the opportunity to review the check and authenticate the customer through signature verification.

Returning the paper check to the consumer after the ACH financial transaction is generated minimizes the risk that a perpetrator will redirect the funds to an account other than the retailer's. Process controls manage the debit and credit flow from origination to conclusion. The credits to the merchant's account must match the debits that are originated. This proof mechanism protects both the merchant and consumer from dishonest employees, interlopers between the sending and receiving of the transactions, and deceitful individuals who try to alter the financial transaction amount.

With telephone financial transactions, the originating merchant or service provider can initiate a single entry ACH debit pursuant to an oral authorization obtained over the telephone to transfer funds from a consumer account. This type of entry may only be used as a single entry, for which there is not standing authorization for the origination of the ACH entries to the consumer's account. A telephone entry may only be used when there is an existing relationship between the originating merchant or service provider and consumer or, when there is not an existing relationship between the originating merchant or service provider and the receiver, when the consumer initiates the telephone call.

An originating merchant or service provider may initiate an ACM debit entry pursuant to an authorization obtained from the paying bank, via the Internet, to transfer funds from a consumer account at the paying bank.

Positive Pay services have been available from individual banks in recent years. It is a service that a bank sells for a fee to its account holders whereby only checks that are pre-approved are accepted at the bank. The check generating customer generally uploads a file of transaction records associated with financial transactions daily to the bank of all checks written that day. When checks drawn on the customers accounts are presented to the bank, their database is queried. If the transaction record for a check has been tampered with or if transaction record includes an unauthorized check number, the transaction record will be rejected.

Positive Pay services are recognized as an effective service to fight against check fraud. Rejected checks cause considerable effort to be expended throughout the highly regulated banking system. A typical check passes from point of sale to depositing bank to the Federal Reserve or clearing bank and back to the account holder's bank and account. At each step, the check is read, sorted and recorded, forming a trail that can be easily traced.

The existing Positive Pay services are bank specific. In other words, only a bank's own account holders can utilize it and take advantage of it. The UPPD system 10 can be used by both account holder members and non-members. The UPPD system 10 may be accessed by customers, payers, payees, payee banks, drawee banks, and banking institutions intermediate the payee banks and the drawee banks for issuing and tracking transaction records associated with financial transactions at every point along the financial transaction clearing process (e.g. the POP, POS, POE, bank POD, the truncation bank, etc.).

The UPPD system 10 allows all banks to participate in a process that can catch fraudulent transaction records associated with a financial transaction earlier in the financial transaction redemption cycle. For example, for paper/electronic checks, at each step in the check clearing process, the UPPD database 20 of the UPPD system 10 can be queried to determine if the owner of the account has indeed authorized the instrument for the amount written and signature on the financial instrument. A few banks have already developed their own internal Positive Pay software, however, this software is only bank specific.

The Check 21 Act (CHECK 21) was signed into law in the United States on Oct. 28 2003, and becomes effective on Oct. 25, 2004 (see U.S. Public Law 108-100 117 STAT. 1177). CHECK 21 fosters innovation in the payments system and enhances its efficiency by reducing some of the legal impediments to check truncation. The law facilitates check truncation by a negotiable instrument called a "substitute check", which permits banks to truncate original checks, to process check information electronically, and to deliver substitute checks to banks that want to continue receiving paper checks. A "substitute check" is the legal equivalent of the original check and includes all the information contained on the original check. The law does not require banks to accept checks in electronic form nor does it require banks to use the new authority granted by the act to create substitute checks.

As used herein, the definitions for the following terms apply. The term "bank" means any person, company, and/or business that is engaged in the business of banking and includes (a) any depository institution as defined in section 19(b)(1)(A) of the U.S. Federal Reserve Act, (b) any Federal reserve bank, (c) any U.S. Federal home loan bank, or (d) to the extent it acts as a payer (i) the Treasury of the U.S., (ii) the U.S. Postal Service, (iii), a State government, or (iv) a unit of general local government as defined in section 602(24) of the Expedited Funds Availability Act.

The terms "magnetic ink character recognition line" and "MICR line" means the numbers, which may include the bank routing number, account number, check number, check amount, and other information, that are printed near the bottom of a check in magnetic ink in accordance with generally applicable industry standards.

The term "substitute check" means a paper reproduction of the original check that (a) contains an image of the front and back of the original check, (b) bears a MICR line containing all the information appearing on the MICR line of the original check, except as provided under generally applicable industry standards for substitute checks to facilitate the processing of substitute checks, (c) conforms, in paper stock, dimension, and otherwise, with generally applicable industry standards for substitute checks, and (d) is suitable for automated processing in the same manner as the original check.

The term "truncate" means to remove an original paper check from the check collection or return process and send to a recipient, in lieu of such original paper check, a substitute check or, by agreement, information relating to the original check (including data taken from the MICR line of the original check or an electronic image of the original check), whether with or without subsequent delivery of the original paper check.

The UPPD system 10 is configured to be compatible and/or fully operational with CHECK 21 and can utilize transaction records including a check number, a check amount, an account number, a routing number, a check date, signatures, digitized signatures and matrixes and a check payee. The identity of the drawee-payer bank may be derived from the routing number. The transaction records are not limited to written check information and can include other financial instruments such as electronic checks, cash cards, credit cards, traveler's checks, money orders, gift certificates and cashier's checks. Although the customer (depositor) 30 may primarily use the UPPD system 10 for written checks, because of the similarity of financial records between these transaction instruments, the UPPD system 10 can easily accommodate the transaction records for other transaction instruments as well.

For a customer 30, the UPPD system 10 has the flexibility to utilize several means for inputting current transaction record parameters. These include computerized devices such as personal computers, portable laptops and palmtops, as well as mainframe computers and servers, all of which can be tied into the Internet and land based data bank.

The customer 30 can simply log onto the uniform resource locator of a Web site of the UPPD database 20 and can then fill out a customized Web form to upload current transaction record parameters to the Web site by hypertext transfer protocol (HTTP) or by e-mail. These types of forms are web-known to those schooled in the related art, as is the use of the Internet protocols to transmit forms information on the Internet.

Alternatively, the customer 30 can initially set up an account number and enter an activation code or a preset encrypted code so that transaction record parameters can be transmitted to the UPPD database 20 and Web site by keying in the information by touchtone telephone, so that conventional decoder machines link the information to the UPPD database 20. A wireless telephony device can be used in the same manner, with either audible or subaudible tones corresponding to the keys pressed being modulated onto the radio frequency carrier, and then being demodulated on reception and linked to the UPPD database 20. Another alternative uses voice recognition software to encode information received by telephone to enter transaction record parameters to the UPPD database 20. Use of these telephony devices, voice recognition software, and systems are well-known to those skilled in the related art and are not a point of novelty with this invention.

Additionally, technology such as optical character recognition devices and magnetic ink character recognition devices can also be used as a means for inputting current transaction record parameters from the customer 30. The magnetic ink character recognition devices and digital readers can also be used by commercial check generating entities at the point of presentment and point of encashment to read transaction record parameters off of a written check, allowing matching, authenticated, authorization, settlement, and clearing.

Transaction record parameters may be provided to the UPPD database 20 wirelessly and/or non-wirelessly. For example, the transaction record parameters by be transmitted by modem or wirelessly using direct dial software without going through a computer network, by facsimile transmission, by mail, etc. Inputting transaction record parameters in this manner, however, are typically not as convenient and popular as using the Internet and existing ACHs 70, EFTs, wires, credit cards, or other financial communications networks.

A participating commercial entity, such as a commercial retail store 50, member bank 60, clearing house 70 and Federal Reserve 80 may match and compare the information from the check with the transaction record parameters in the UPPD system 10. Hence, a collecting bank intermediate the presenting bank and the payer bank may validate the check by comparing the transaction record parameters recorded in the UPPD database 20 against the entries on the check to verify that the check has not been altered or tampered with. This may be done by logging onto a web site associated with the UPPD system 10 over the Internet and simply accessing the desired transaction record in the UPPD database 20.

If the check has been altered in any way, the participating commercial entity is immediately notified not to accept the altered check. Likewise, a customer 30 can instantly check the UPPD system 10 for either a perfect match or a rejection of the check. An ACH 70 or Federal Reserve Clearing Division 80 can also instantly check the UPPD system 10 or reject an altered check based on the current transaction record parameters.

The UPPD software may be configured to perform a partial or full real-time reconciliation of the transaction records for a customer 30 on a daily or weekly basis, depending on the needs of the customer 30. The reconciliation for the customer 30 may be requested and transferred via the Internet from the UPPD system 10.

Figure 2:
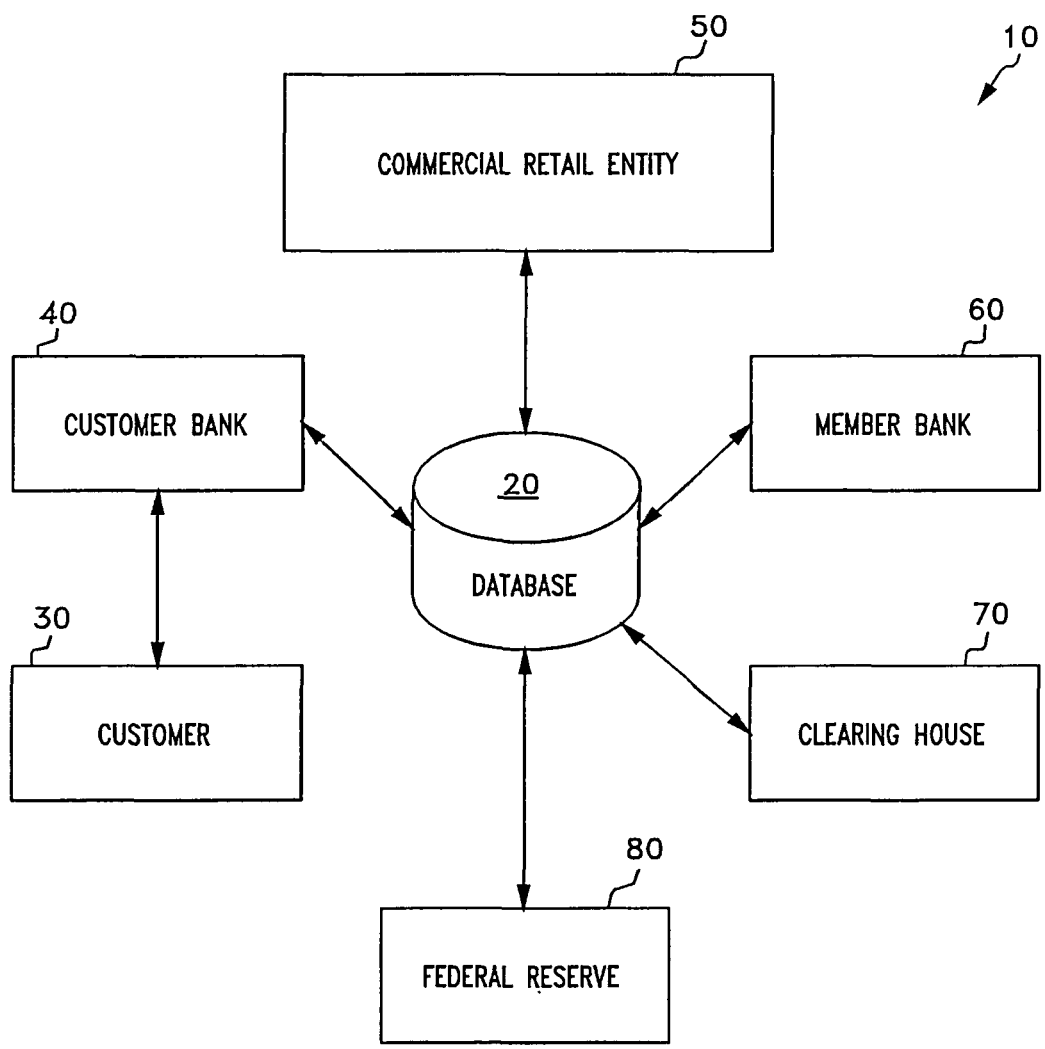
FIG. 2 is network diagram example of a UPPD system with outside financial services provided according to the present invention.

As is shown in FIG. 2, the customer 30 can also upload the transaction record(s) to be reconciled to the customer's bank 40, The customer bank 40 then passes the current transaction record(s) onto the UPPD system 10, where the current transaction record(s) are reconciled and returned to the customer 30 (via the Internet).

A polling option is also available where the customer 30 may upload their current transaction record(s) directly to their bank 40. The UPPD system 10 may also dial up the bank 40 and poll the current transaction record(s) for download into the UPPD system 10. This polling is automatically done with software that is part of the UPPD system 10. This is a pass through on the part of the customer bank 40, allowing the customer bank 40 to charge a fee for this service.

Similarly, at the end of each day, the UPPD system 10 can dial up the location of the customer 30 and poll the customer 30 for the current transaction record(s). The polling may occur either by an automatic dial up from the customer 30 to the UPPD system 10 or by the UPPD system 10 automatically dialing up the customer 30 and downloading the current transaction record(s). Typically, one type of polling is chosen over another, depending on the preference of the customer 30. Both types of polling utilize software that is incorporated into the UPPD system 10 and can simply sweep the current check register files and download them into the UPPD database 20.

The UPPD software may also be configured to search for and capture escheated transaction record(s). Escheated transaction record parameters are information on checks that have not been cashed and are "unclaimed". Configured in this manner, the UPPD software continuously searches for outstanding escheated transaction record parameters. The UPPD software can track each state's individual escheatment laws and apply those laws which pertain to the customer 30.

Financial instruments that are never presented for encashment or never redeemed are required to be reported as abandoned property in many states. The face value of those financial instruments must be turned over to the state with a record of the rightful owner on a periodic basis. The data in the UPPD system 10 can be used to generate these reports.

A microcomputer chip can also be embedded within the surface of a financial instrument, such as a paper check, that could provide current transaction record parameters, additional security, digitized information, signatures, PINs, and GPS tracking data. This provides another fraud deterrent security feature along with the necessary transaction record information used in the UPPD system 10. This microcomputer chip, if altered or tampered with, can immediately indicate that a falsification and/or tampering has occurred with a transaction instrument.

Security detectable inks, tamper-proof foils, electron foils and threads, as well as holograms can also be incorporated into a financial instrument used in the UPPD system 10 to provide additional security against fraud.

Newly developed wireless devices known as the cell wallet, the palm wallet, the e-wallet, NavCheck, and the cam wallet can also be used as part of this UPPD system 10. Although existing cell phones and palm devices are not a novelty, the cell wallet, the palm wallet, the e-wallet, and the cam wallet are novel in being used in conjunction with the UPPD system 10.

These devices can be placed in a given vehicle and are known as NavCheck devices. These NavCheck devices are unrelated to NAVchek credit line checks of the Navy Federal Credit Union. For the purposes of making every component user friendly, the NavCheck device can be activated once the vehicle is started. Either a voice or digital message can appear on the screen of the NavCheck device, asking the vehicle owner to enter current written transaction record parameters into the device, which could include the check amount, check number, and to who the check was made out.

The customer account number and date could be preset in the device for transmission of the data to the UPPD system 10, along with providing the necessary data for the transaction record(s) of the customer 30.

The NavCheck device may have the same capabilities as the cell wallet, palm wallet, e-wallet and cam wallet. A simple plug-in attachment to these devices would allow the download of data and digitized pictures to the UPPD system 10. With a microcomputer chip, a lost, stolen or forged check can also be located through use of GPS utilizing the NavCheck device to locate the paper check or card. These devices also allow ease for the customer 30 to use electronic checks and transmit the check data to the UPPD system 10.

These devices may be configured with a refillable ball point pen and an optical character reader to record all of the current transaction record parameters of the check written. These devices may also be configured to operate via voice recognition. As the customer 30 writes the check, they simply state the current transaction record parameters. The device may already have the account number of the customer 30 and the date preset, and the transaction record parameters may be entered into the device and a signal sent daily downloading the wireless transaction record parameters of these wallet devices to the UPPD system 10. These devices may also be configured to have optical character recognition scanning to enable the customer 30 to scan the check that was just written, and/or digitize the check.

If a customer 30 elects not to carry a paper checkbook or single paper check, they may utilize the option of converting to an electronic check through these devices. The customer 30 may also elect to key in the transaction record parameters by punching in the correct data on a keypad. All methods on these devices enable the customer 30 to provide the necessary transaction record parameters to the UPPD system 10.

Figure 3:
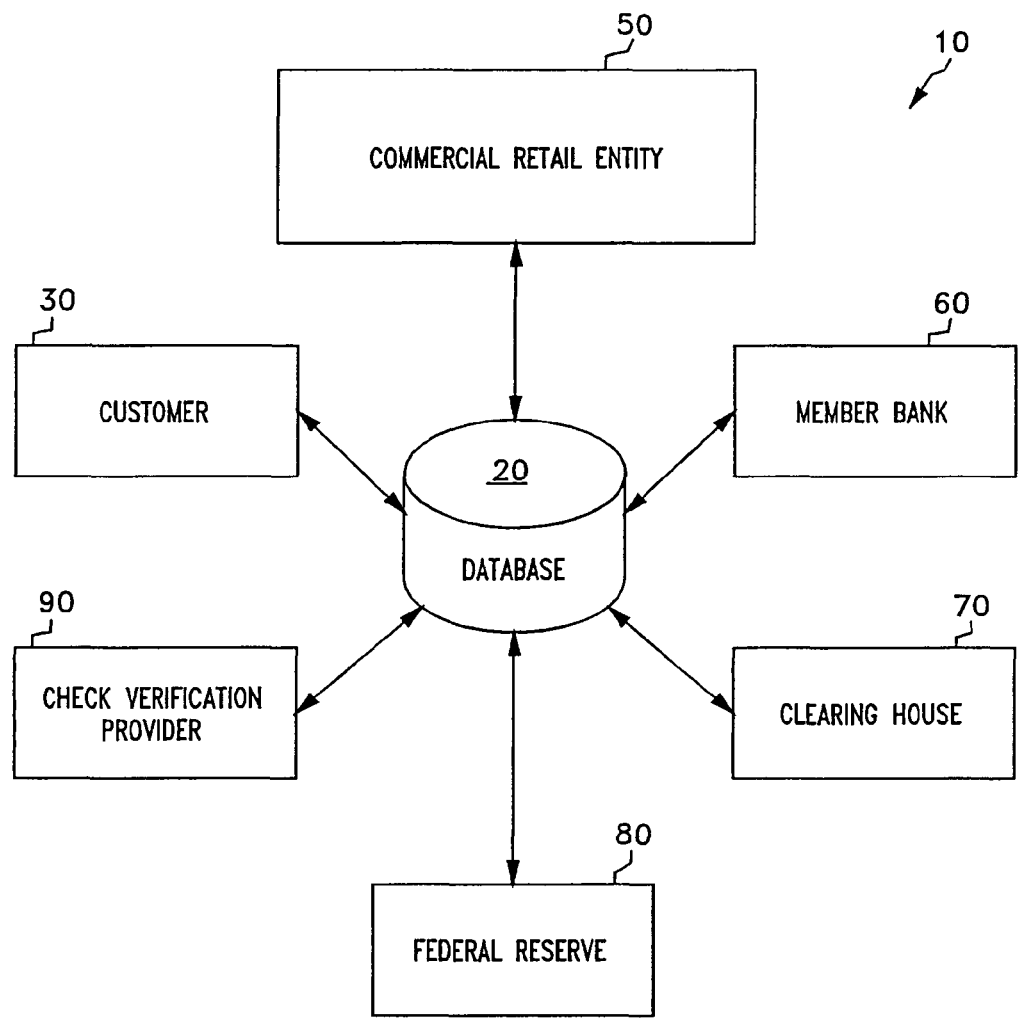
FIG. 3 is a network diagram example of a UPPD system with check verification provided according to the present invention.
Figure 4:
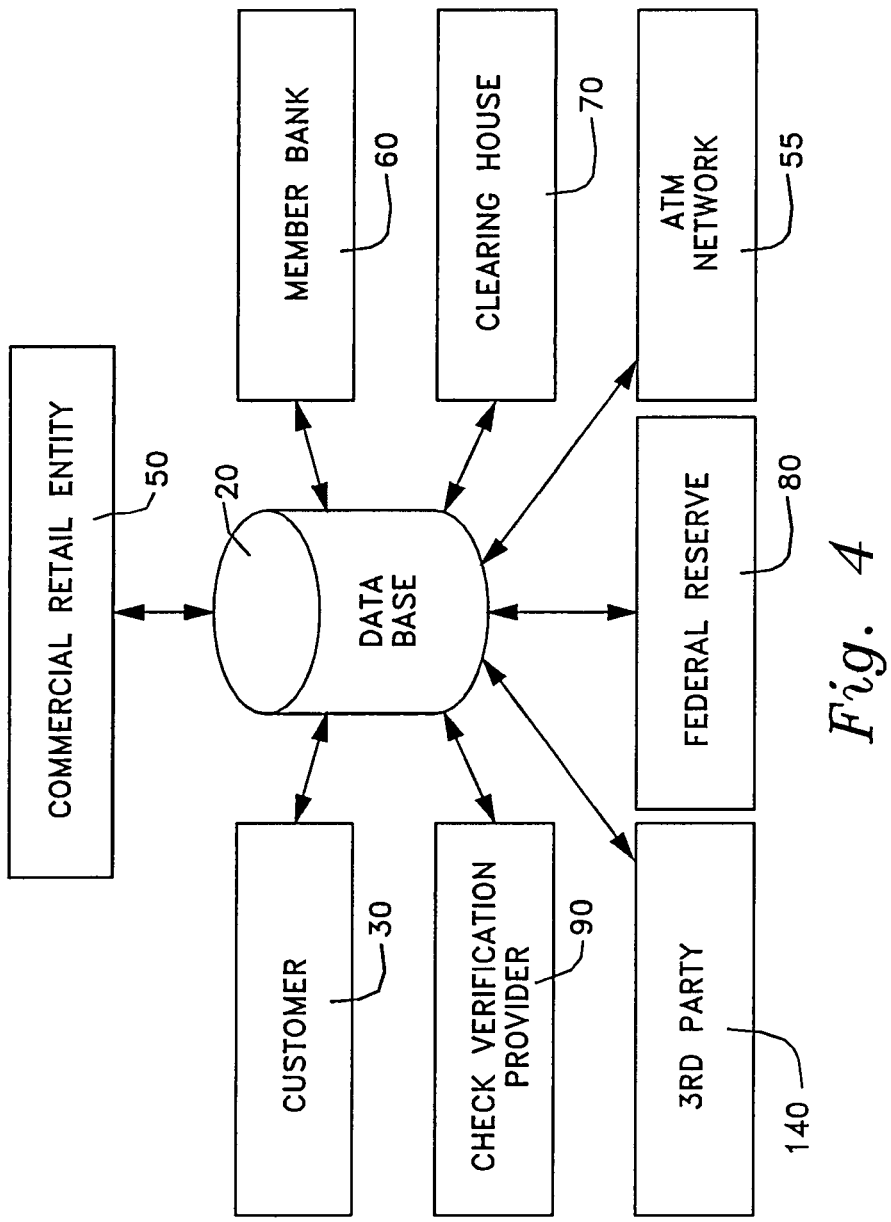
FIG. 4 is a network diagram example of a UPPD system with check verification and outside financial services provided according to the present invention.

One of the more important features of the UPPD system 10 is check verification services, which are outlined in FIGS. 3 and 4. The check verification services feature allows the commercial retail entity 50 to access the customer's 30 history of writing checks, giving a negative or positive rating. This can be done in addition to accessing the previously discussed transaction record(s).

When a given commercial retail entity 50 is presented a customer's check at the point of sale, the commercial retail entity 50 sends the UPPD system 10 a signal which is then sent to the check verification services provider 90. The check verification services provider 90 then accesses the customer's 30 check history and gives a positive or negative rating based on whether there are any checks that have not been honored. If there are any dishonored checks written presented by the customer 30, a negative rating may be given. If there are no dishonored checks, a positive rating may be given.

Once the rating has been established, a signal is then sent back to the UPPD system 10 and back to the commercial retail entity 50 wirelessly and/or non-wirelessly. It is up to the commercial retail entity 50, what to do with this rating. In other words, it is up to the commercial retail entity's 50 discretion whether to accept a customer's 30 check based on this rating.

Figure 5A:
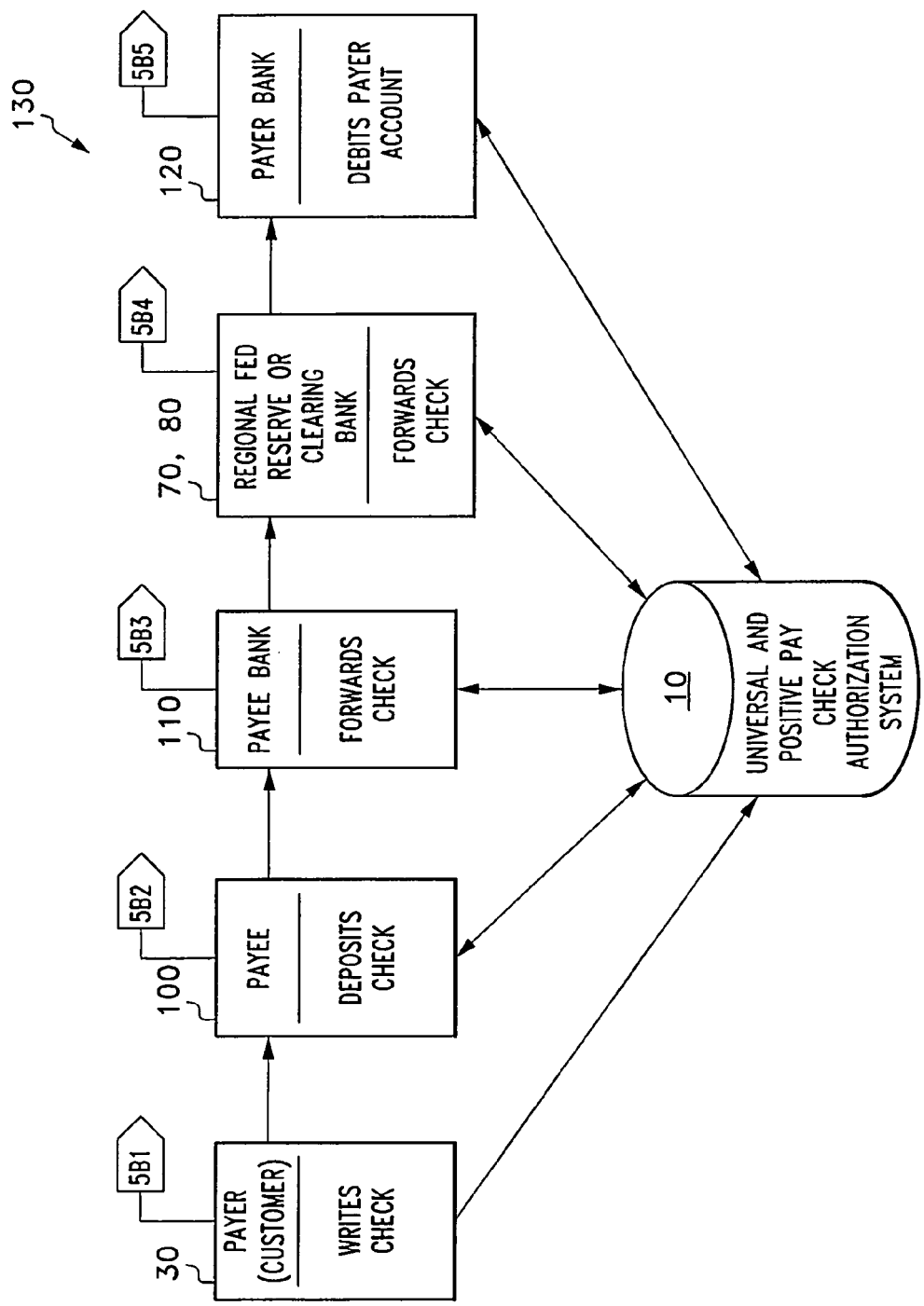
FIGS. 5A and 5B are a flow diagram of a UPPD method for checking accounts according to the present invention.
Figure 5B:
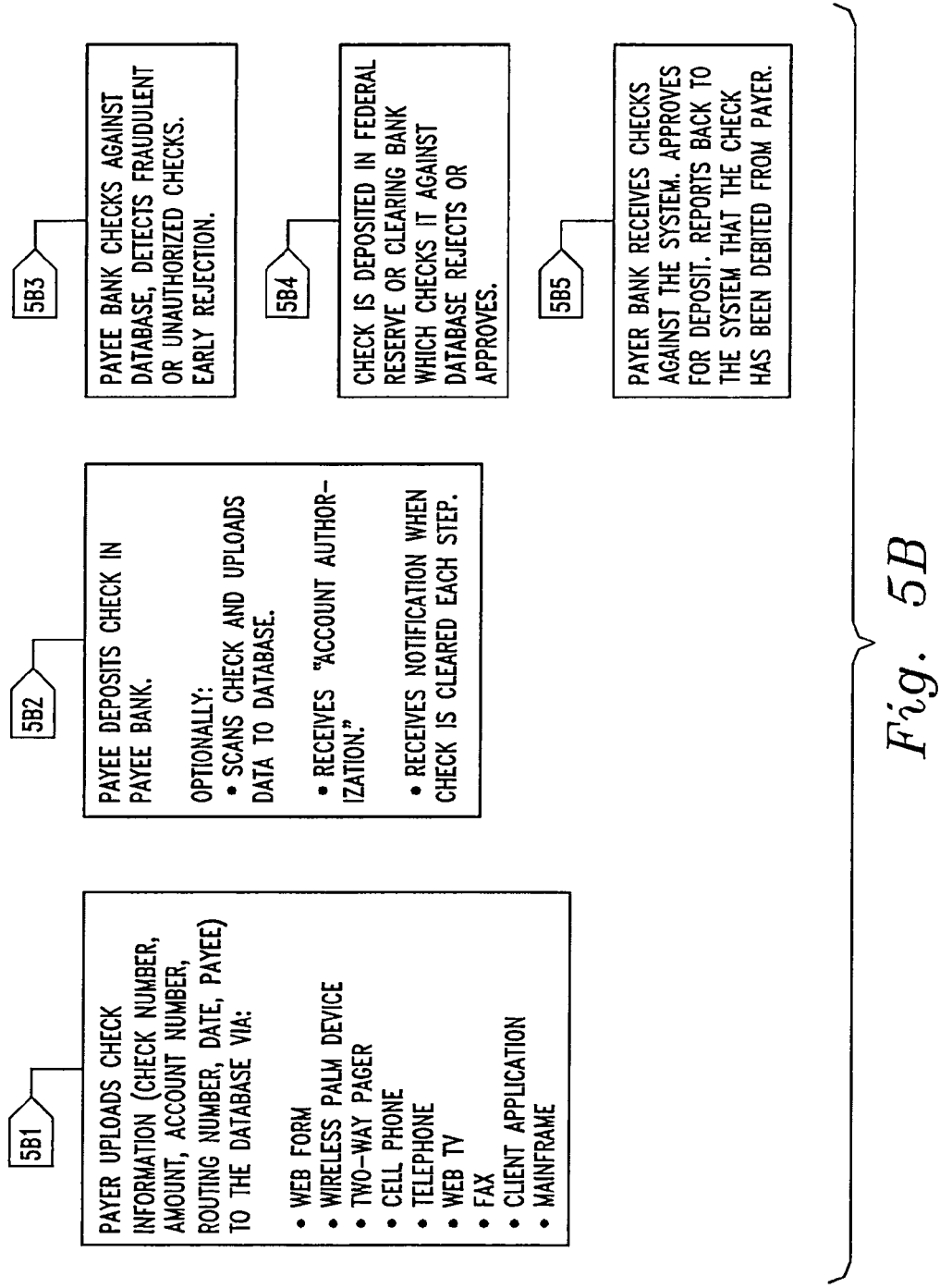

As illustrated in FIGS. 5A and 5B, each participant in the check clearing process (payer customer 30, payee 100, payee bank 110, Federal Reserve 80, clearing bank 70, or payer bank 120), participates in a UPPD method 130 used by a payer (customer) 30 for maintaining check payment control and preventing check fraud. The UPPD method 130 includes a series of steps in which payer 30 uploads check information to the UPPD system 10, payee 100 deposits check in payee bank 110, payee bank 110 checks the check against the UPPD database 20 in the UPPD system 10, check is deposited in Federal Reserve 80 or clearing bank 70, which checks it against the UPPD database 20, payer bank 120 receives check and checks it against the UPPD database 20 and reports back to the UPPD system 10 that the check has been debited from payer's 30 account.

The first step of the UPPD method 130 is uploading transaction record parameters into the UPPD system 10. As indicated earlier, this information may include a check number, a check amount, an account number, a routing number, a check date, signature and signature digitalization and a payee 100. This information is stored in the UPPD database 20 and is compared with the information that is on the physical check as it runs through each step of the check clearing process. The payer 30 also physically writes the check and gives it to the payee 100 before the transaction record parameters are uploaded into the UPPD system 10.

As touched on earlier, there are numerous ways that transaction record parameters can be uploaded into the UPPD system 10. These include a Web form on the Internet, where an account holder goes to a private Web page and enters the transaction record parameters. There are also client application software programs that can reside on an account holder's computer and transmit the transaction record parameters via modem and a non-network connection to the UPPD system 10. Voice activated client software that receives transaction record parameters input via voice can also be used and is known to those skilled in the related art.

Scanner technology attached to a computer that reads a check and transmits data, as well as bar code readers, can also be used to upload transaction record parameters. Wireless and/or non-wireless data entry utilizing manual and/or vocal input can be used to transmit data as well as 2-way paging devices, including infrared and laser technologies. Even ordinary mail or delivery services can be used to deliver data to the physical address of the UPPD system 10 (to be entered by hand).

The next step of the UPPD method 130 involves the payee 100 receiving the physical check and depositing the check into his or her bank account at the payee's bank 100. The payee's bank 100 utilizes optical character recognition, infrared, laser check reader devices or magnetic ink character recognition technology to scan the check and upload the check register check information to the UPPD database 20 (usually via the Internet). This may normally be done automatically with the polling software previously discussed. The UPPD system 10 receives notification when the check clears, as it may for each redundant step of the financial transaction clearing process.

The next step of the UPPD method 130 involves the payee's bank 100 checking and verifying the transaction record parameters from the check with the transaction record parameters from the UPPD database 20. This is done to detect fraudulent tampering or unauthorized use of the check early in the financial transaction clearing process and is an advantage over some of the current methods outlined in the related art.

The next step of the UPPD method 130 involves the payee's bank 100 depositing the check into a regional Federal Reserve Clearing Division 80 or clearing house 70. Like the previous step involving the payee's bank 100, the Federal Reserve 80 or clearing house 70 checks the check against the UPPD system 10 for check tampering or fraud again for added security and redundancy.

The next step of the UPPD method 130 involves the Federal Reserve 80 or ACH 70 sending the check to the payer's bank 120. The check is again checked and compared with the transaction record parameters in the UPPD database 20 for check tampering and fraud by the payer's bank 120, which approves the check for payment. The check is then debited from the account of the payer 30 and the UPPD system 10 is notified, which is the final step of the UPPD method 130.

Each participant in the check clearing process has an opportunity to add to and receive information from the UPPD system 10. This information can be used for account verification and notification of a check that was rejected due to unauthorized issue, evidence of tampering or account owner cancellation. Status of a check as to where it is in the clearing process is also readily available. A check query notice is sent to a payer 30 whenever their records are accessed and a deposit acceptance notice is sent to a payee 100 and payer 30 when a check is accepted.

Figure 6:
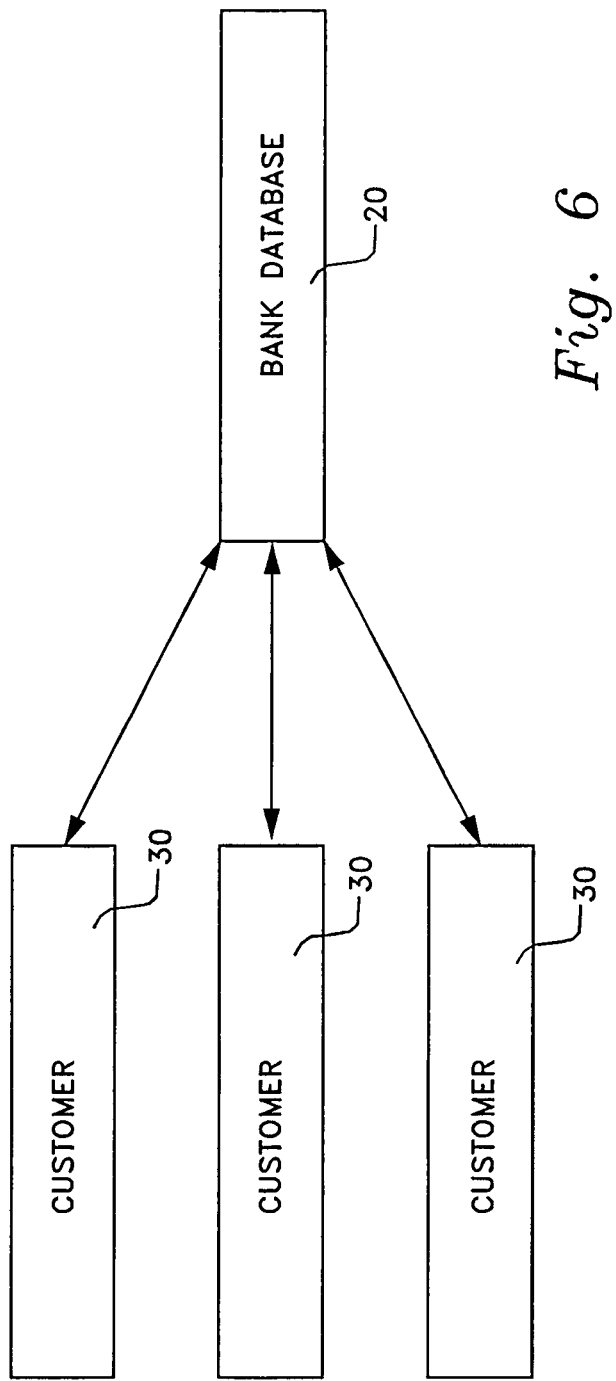
FIG. 6 is a flow diagram illustrating bank specific Positive Pay according to the prior art.
Figure 7:
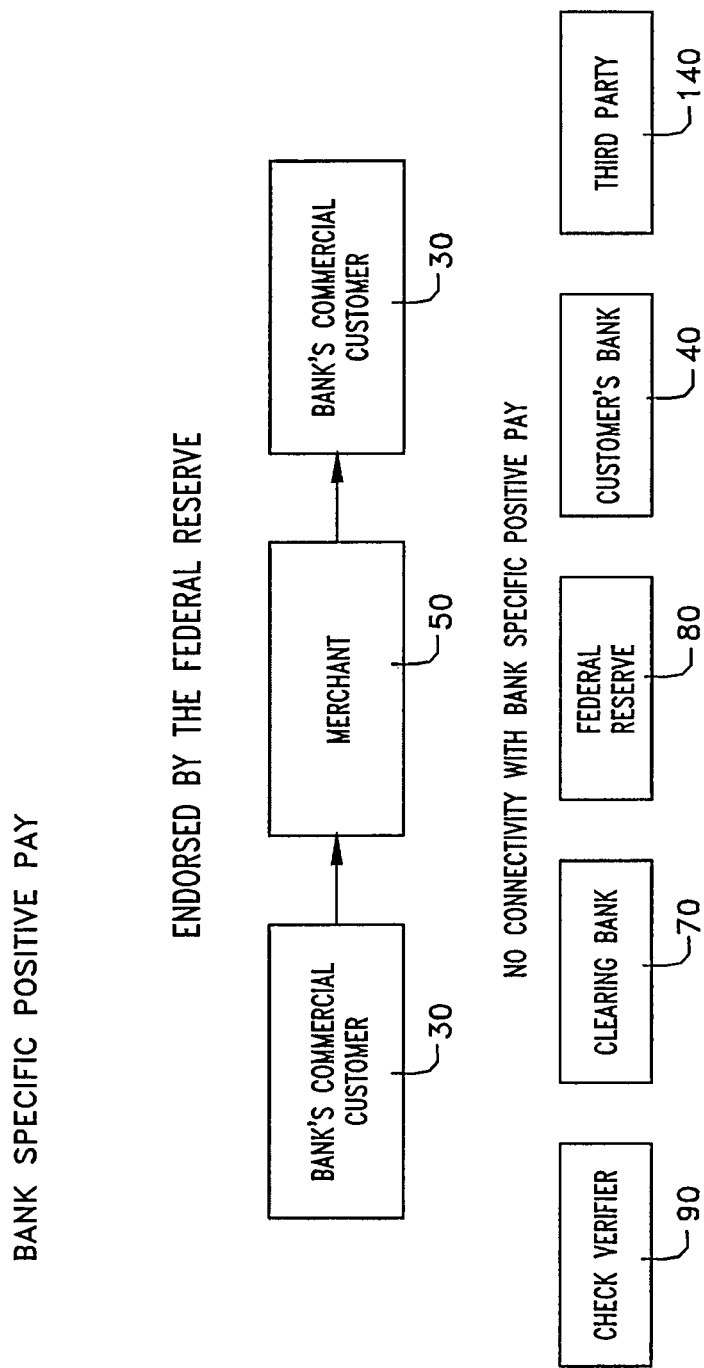
FIG. 7 is a flow diagram showing no connectivity with bank specific Positive Pay according to the prior art.
Figure 8:
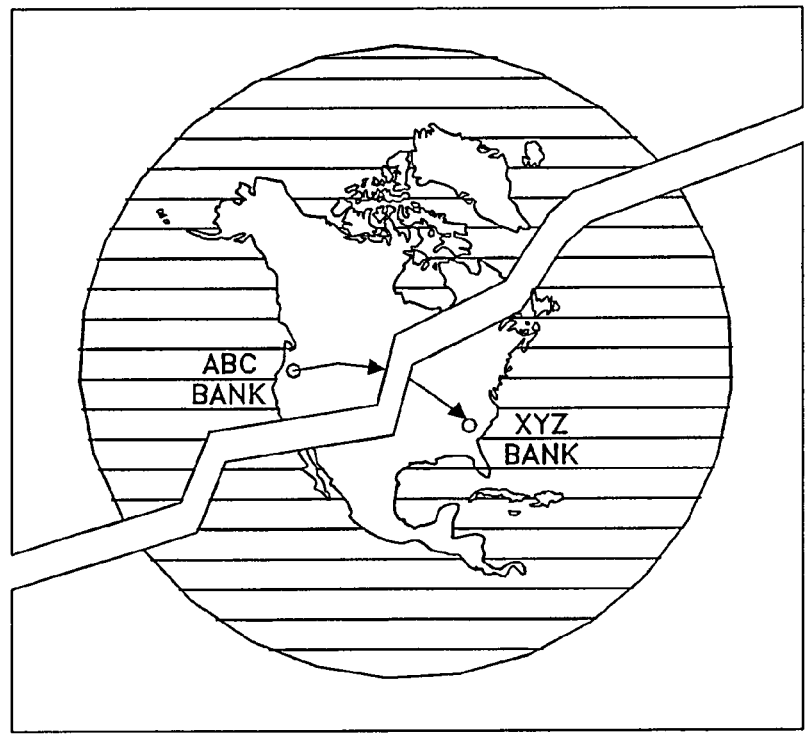
FIG. 8 is a diagram according to the prior art showing why check fraud works today.

It should be noted, as seen on FIGS. 6, 7, and 8 that the Positive Pay exists today in the financial industry. However, it is defined as bank specific Positive Pay. Bank specific Positive Pay is nothing more than a customer 30 downloading his check register to their bank 60 daily. Like living on a cul-de-sac, the customers 30 and the bank 60 only have communication with themselves and anyone who is a neighbor customer only banking with that specific bank on that system. If they live on the next block, next city, or another state, they have no way to communicate. There is no connectivity, as shown in FIGS. 7 and 8.

Another example of use for the UPPD system 10 is that the declarations page of an insurance policy can be provided with a series of numbers identical or similar to a MICR line across the bottom of a check. Within this line would be the policy number, issue date, policy amounts and effective dates. All of the information would become similar to a check register and could be downloaded from an insurance company to the UPPD database 20. The positive match between the file accepted from the carrier issuing the policy and that received from the agent keeps the policy from being altered.

Figure 9:
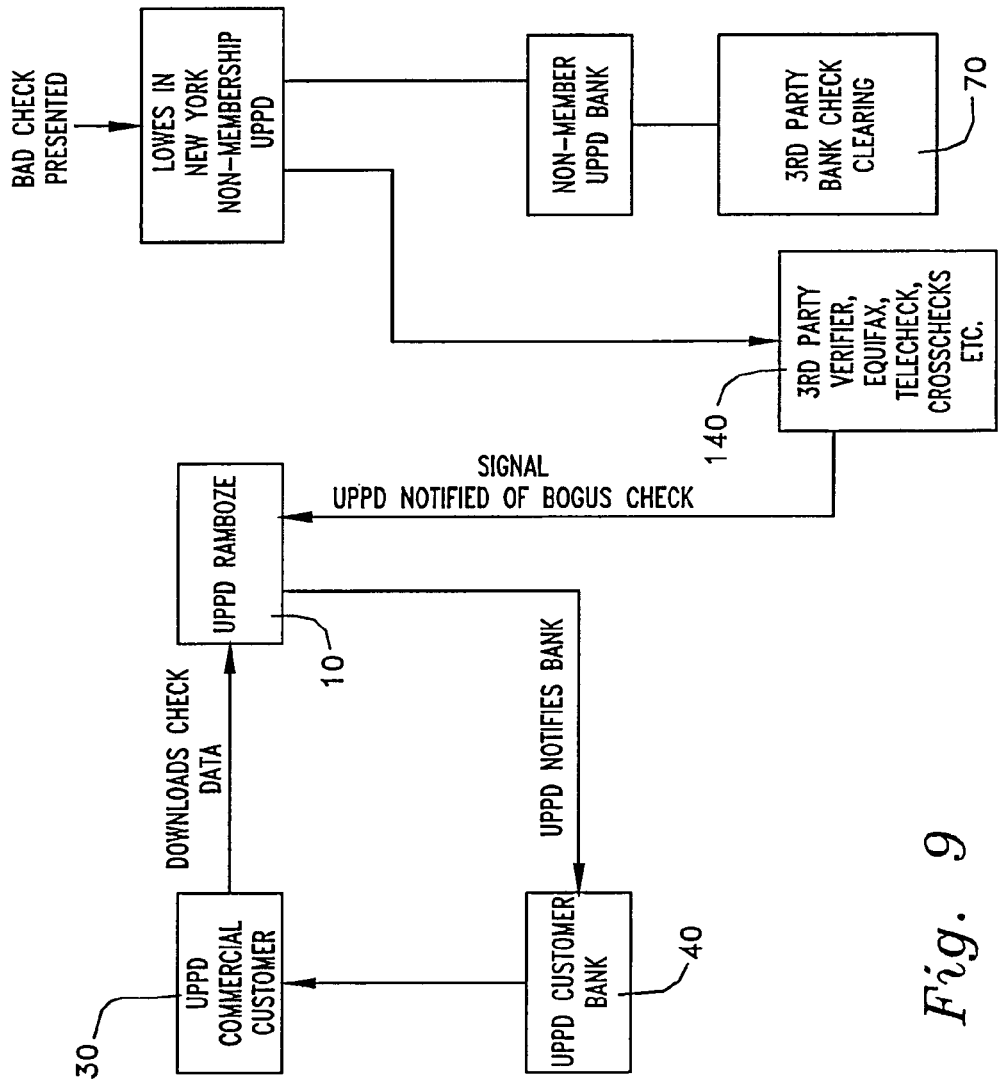
FIG. 9 is a flow diagram indicating how a UPPD system processes a bad check according to the present invention.

The UPPD system 10 also allows for complete connectivity allowing banks 60, commercial retail entities 50 and even customers 30 to communicate directly or indirectly through the UPPD database 20 by matching the positive data sent by the customer 30. The customer 30 can upload his check register of written checks to the bank 60 under bank specific Positive Pay, but is then restricted from a universal verification for authenticity. As shown in FIG. 9, under the UPPD system 10, the customer 30 uploads his check register directly to the UPPD database 20. Any member commercial retail entity 50 or contracted third party verifier 140 can send check data to the UPPD database 20 for verification.

The signal passes through the match, authentication, authorization, settlement, and clearing system 10 for matching. If the signal matches the check register data present, the signal is then sent to the customer's bank 40, where it checks for sufficient funds, stop payments, liens, account status (open or closed), funds available to cover any check (overdraft protection, etc.), and any other verifications to provide a signal back through the UPPD system 10, enroute to the querying party to either accept, reject or not approve the check. If there has been a fraud, it is discovered instantly. If there are insufficient funds, the bank may elect to approve or reject based on its customer relationship.

Figure 10:
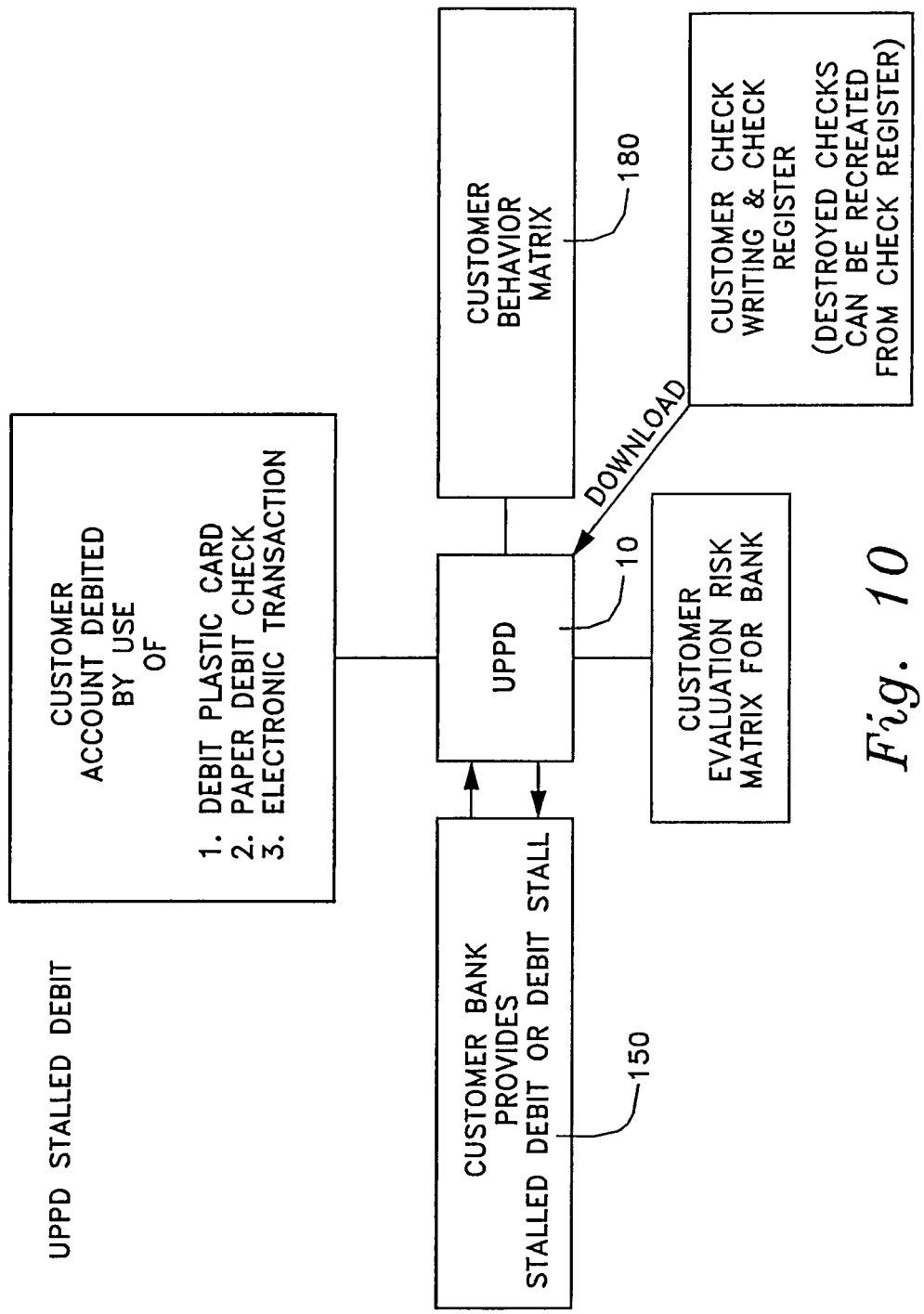
FIG. 10 is a diagram indicating how stalled debt or debit stall is used by a UPPD according to the present invention.

As shown in FIG. 10, the UPPD system 10 may utilize stalled debit or debit stall services 150 provided by the bank 60. Normally, when a check is presented, based on the bank's 60 customer relationship or contractual relationship, the bank 60 would be allowed to debit the customer account immediately under normal debit procedures.

The stalled debit 150 allows the institution to stall the debit by issuing a credit to the commercial retail entity 50, financial institution or party seeking the debit. The stalled debit 150 provides that the amount of the debit from a check, to debit check or a debit card, allows the institution and their customer the use of a float. The money in the account is held at the side and awaits the normal check clearing, electronic, paper or plastic procedure to take the allotted time by the Federal Reserve 80 to allocate the cash from this transaction.

The debit stall 150 sets aside the money for the transaction within the customer's bank 40. If the next check that comes in is now over the balance within the account of the customer 30, the institution, based on their customer relationship, can reject the next transaction and state insufficient funds, or accept the transaction and stall the debit based on overdraft protection from charge cards, direct bank loans, zero balance account or any other method the bank 40 feels necessary to provide to their customer 30. As a result of the UPPD system 10, the check register, matching data, verification data and authentication data may be archived and stored for a desired period of time, e.g., seven years or the like.

Figure 11:
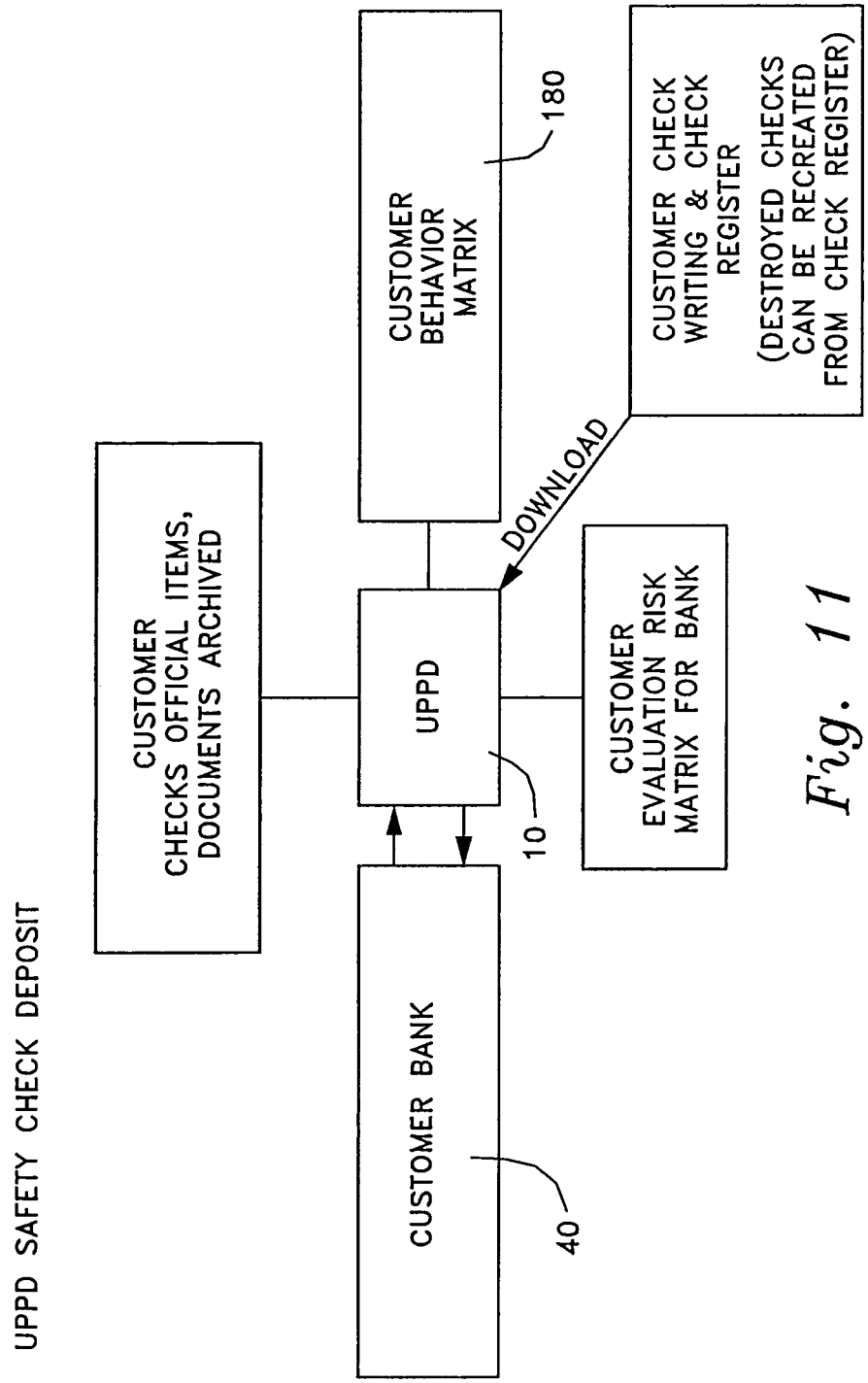
FIG. 11 is a diagram indicating how Safety Check Deposit software is used by a UPPD system according to the present invention.

This is referred to herein as a Safety Check Deposit 160, as depicted in FIG. 11. For a fee, the data may be stored and recaptured for the customer 30 or customer bank 40 for retrieval on disasters, catastrophes, bankruptcy, law suits, tax audits, probate and estate re-creation, along with many more reasons the customer 30 might wish for check data retrieval. These may also be subscribed to under the Fair Credit Reporting Act.

There are two tiers of tracking for checks, official items, gift certificates, money orders and other types of data, such as pharmaceutical data, medical data, insurance data and other financial services. The first tier, which utilizes TrackBack software, has the UPPD system 10 track and search for outstanding codes, numbers and encrypted data on an item waiting to be redeemed, cashed or provided at a point of presentment.

Figure 12:
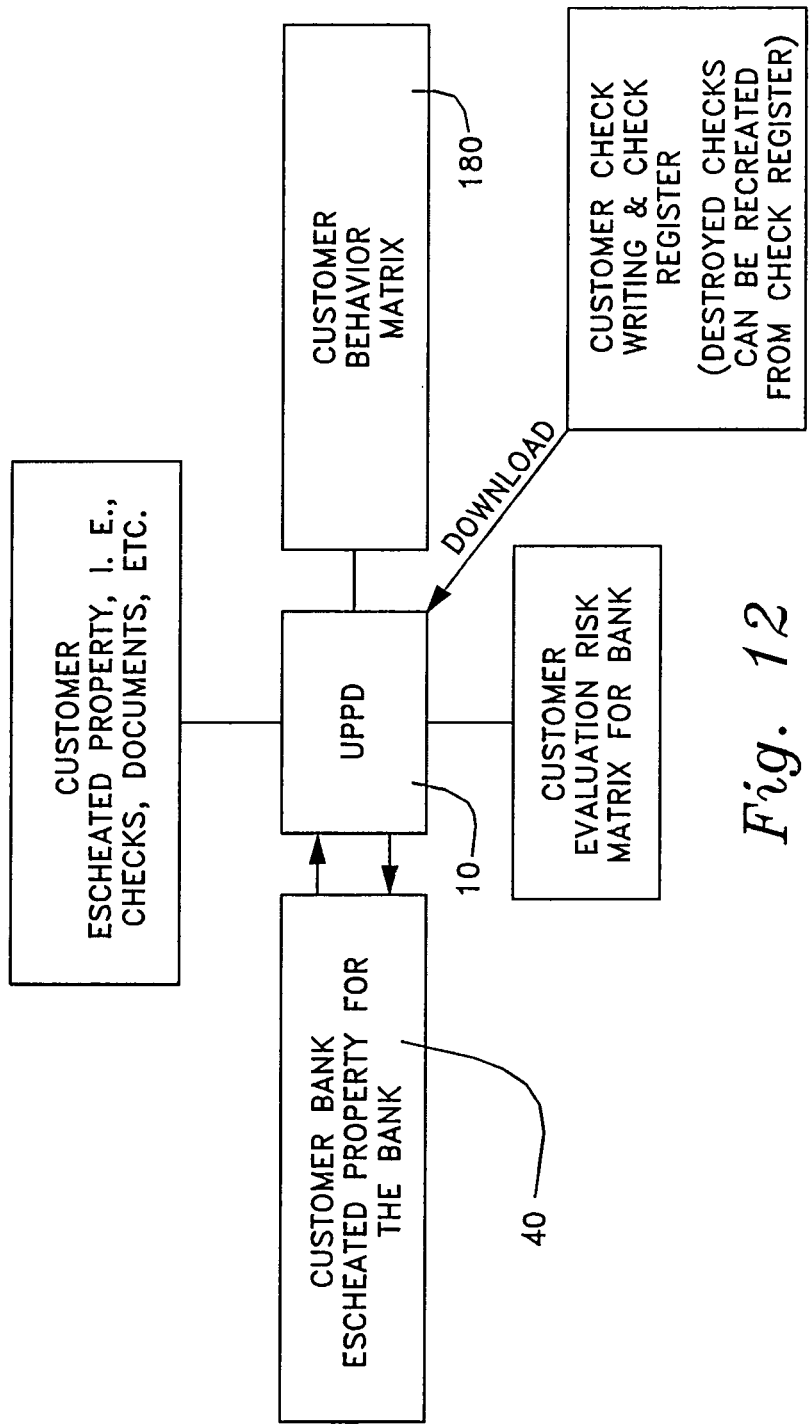
FIG. 12 is a diagram indicating how TrackBack software is used by a UPPD system according to the present invention.

The TrackBack software provides exclusive use to the customer 30 in locating lost, stolen, misplaced items, or items not presented and that remain outstanding. The second tier of the TrackBack software is utilized for locating instruments through use of GPS. Additionally, instruments of any value may be located in the event of stolen, lost, fraudulent or forged documents. This is also depicted in FIG. 12.

As shown in FIG. 13, a complete historical behavior of customer 30 check writing habits may be compiled to provide another level of security. If a customer writes twenty checks a mouth, the customer's behavior matrix 180 may track this, much like a credit card. If a large check arises or checks appear from different parts of the country outside a customer's 30 residence, an alert may prompt an abnormality from the customer's behavior matrix 180 and trigger a confirmation that any changes are not security breaches on historical data compiled.

With the historical check writing data compiled from the UPPD database 20 and the customer's behavior matrix 180, a complete credit history 190 may be generated. The UPPD database 20 may compile credit histories for the proper parties, including the customer's 30 usage for fraud, insufficient funds, late pays, etc. This also meets the requirements for the Fair Credit Reporting Act.

The UPPD system 10 can also operate in a peer to peer mode. This allows a financial institution, ATM network 55 or other entity to house a host or server. This host/server configuration would allow an institution the ability to secure data from their customer 30 and pass this directly to the UPPD system 10. This allows the institution the ability to house their own customer accounts securely on their own server.

A peer to peer mode also allows the entity the option to carry the data load and have an off-site source UPPD system 10 for back-up and catastrophe handling, along with connectivity from peer to peer. All of the transmissions would still occur as stated to allow the connectivity to multiple sites in lieu of being bank specific.

The term "reverse pay" or "negative pay" is similar to the UPPD process, except that the process is reversed with the customer 30 that downloads their check register. Like "Positive Pay", reverse pay is utilized as bank specific, and thus it has no connectivity. It does not allow point A to communicate beyond point B through the UPPD database 20 and the many networks connecting all points to the UPPD database 20.

With reverse pay or negative pay, not only does the account keep a list of issued checks, through their check register, but the UPPD database 20 keeps a list of the customers' issued checks. When a check is presented for payment and clears through the Federal Reserve 80, the Federal Reserve 80 prepares a file of the dollar amounts of the checks, serial numbers and account numbers, and sends the file to the financial institution on a bank specific reverse pay format.

In reverse pay (bank specific), the financial institution sends the file to the customer 30, where the customer 30 compares the information to its internal records. The customer 30 lets the financial institution know which checks match its internal information and the financial institutions pays those items. The financial institution then researches the checks that do not match, correcting any encoding errors and any misreads and determines if the items are fraudulent. The financial institution pays only the real or true exceptions that can be reconciled with the customers' files.

Universal reverse pay or universal negative pay takes this reverse match to an even higher level of security by having all pass through the UPPD database 20 back to the bank 60 and the customer 30 and uses either the debit stall or stalled debit 150 to hold funds, but assure the debtor that the funds are not insufficient funds. They are in a stalled debit 150 stall and are transferred once the check goes through the regular and normal clearing process and funds availability requirements. The debtor to a debit plastic card or debit paper check can be given a credit slip on verification of authenticity.

A check writing software package, known as DirectCheck, is provided to the bank 60 and its customers 30, and utilizes the match, authentication, authorization, settlement, and clearing system 10 or the reverse pay/negative pay module, allowing connectivity to various networks, communications devices and the Internet. This DirectCheck software runs on MICR laser printers of various manufacturers and provide security features in printing on blank secure paper checks, official items, financial items and other documents. The TrackBack software may also be included in the DirectCheck software.

Customers 30 provide signatures for official items to be used by the UPPD system 10. The signatures are digitized and recognition software verifies signature matrixes for any abnormalities.

The UPPD system 10 may be configured for enhanced security by associating transaction record parameters for customers to the UPPD system 10 via biometrics. Biometrics is the technology of personal identification through validation of an individual's unique physical characteristics, such as DNA, facial structure, iris, retina, finger print(s), voice, signature recognition, etc.

The UPPD system 10 also has the ability to allow or provide imaged, digitized, or electronic conversions of checks, debit cards, debit checks, plastic check cards, smartcards, and paper checks from devices included within the UPPD system 10. The UPPD system 10 may issue or accept digitized checks for clearing, matching, verifying and authenticating. Information such as check amounts, coding, routing numbers, check dates, signatures, digitized signatures, matrixes and account numbers may be verified for a positive match.

The UPPD system 10 provides that check readers continue in the retail-marketplace, as has been custom. It is the intent of the check readers to be placed at every teller station and on the ATM network stations 55. For readers that provide check data, digitalization may be utilized to place the readers at every possible location accepting checks, debit cards and paper debit checks along with the deposit of any other official item. These readers transmit, via a purchased direct line, information to the UPPD system 10. The UPPD system 10 may utilize existing networks, such as ATMs 55, AT&T frame systems, automated clearing house 70 networks, credit card networks and third parties 140, such as TeleCheck, Equifax, and CrossChecks.

Electronic foils can be embedded within plastic and paper instruments to transmit the written material data from a customer 30. Foils and chips within the instruments may provide additional security with encrypted serialized match numbers. The UPPD system 10 requires check readers and credit card readers to transmit a personalized digitized signature band or wavelength to any waiting devices for data recovery and instant transmission. These chips and foils may be programmable and configured for use with GPS. A special watermark or hologram can also be placed on these instruments for further security.

A customer 30 can also receive rewards for proper and timely exchange of pertinent data. These rewards can include frequent flyer miles as well as travel or other merchandise.

The UPPD system 10 may also provide the capturing and storing of electronic presentation or payment of checks. This includes capturing and storing electronic images of checks. By matching the UPPD system 10 protocol, these checks allow financial institutions to make payment decisions in real-time by getting access over the Internet, peer to peer transmissions, modems, landlines, wireless systems, check readers and other communications devices, as shown in FIG. 14.

The electronic processing of the UPPD system 10 also allows customers 30 to view their check register immediately in real-time to determine exceptions, stop pays, insufficient funds, missed items, cancelled checks and voids. A customer 30 writes a check at the point of purchase, point of encashment and/or point of presentment and the check information, which can be digitized, imaged or copied, is sent to the UPPD system 10 for authorization and authentication. This same process can also be done through a third party 140 sending the check data to the UPPD system 10.

Once the transaction is completed and approved, the customer 30 signs an authorization slip. The customer 30 is provided with a copy of the authorization slip stamped or printed on the back of the check or debit check as "cancelled or voided". The debit check or check is cancelled and can be returned to the customer 30 on the spot. Since the checks have been convened electronically, they can be transmitted from either the commercial retail entity 50 directly to the merchant bank or through the UPPD system 10, to provide a batch of electronically authenticated electronic checks for deposit and use of either the ACH 70, EFT and stalled debits 150 by the financial institution to the account of the customer 30.

As a result, check clearing is done instantly rather than through the cumbersome check clearing system that currently exists. The cancelled check image, digitalization or data from the check can be archived for the customer 30, the bank 60 and commercial retail entity 50 as described in a universal Positive Pay, universal reverse pay, or universal negative pay system. This provides the UPPD system 10 the customer's check writing behavioral matrix 180 and the credit history 190 gathered on the customer 30, and provides the UPPD system 10 with the ability to guarantee payment of check funds.

Additionally, the UPPD system 10 has the ability to accept relationships with third parties 140, bank clearing houses 70, ATMs, check guarantee firms and more. This further allows additional security, lower check fees, lower check clearing fees, returned checks, and allows all parties to settle and balance, including real-time check reconciliation for the customer 30, the commercial retail entity 50, and the bank 60.

This also allows the UPPD system 10, the bank member 60 and the customer 30 the ability to guarantee checks for ISF and more importantly, authentication and detection of fraud on debit cards, debit checks, plastic check cards, smart check cards, payroll cards, cash cards, and paper checks instantly. This allows safer use and guarantees imaged, digitized, and electronic check conversions to all parties involved.

The UPPD system 10 allows a customer 30 and bank member 60 to inventory and reconcile in real-time. Once the check register or any positive match information is provided, the customer 30 expedites the check related credit postings and the check return process. This allows same day instant clearing and reconciliation on paid checks. Gift certificates and money orders may be treated in the same fashion as a check under the UPPD system 10. The customer 30 uploads the creation of this real-time or at a specified time daily. The UPPD system 10 treats any fraud or ISF issues just like any other official item.

Through the UPPD system 10, digitized, electronic and paper items are cleared in the same fashion as clearing items similar to the Federal Reserve 80 or a third party check clearing house 70 or bank. The UPPD system 10 provides the proper platform and protocol for clearing any items for both a positive match, an universal reverse pay match and creation of a negative file. The negative file is a file compiling credit history on the customer 30, along with his historical check writing behavior.

There are thousands of different types of accounting software packages being utilized by financial institutions, commercial accounts, retail establishments and merchants. The UPPD system 10, universal reverse pay and universal negative pay systems can be provided commercially and may also be available by downloading from the Internet for a fee. These systems may be used by or connected to for personal use as well as commercial use by any entity desiring complete connectivity and accountability to a standardized form of accounting procedures that allow further security, easier connectivity and a standard protocol.

Figure 15A:
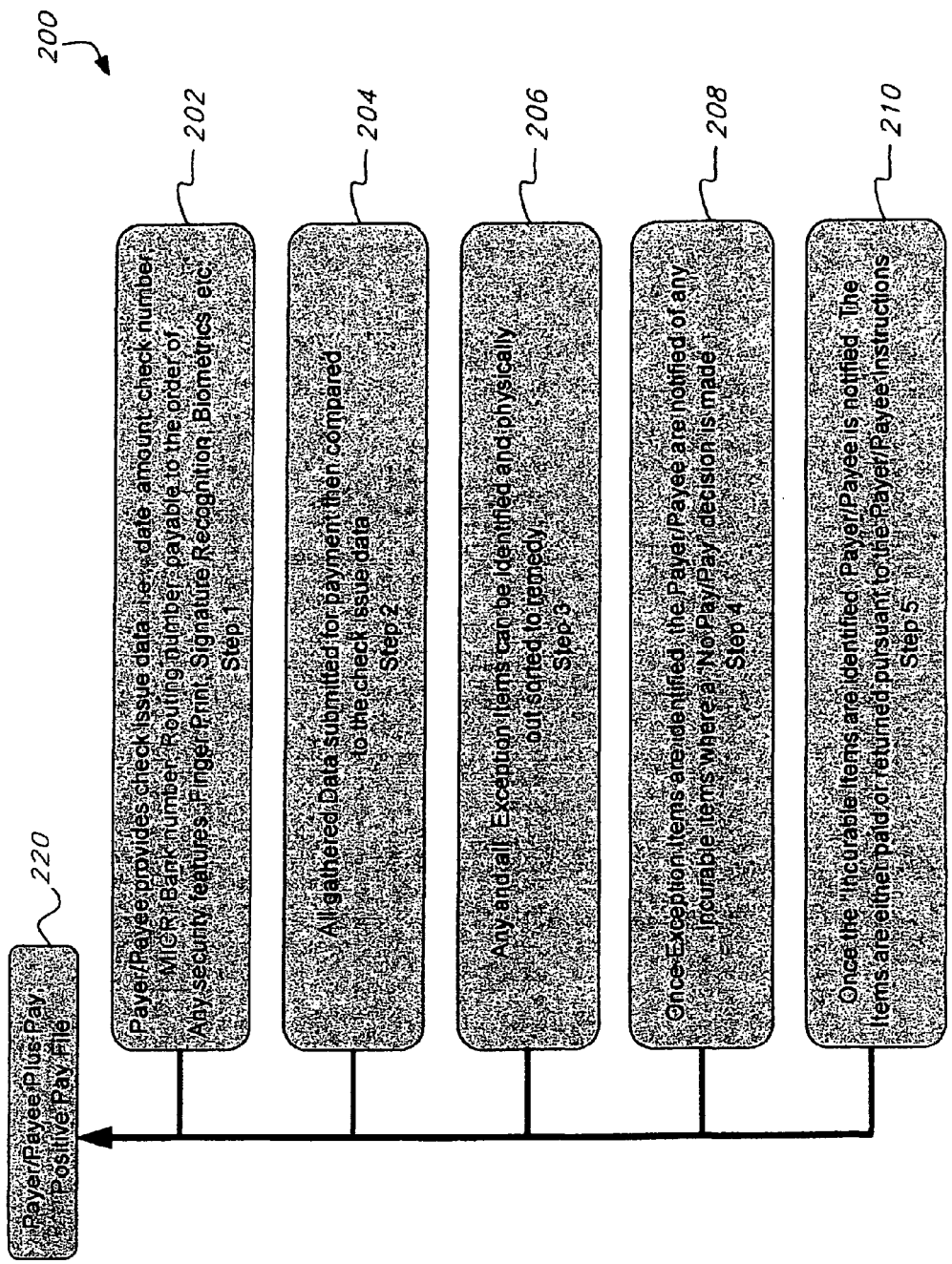
FIGS. 15A and 15B are flow charts of bank specific Positive Pay processes that can be used with UPPD processes according to the present invention.
Figure 15B:
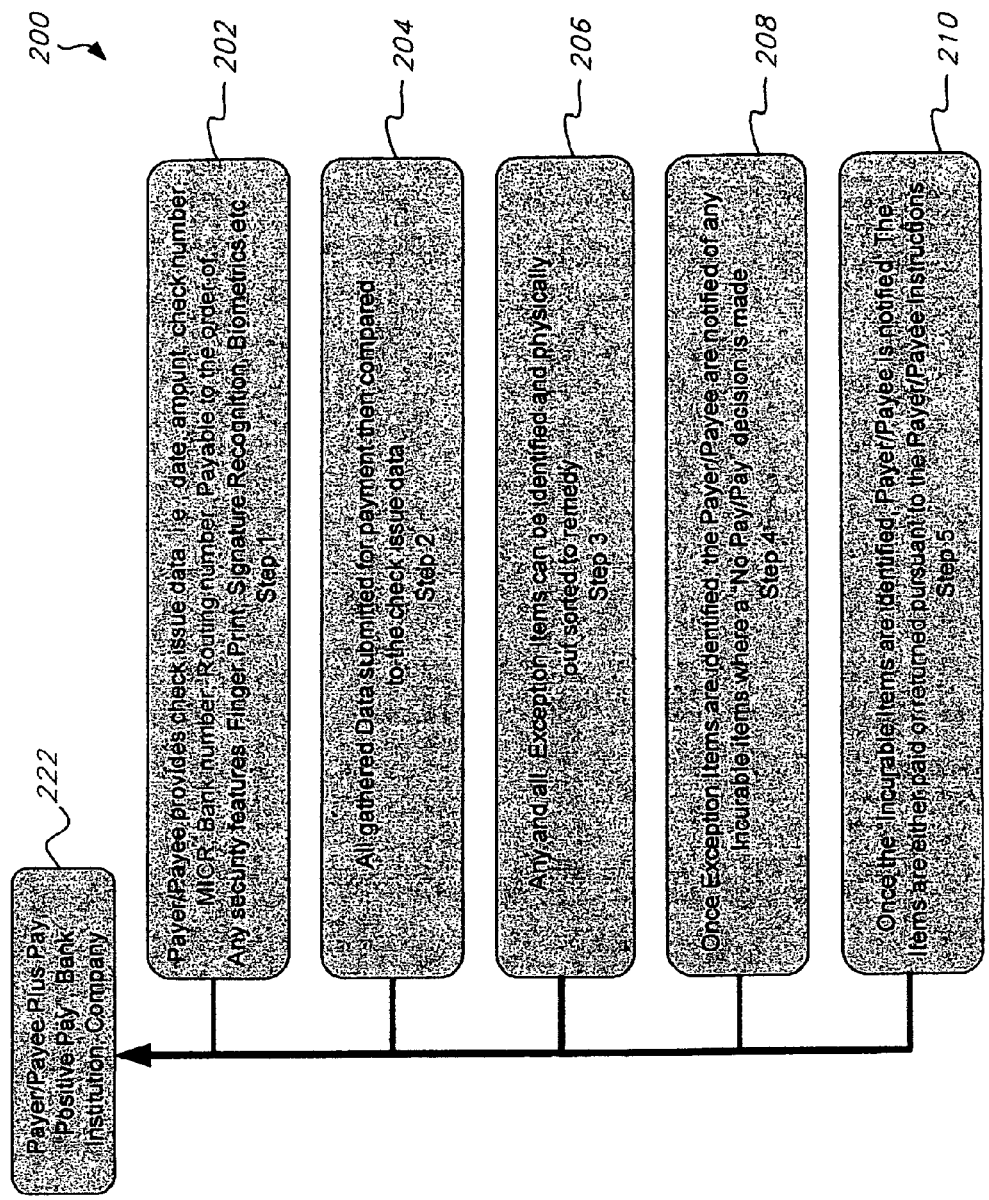
Figure 15C:
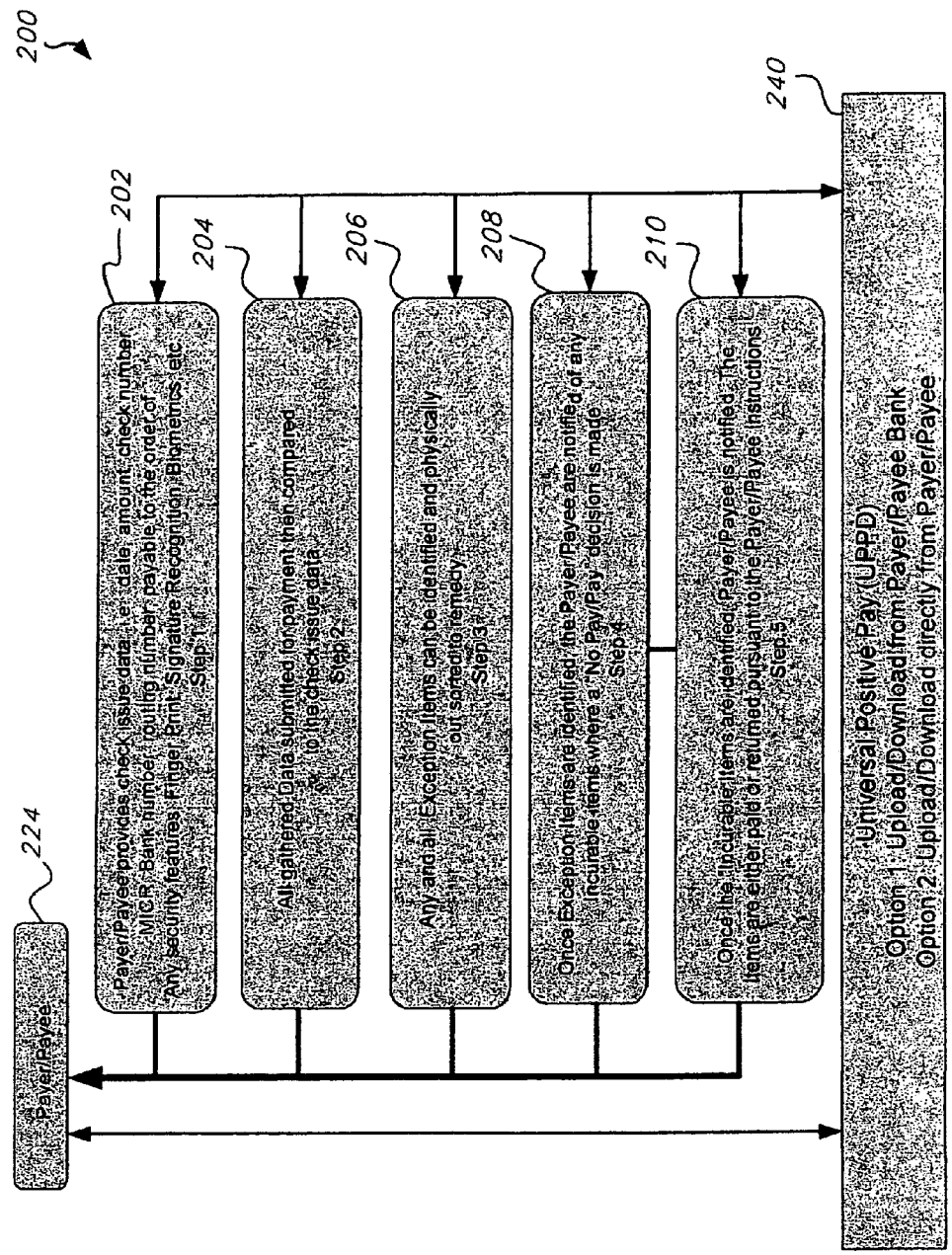
Figure 15D:
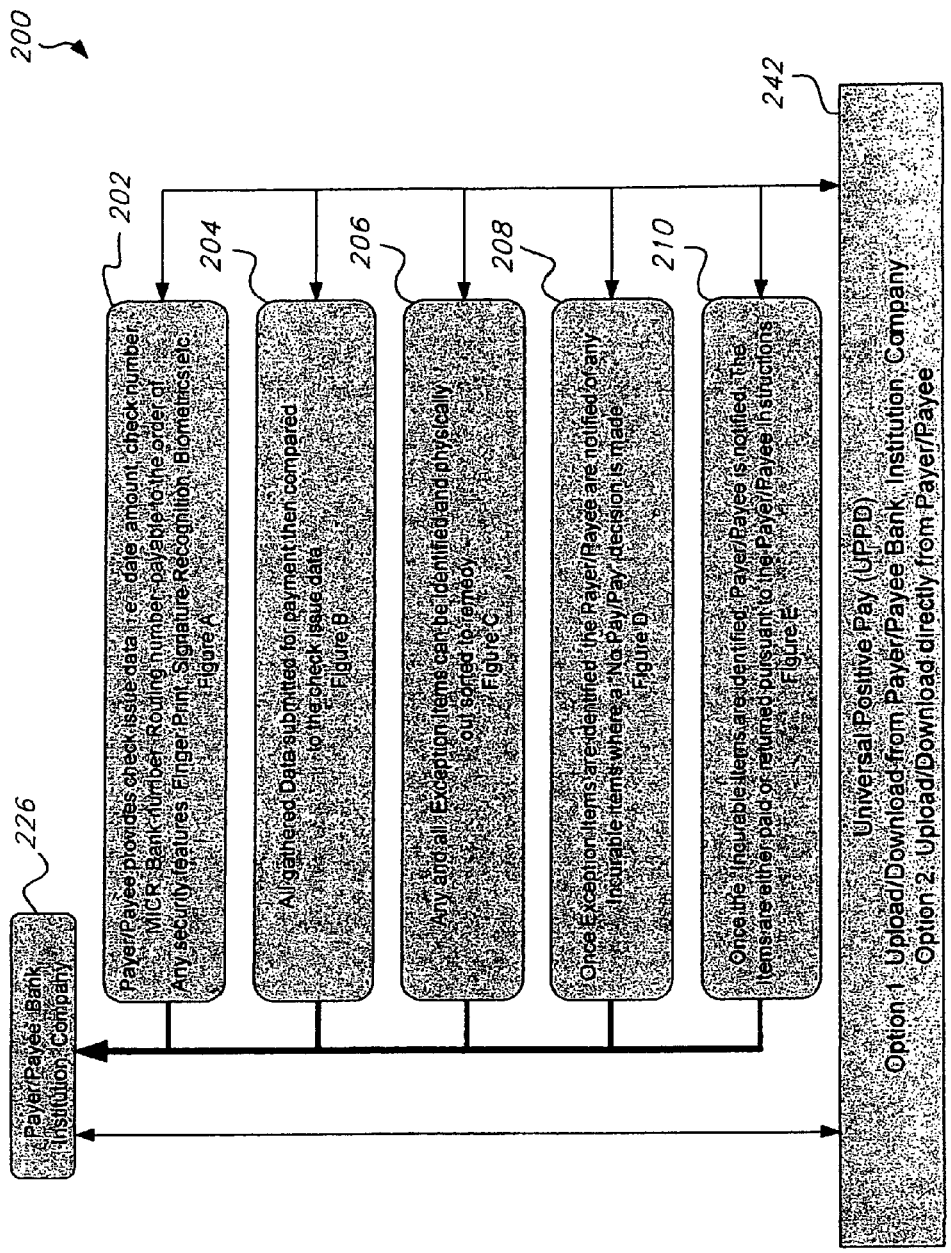
Figure 15E:
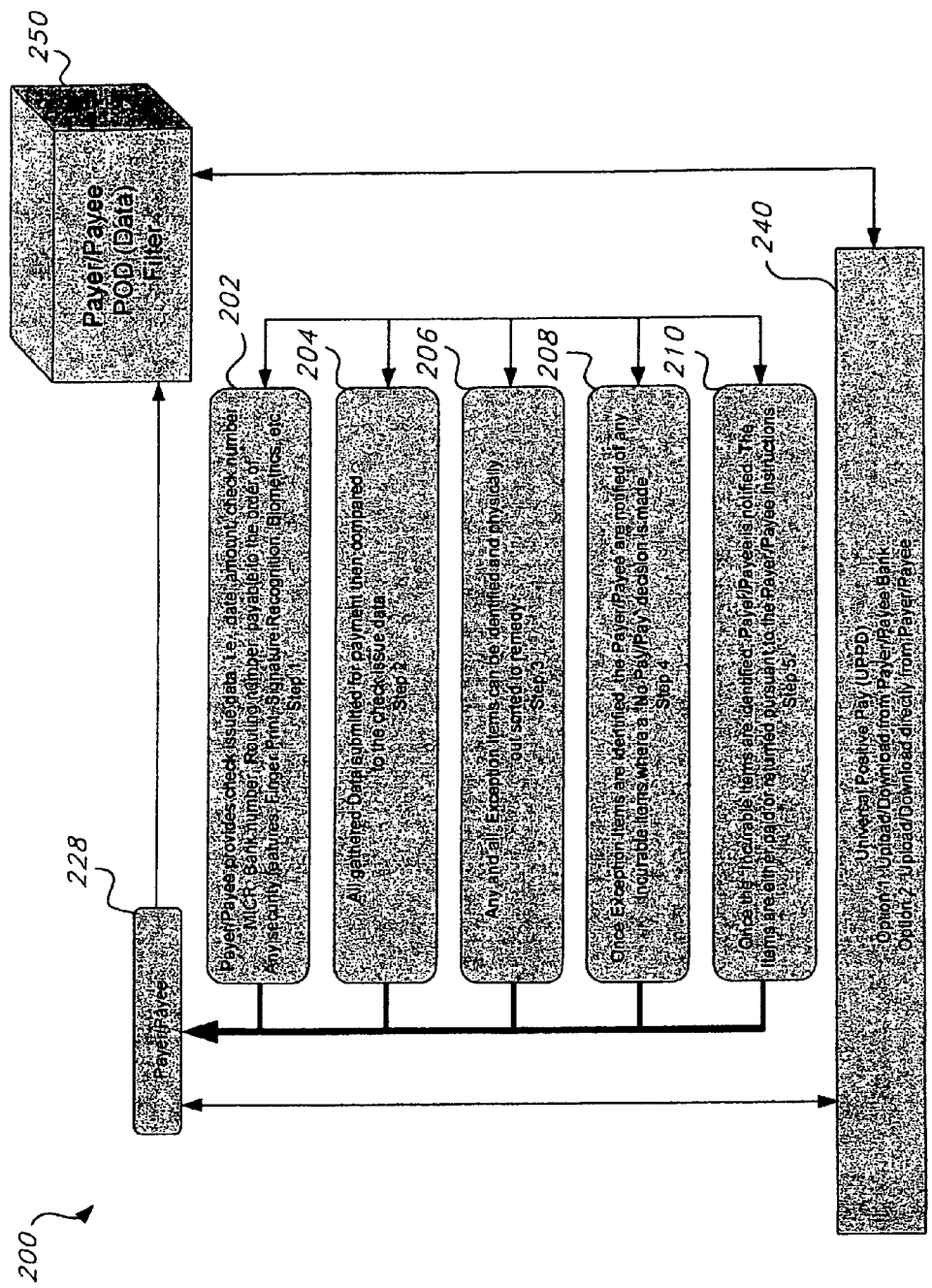
Figure 15F:
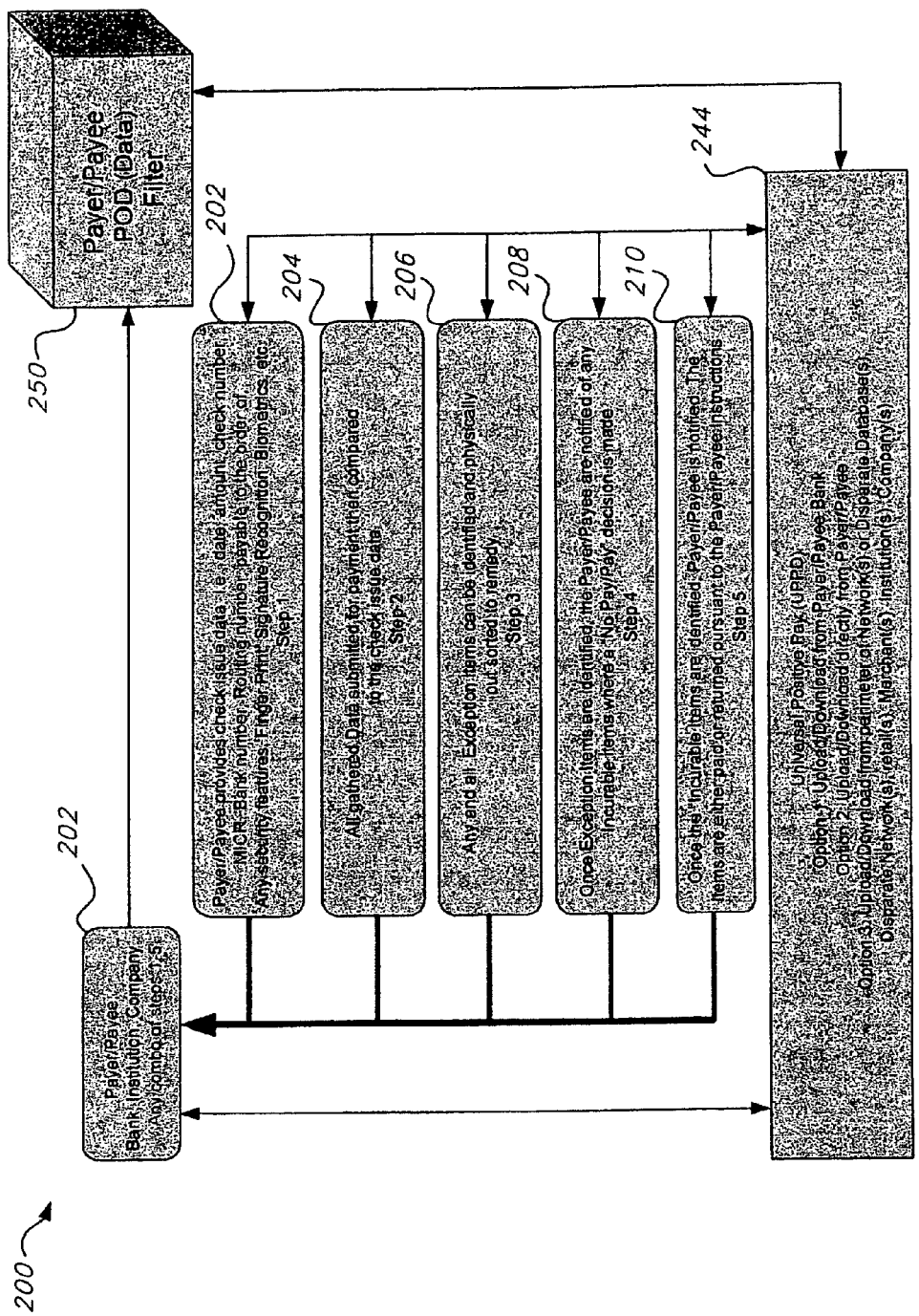
Figure 15G:
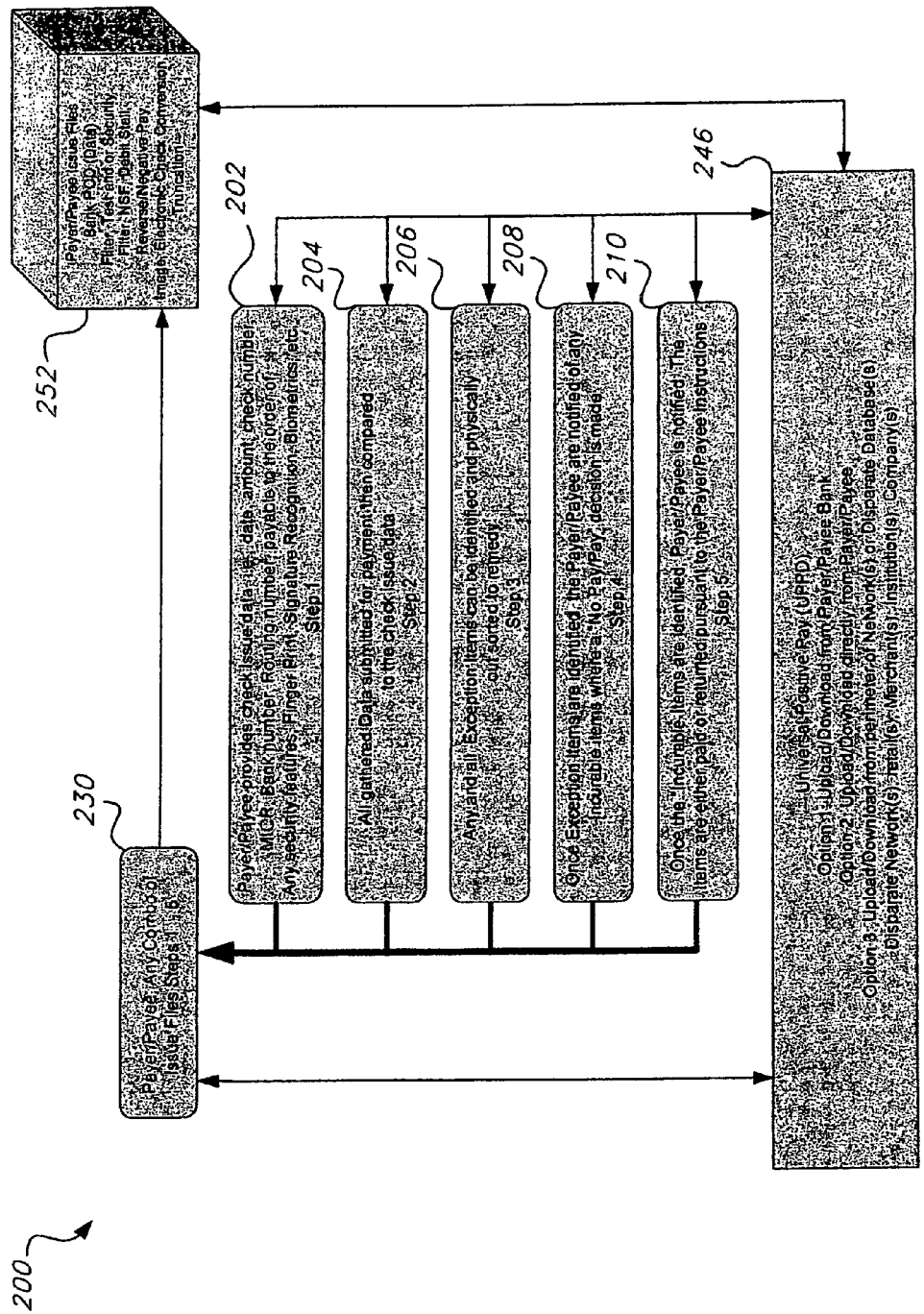
Figure 15I:
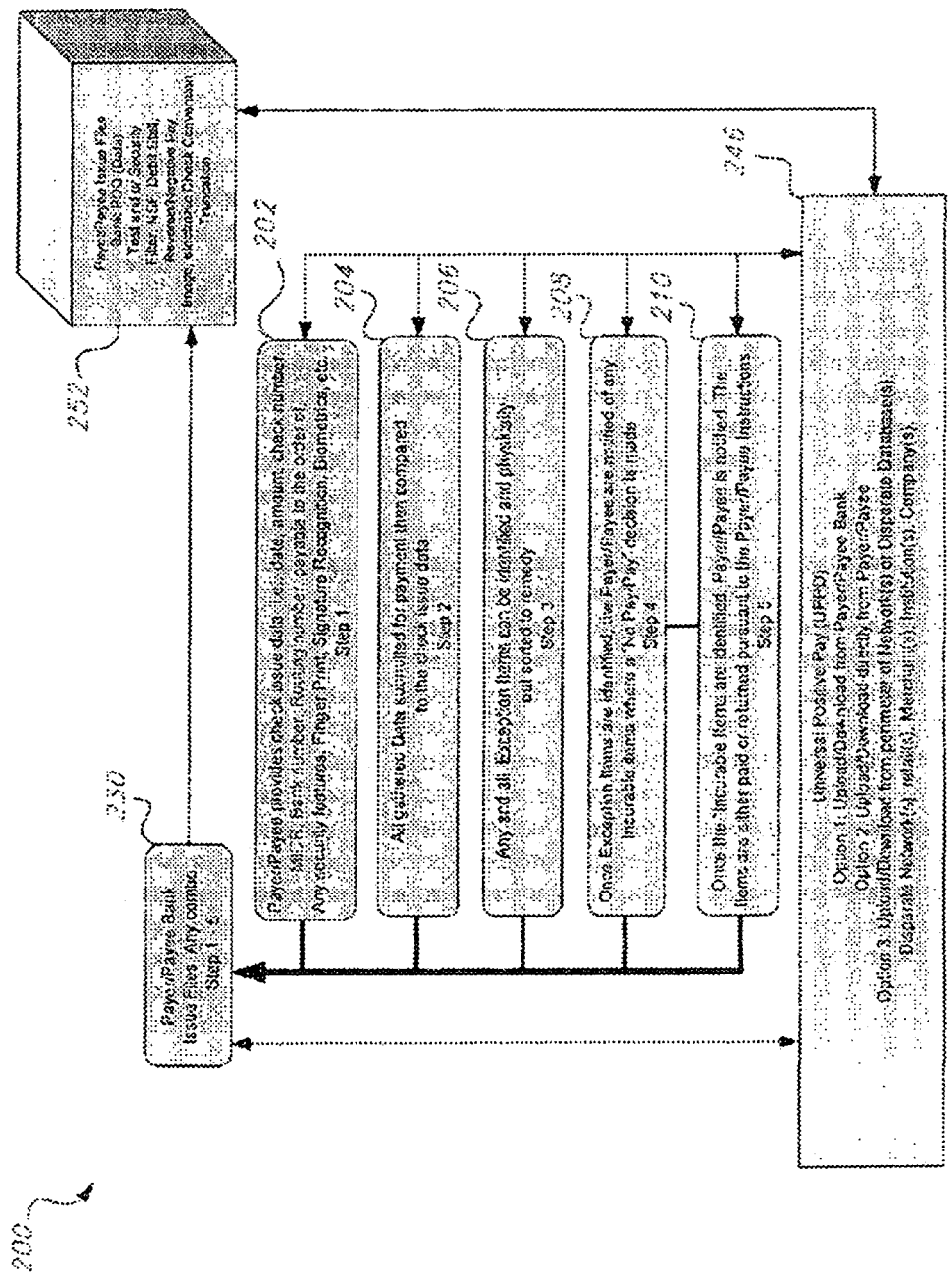
Figure 15J:
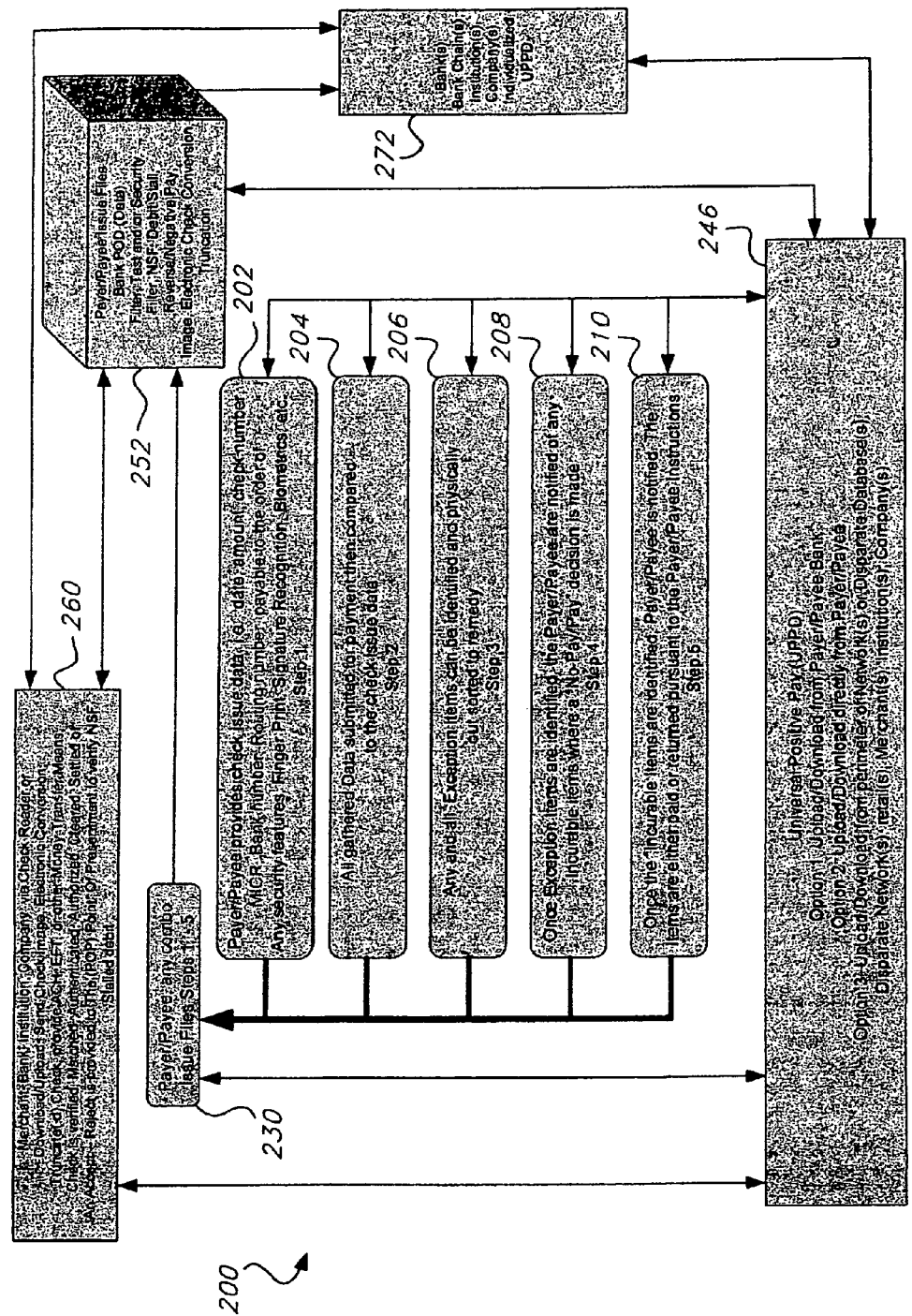
Figure 15K:
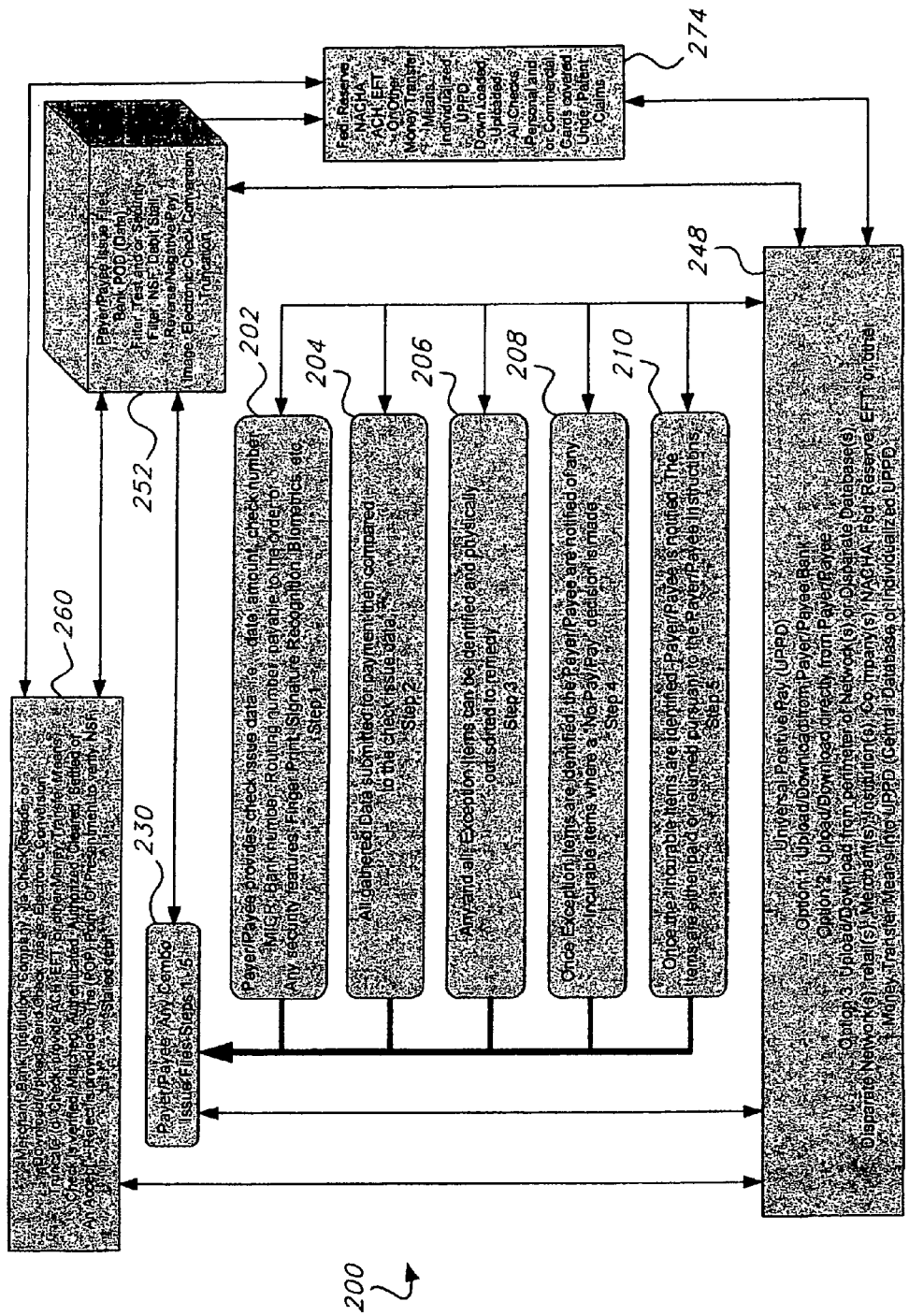

In FIGS. 15A and 15B, bank specific Positive Pay processes 200 are shown that may be used with the UPPD processes of the invention. Initially, the payer/payee provides check issue data 202 (e.g., the date, amount, check number, MICR, bank number, routing number, payable to the order of, any desirable security features, etc.). All gathered data is then submitted for payment and is then compared to the check issue data 204. Any and all exception items can be identified and physically out sorted to remedy 206. Once exception items are identified, the payer/payee are notified of any incurable items whole a NO PAY/PAY decision is made 208. Once the incurable items are identified, the payer/payee is notified. The items are either paid or returned pursuant to the payer/payee instructions 210. A payer/payee UPPD Plus Pay or Issue File is then created 220. The Issue File may then be uploaded to the UPPD database according to the invention. As shown in FIGS. 15C-15K, once the Issue File is uploaded to the UPPD, various UPPD options 240, 242, 244, 246 occur dependent on users 224, 226, 228, 230, 250, 252, 260, 270, 272, or 274.

Figure 16:
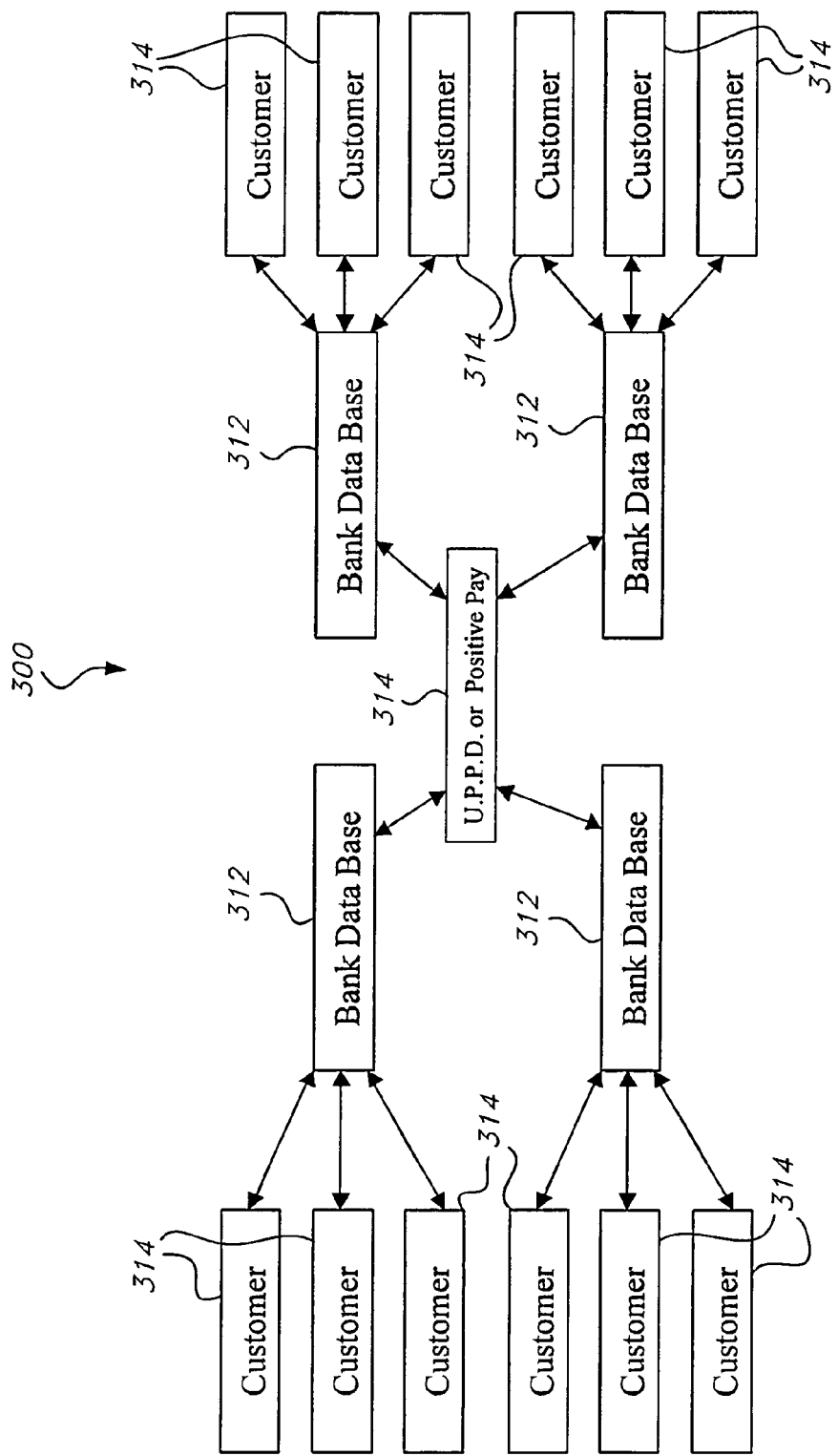
FIG. 16 is a functional diagram of a UPPD system according to the present invention.
Figure 17:
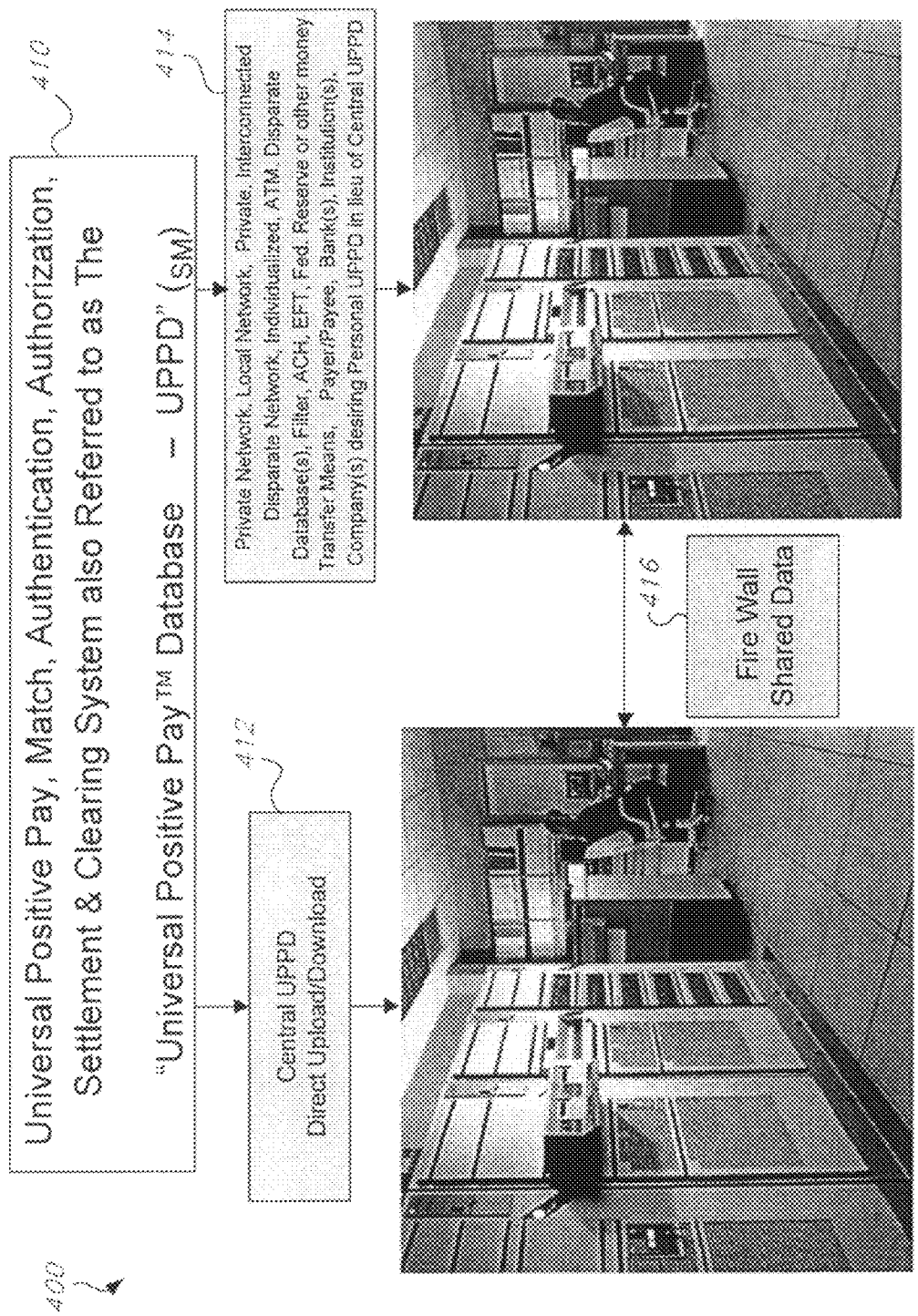
FIG. 17 is a functional diagram of a UPPD system according to the present invention.

The functional diagram 300 in FIG. 16 illustrates how the UPPD 314 is configured to interact with bank databases 312, and customers 314. The functional diagram 400 in FIG. 17 illustrates how the UPPD database 310 uploads and/or downloads data with users 412 and 414 that may be interconnected with a fire wall 416 of shared data.

Figure 18:
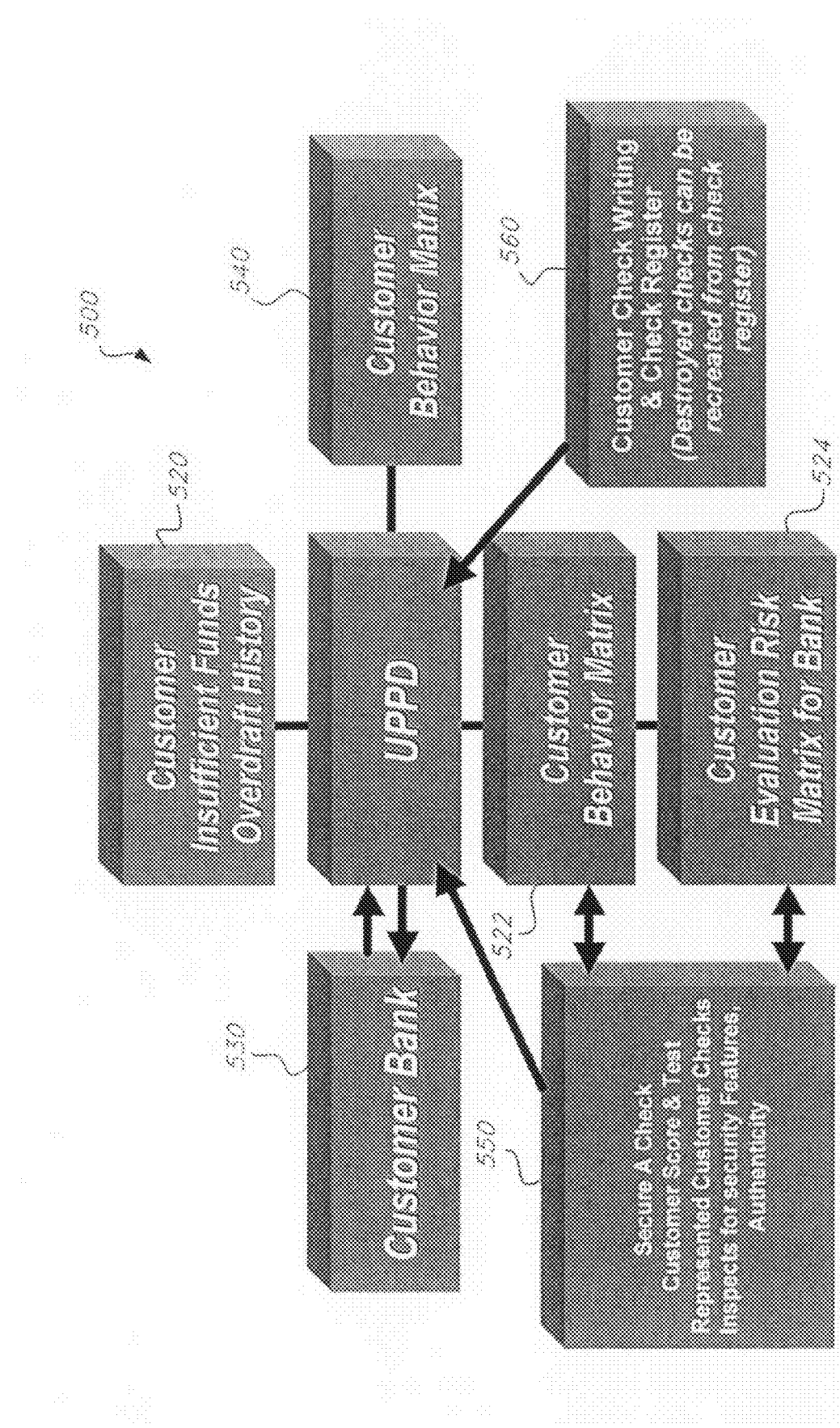
FIG. 18 is a functional diagram of a UPPD system according to the present invention.

The functional diagram 500 in FIG. 18 illustrates how the UPPD database 510 is interconnected with a customer insufficient funds overdraft history 520, a customer behavior matrix 522, a customer evaluation risk matrix for bank 524, a customer bank 530, a customer behavior matrix 540, secure a check software 550, and customer check writing and check register 560.

Figure 19:
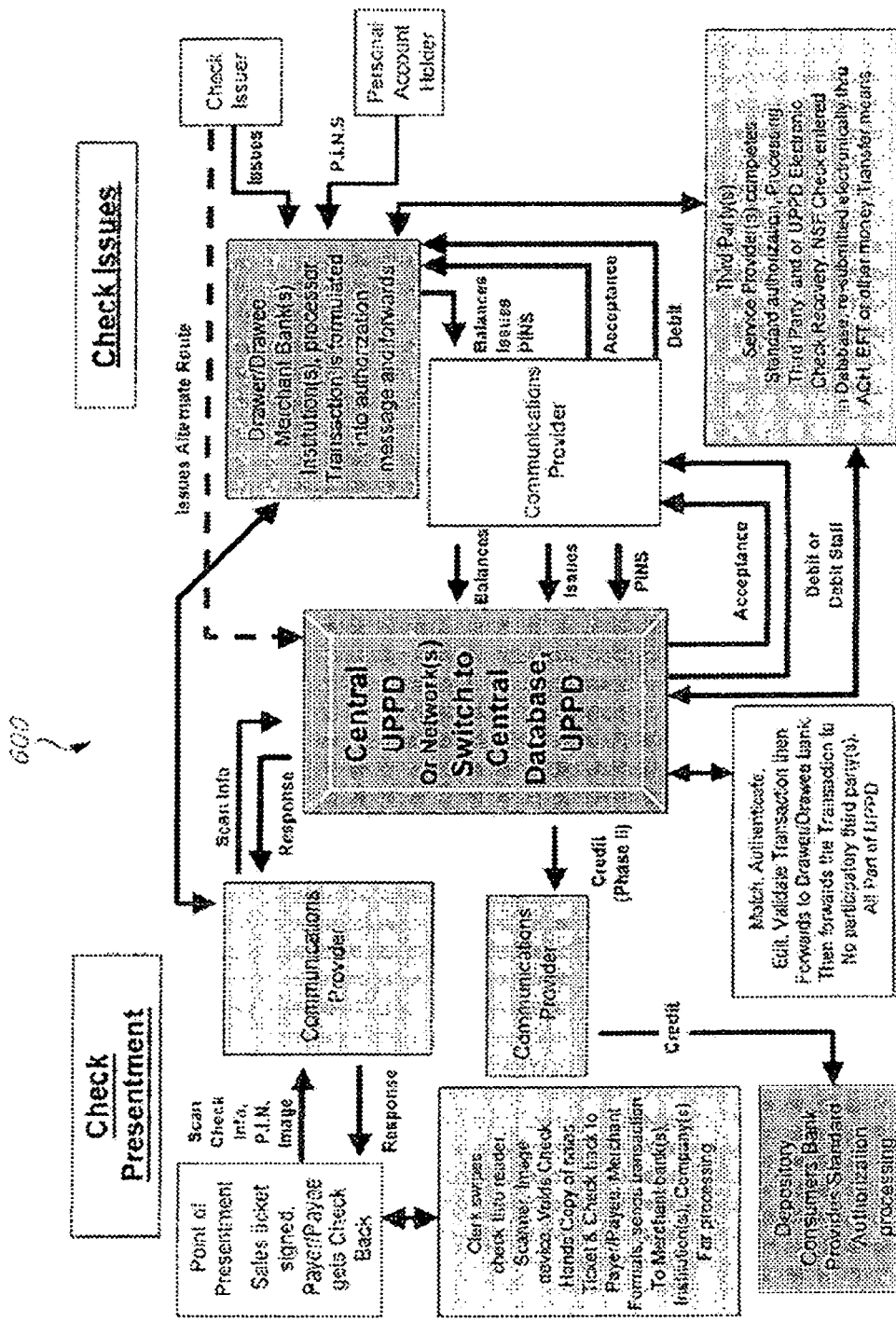
FIG. 19 is a functional diagram of a UPPD process according to the present invention.
Figure 21A:
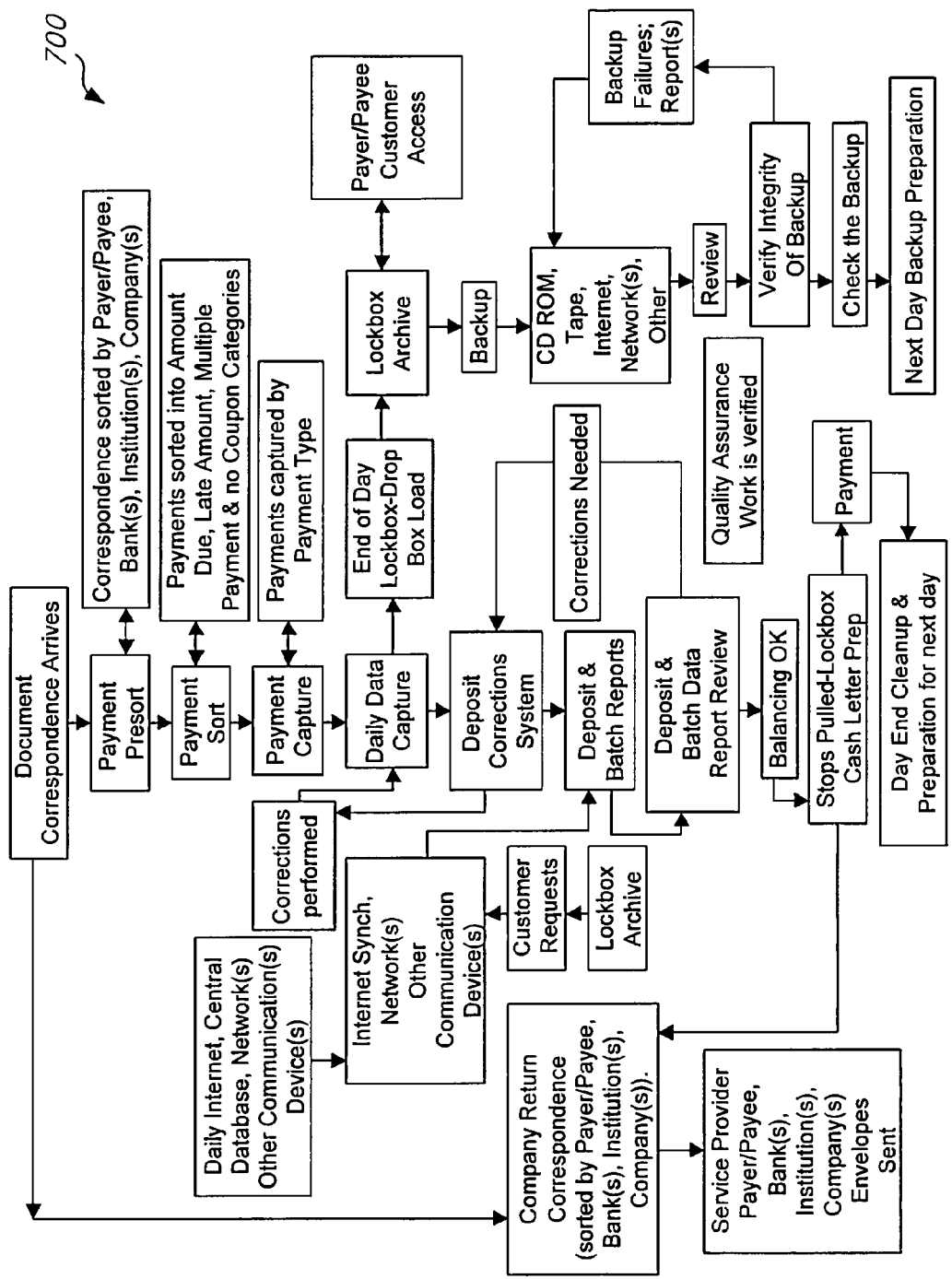
FIGS. 21A and 21B are flow charts of UPPD processes according to the present invention.

A functional diagram 600 of an electronic check recovery UPPD process according to the present invention is shown in FIG. 19. A functional diagram 1050 of a file download, lockbox, and drop box. UPPD process according to the present invention is shown in FIG. 20. Flow charts of file download, lockbox, and drip box UPPD processes 700 and 710 according to the present invention are shown, respectively, in FIGS. 21A and 21B.

Figure 21B:
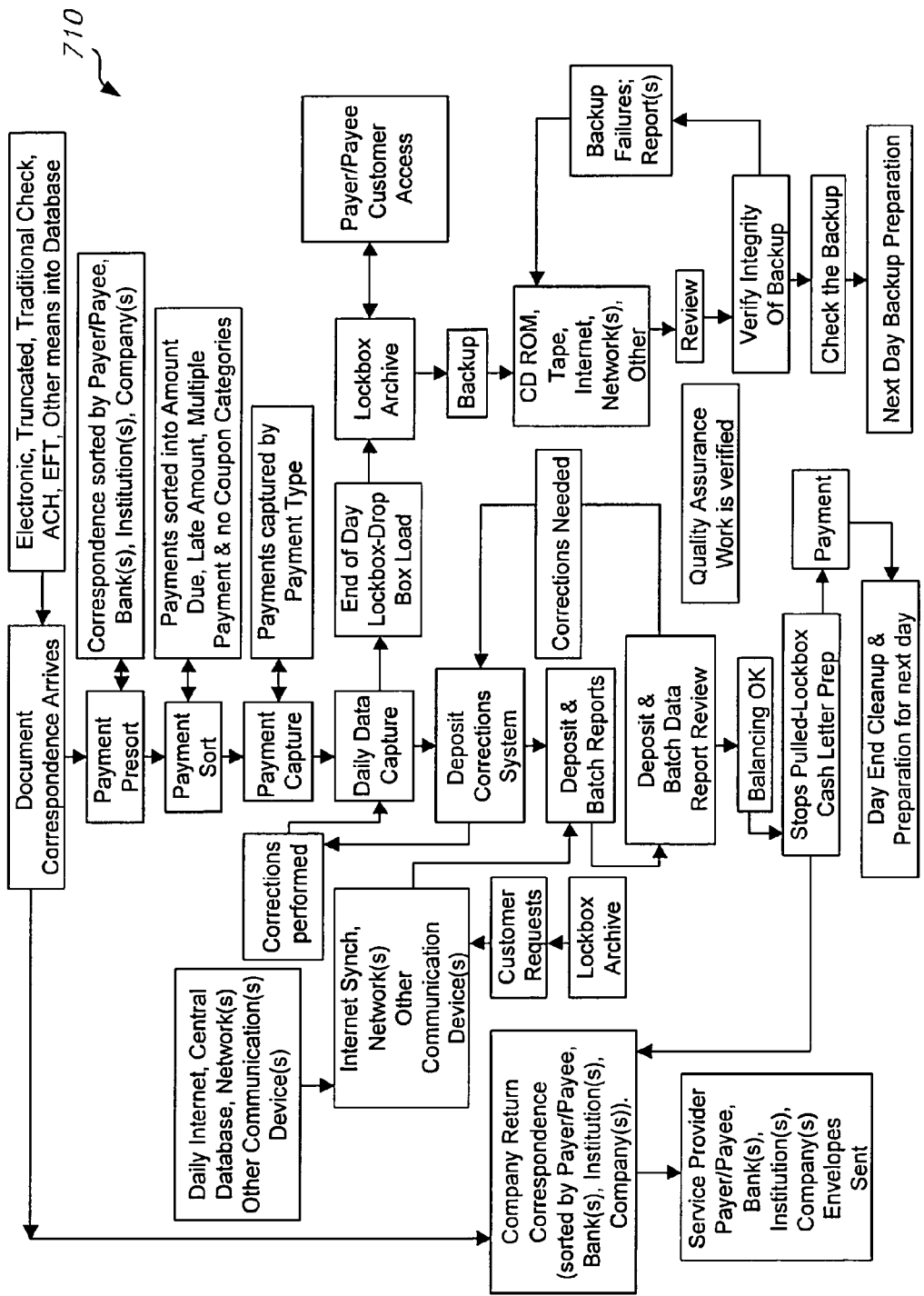

The file download, lockbox, and drip box UPPD process 700 illustrates how a document correspondence arrives and the payment is presorted. Correspondence may be presorted by the payer, the payee, bank(s), institution(s), company(s), etc. Electronic, truncated, traditional check, ACH, EFT, and/or other means may be utilized and/or considered as document correspondence, as shown in FIG. 21B. Correspondence may also be sorted based on the amount due, the late amount, multiple payment and/or no coupon categories. The payment is then captured by payment type and a daily capture is made. At the end of the day, a lockbox drop box may be loaded, and the lockbox may be archived.

Once the lockbox is archived the payer and/or payee customer has access to the lockbox archive. The lockbox archive may also be backed up on any magnetic, optic, and/or electronic memory device as desired, such as CD ROM, tape, the Internet, computer network(s), etc. The backups may be reviewed to verify the integrity of the back up. If a backup failure occurs and/or is detected, a failure report may be generated for users, and/or the backup may be corrected based on the failure. The final backup may be checked and backup preparation for the next day may be initiated.

The daily data capture may then be processed by a deposit correction system to determine whether corrections are required and/or desired in accordance with any predetermined conditions. Deposit and/or batch reports may be generated and may be reviewed. Deposits are then balanced and stops are pulled from the lockbox to enable cash letters to be prepared. Payment is then made and clean up and preparation is then made for the next day.

When document correspondence arrives, company return correspondence may be sorted by the payer, the payee, bank (s), institution(s), company(s), etc. The service provider, the payer, the payee, bank(s), institution(s), and/or company(s) envelope(s) may then be sent.

In FIGS. 22A, 22B, 22C, and 22D, bank specific Positive Pay processes 800 are shown in use with UPPD processes of the invention. Initially, the payer/payee provides check issue data 802 (e.g., the date, amount, check number, MICR, bank number, routing number, payable to the order of, any desirable security features, etc.). All gathered data is then submitted for payment and is then compared to the check issue data 804. Any and all exception items can be identified and physically out sorted to remedy 806. Once exception items are identified, the payer/payee are notified of any incurable items where a NO PAY/PAY decision is made 808. Once the incurable items are identified, the payer/payee is notified. The items are either paid or returned pursuant to the payer/payee instructions 810. A payer/payee UPPD Plus Pay or Issue File is then created 820. The Issue File may then be uploaded to a UPPD database according to the invention.

Figure 22A:
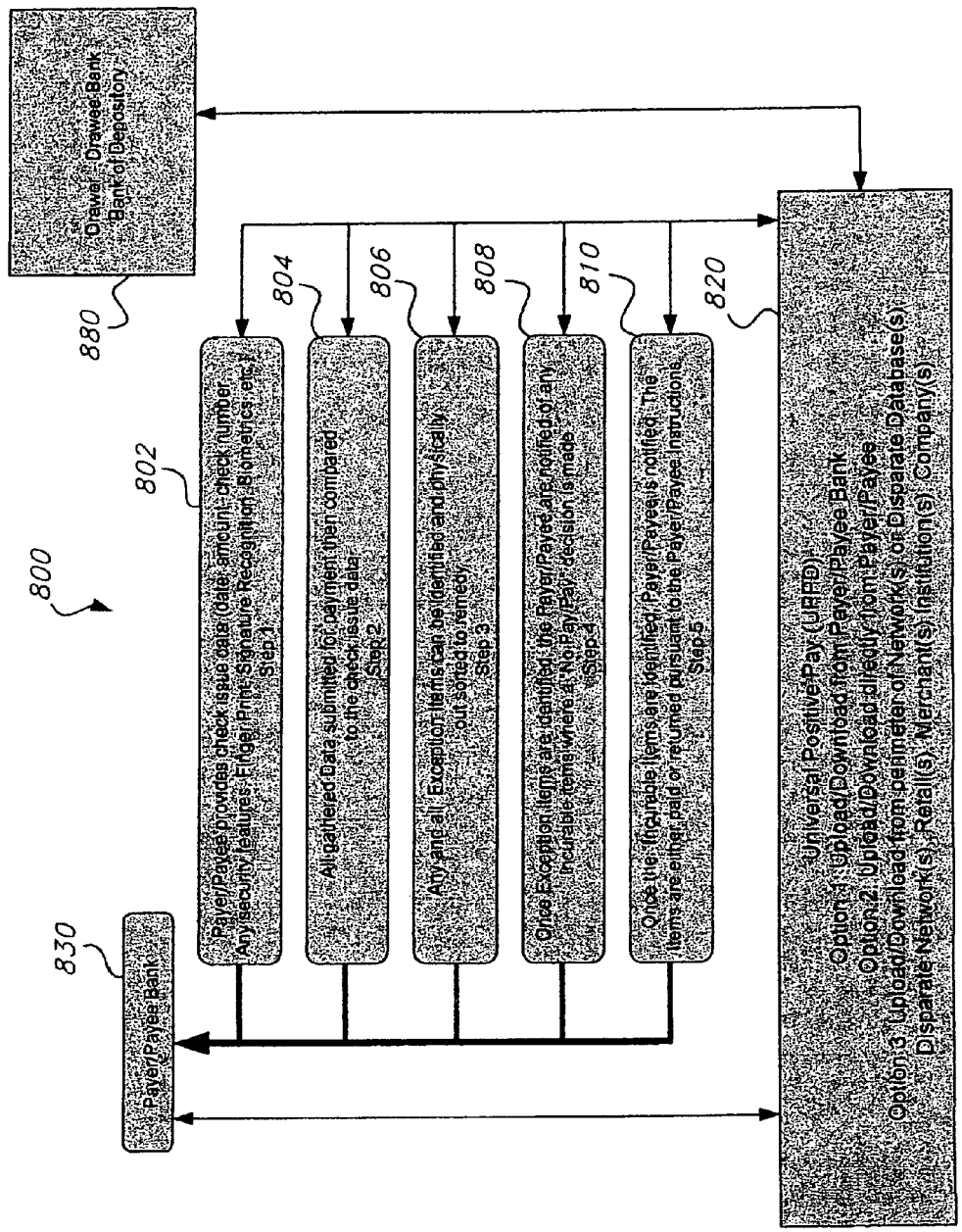
FIGS. 22A, 22B, 22C, and 22D are flow charts of UPPD processes according to the present invention.
Figure 22B:
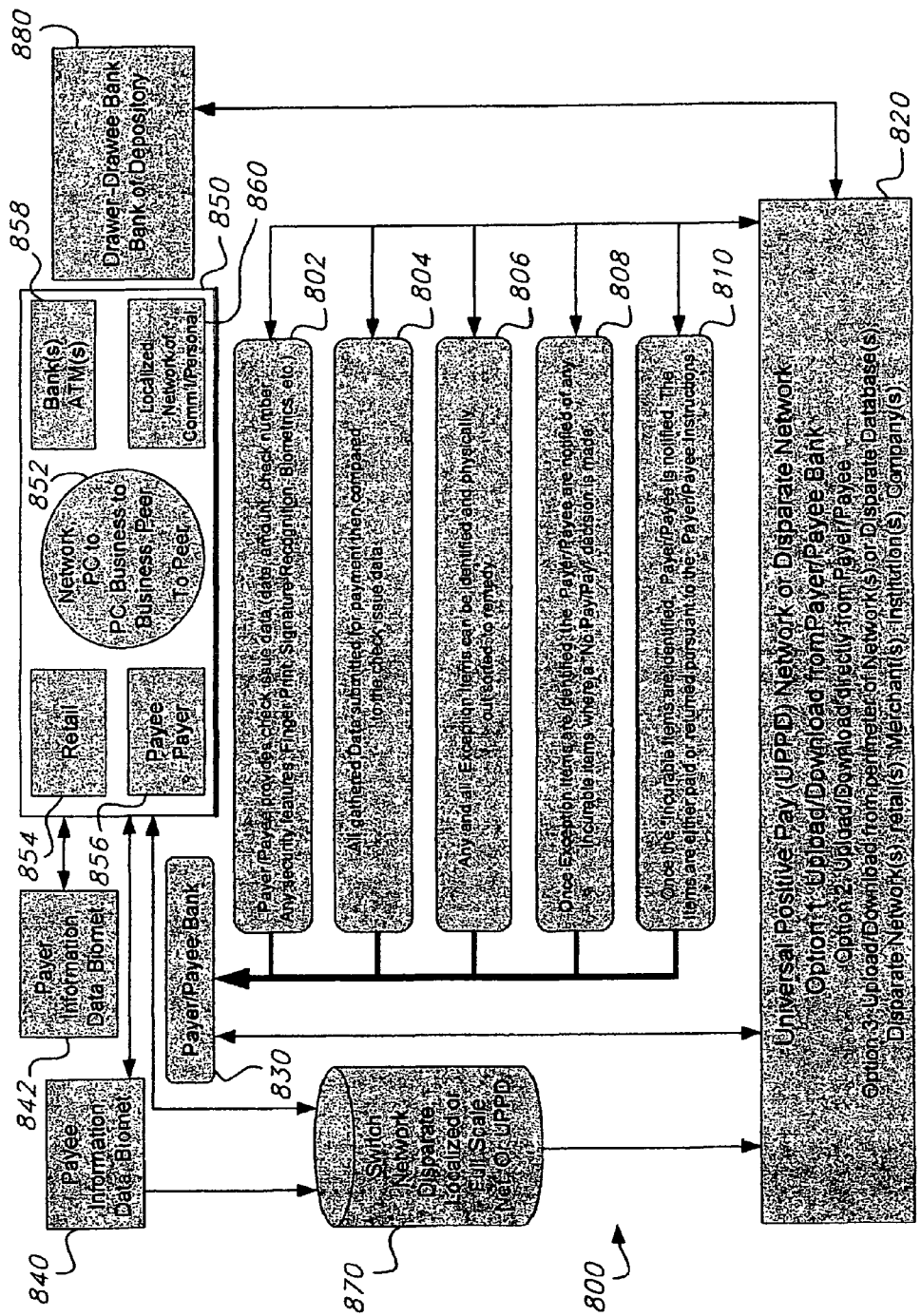
Figure 22C:
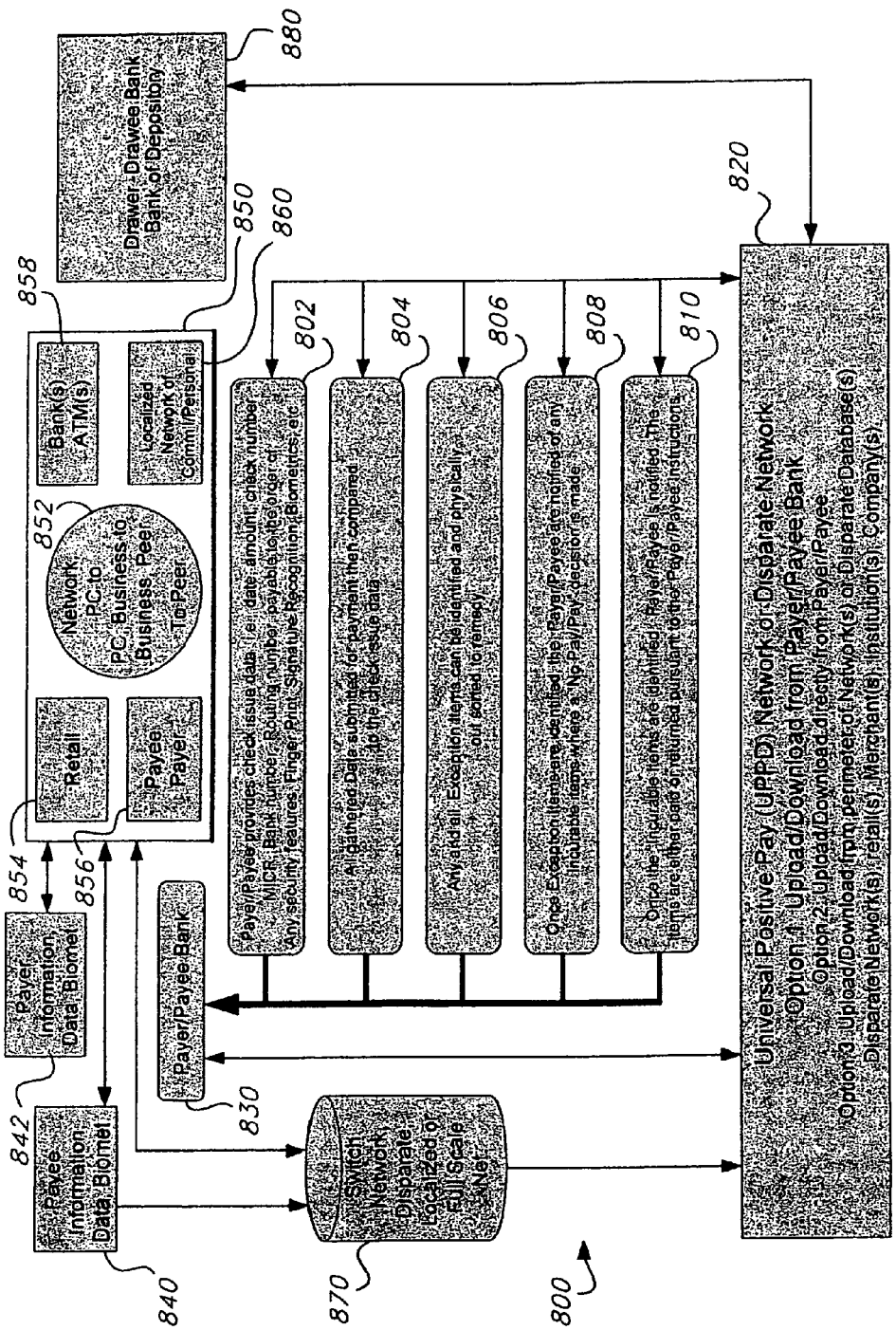
Figure 22D:
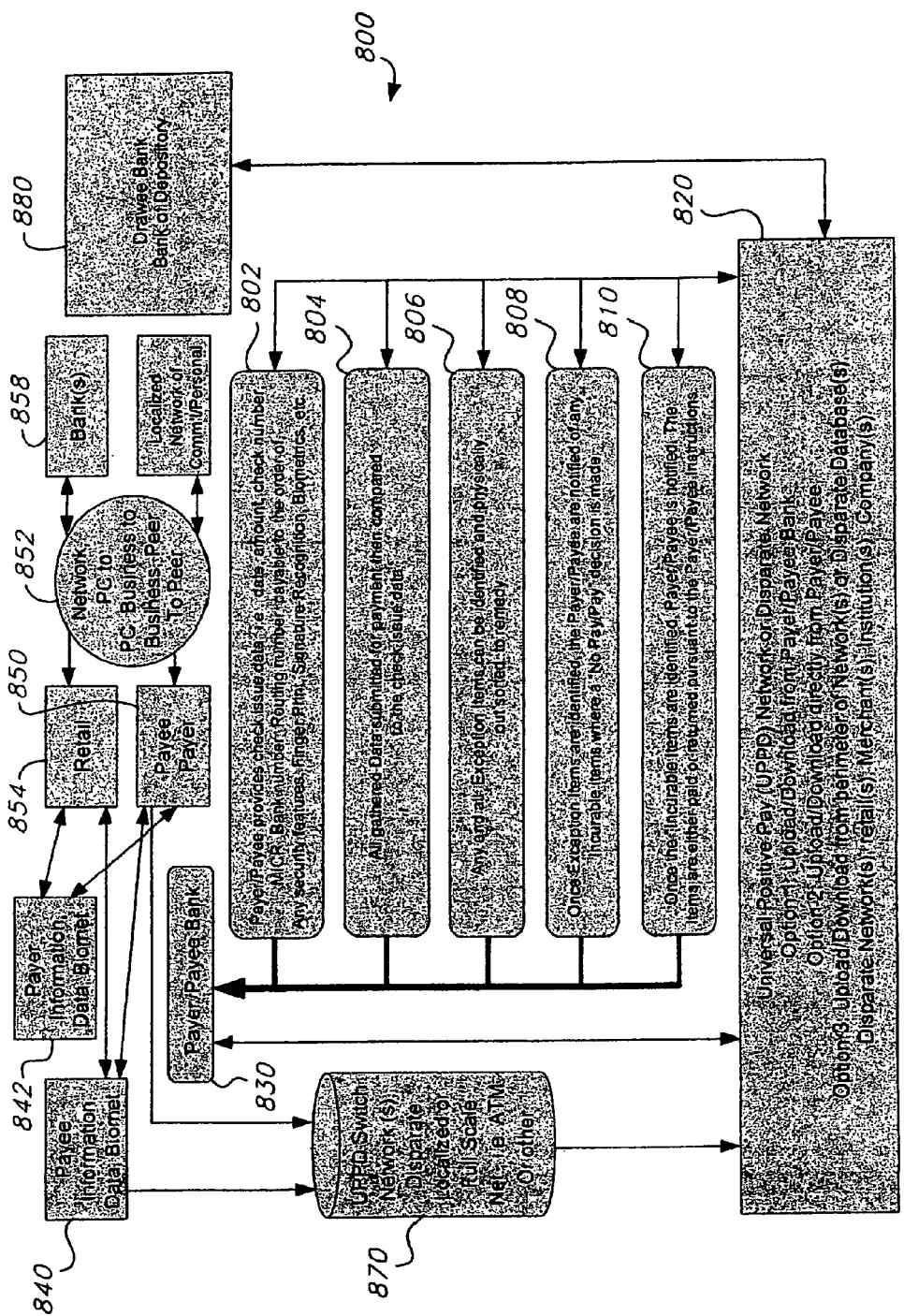

Once the Issue File is uploaded to the UPPD database 820, the Issue File may be uploaded and/or downloaded from the payer/payee bank, uploaded and/or directly from the payer/payee, uploaded and/or downloaded from a perimeter of network(s), disparate database(s), disparate network(s), retail(s), merchant(s), institution(s), and company(s). FIG. 22C shows how any and/or all networks may be interconnected.

Figure 23A:
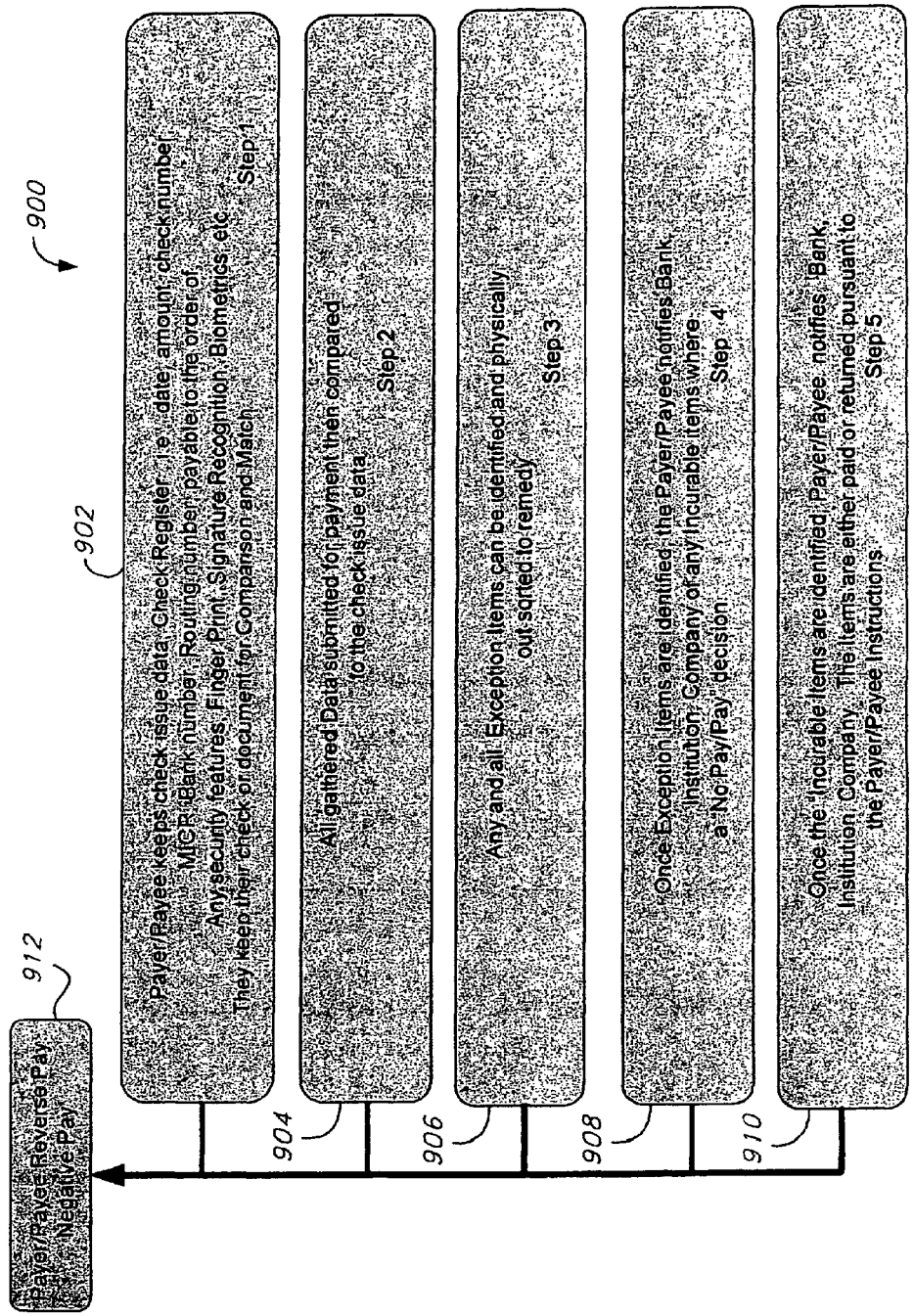
FIGS. 23A, 23B, 23C, 23D, and 23E are flow charts of UPPD processes according to the present invention.
Figure 23B:
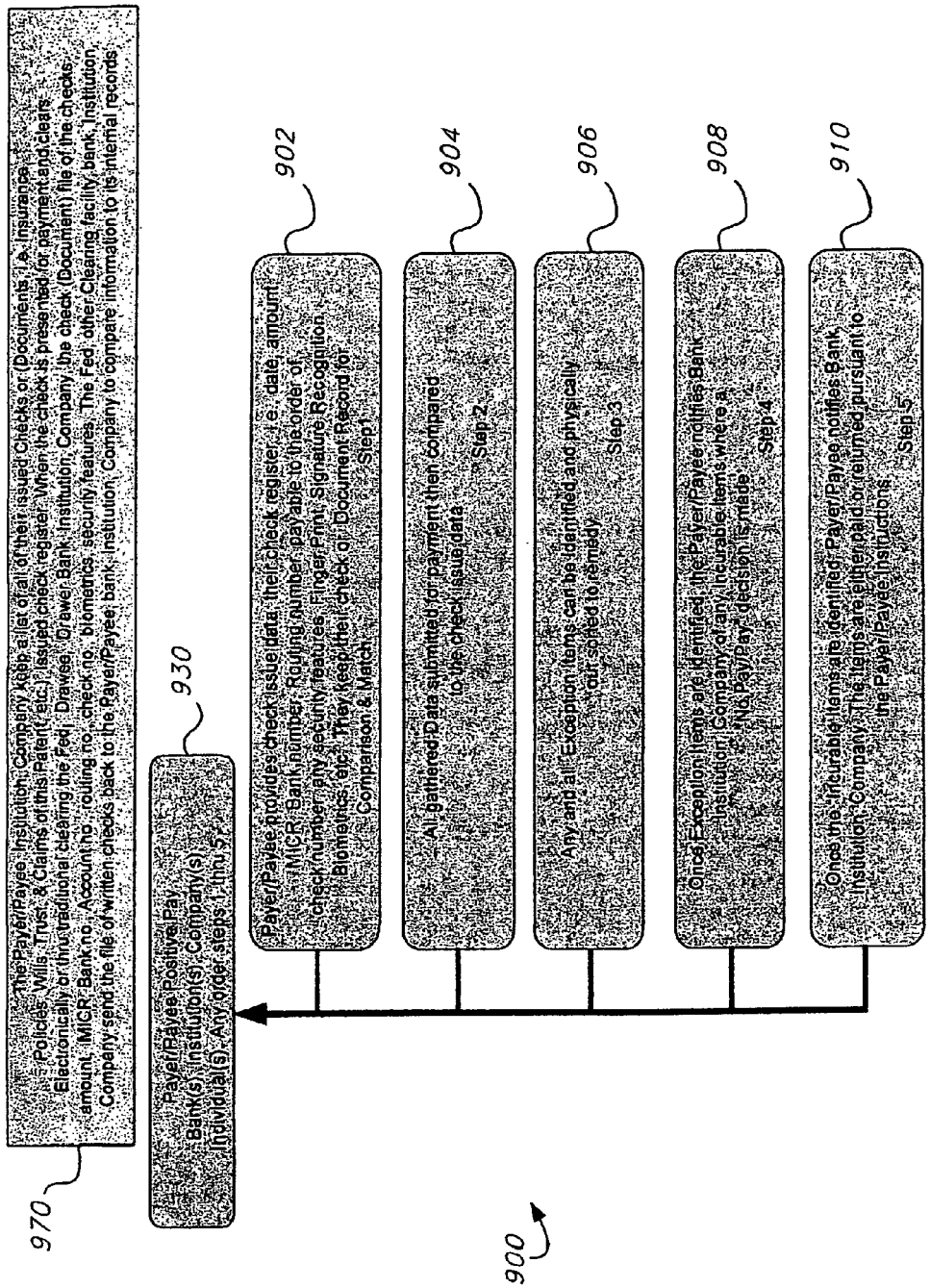
Figure 23C:
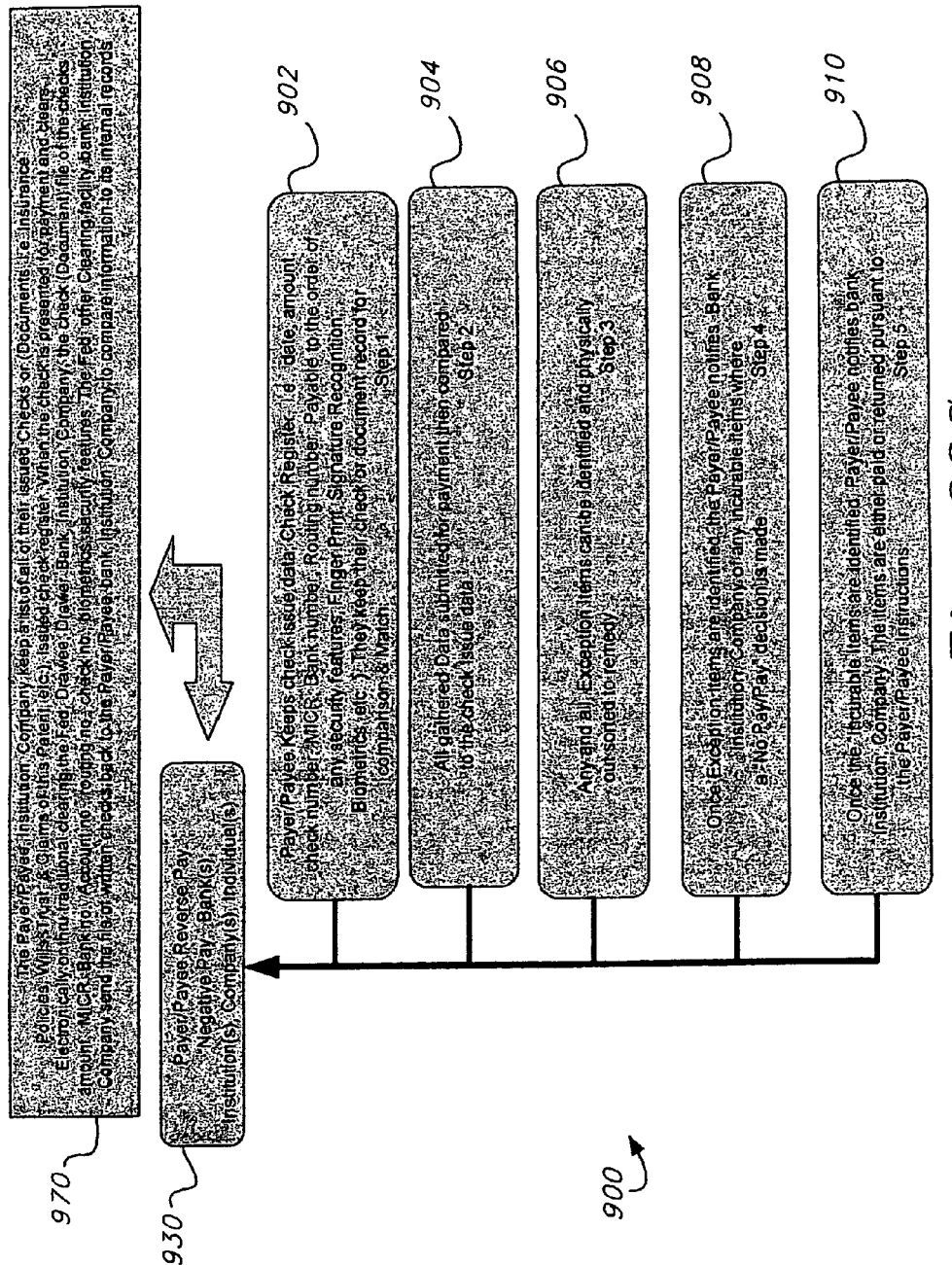
Figure 23D:
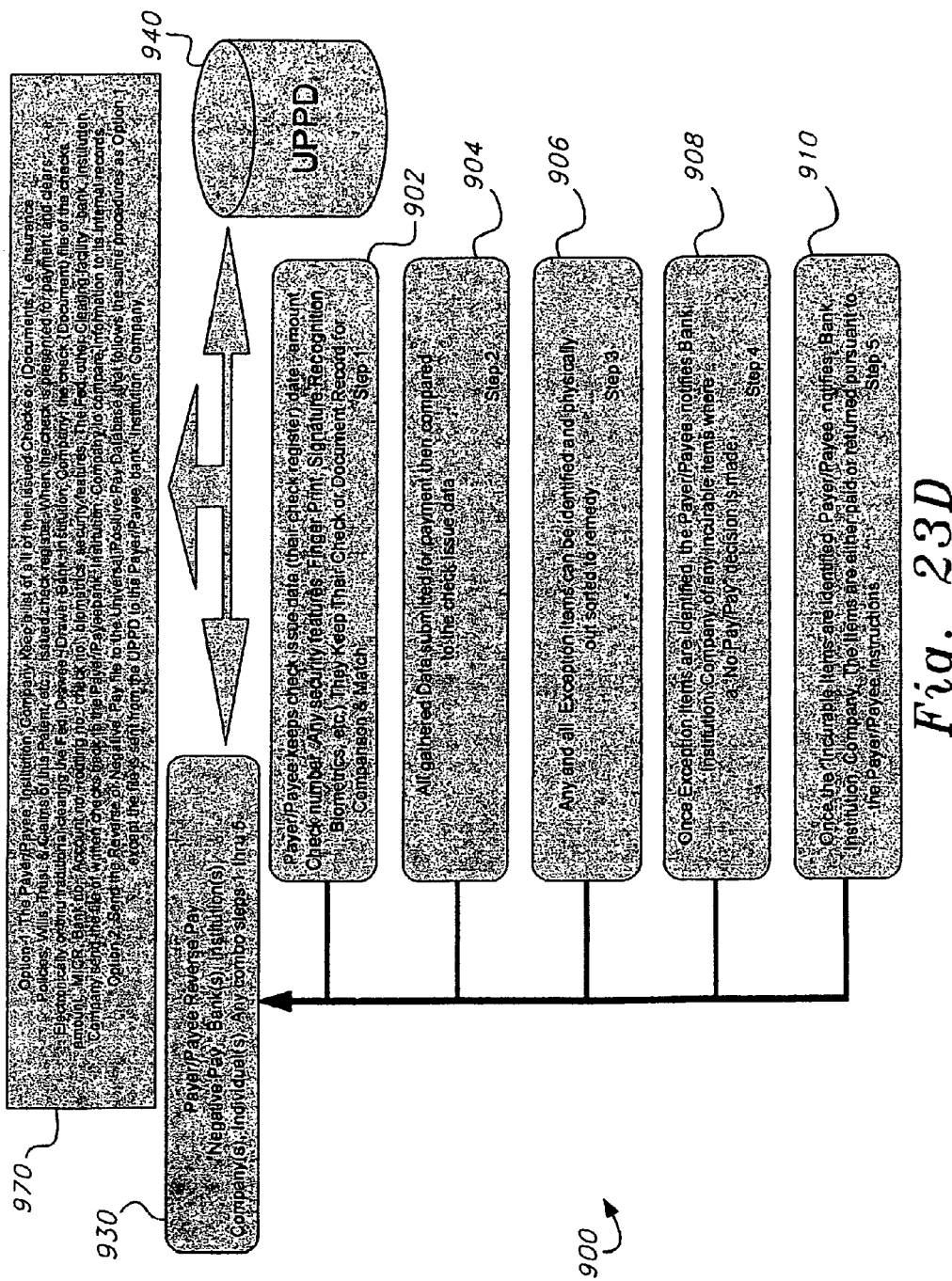
Figure 23E:
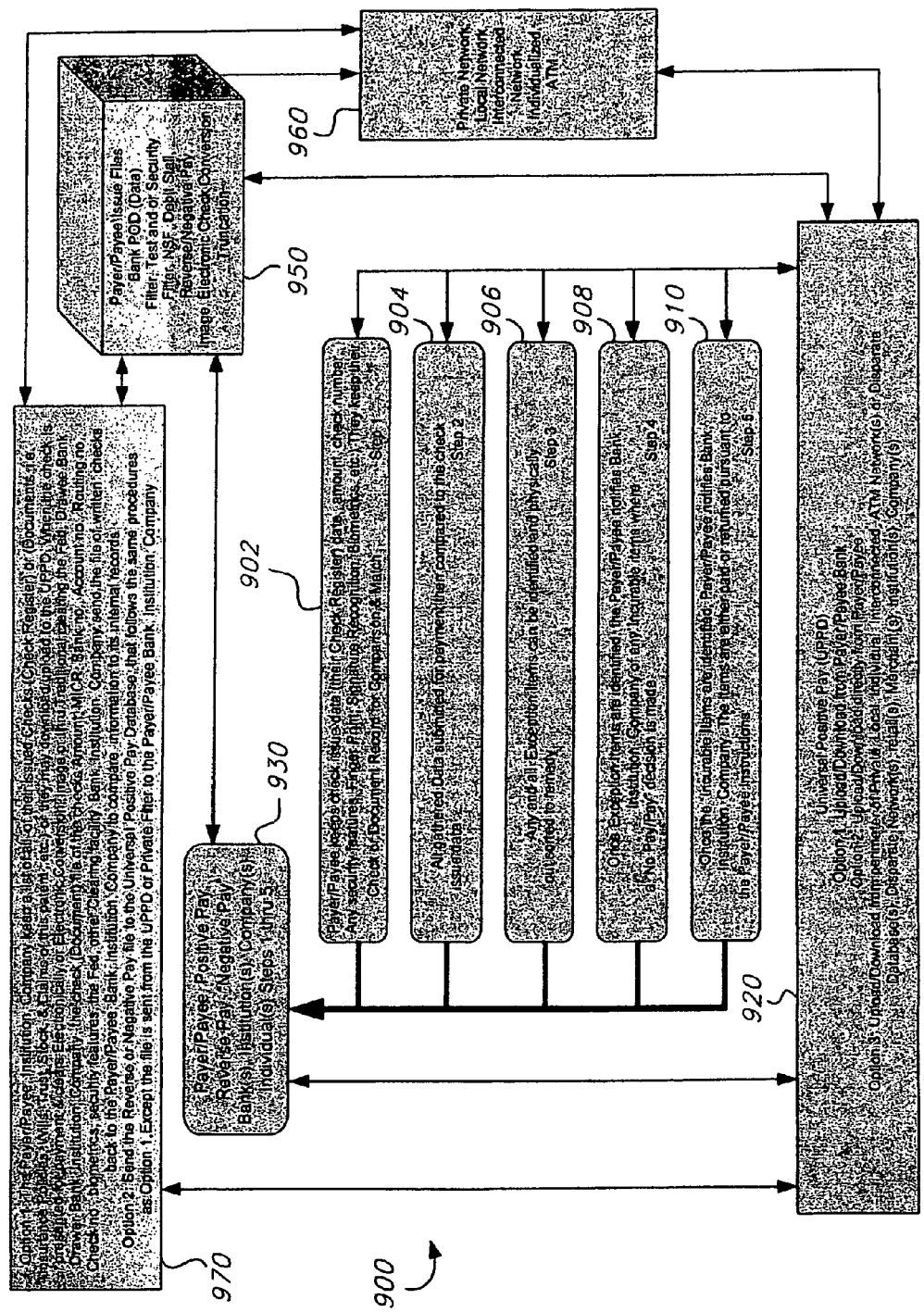

Users may include the payer/payee bank 830, retail(s) 854, the payee/payer 856, bank(s), ATM(s), localized network of commercial/personal entities 860, the drawer/drawer bank 880. Data may include payee information, data, biometrics 840, payer information, data, biometrics 842, etc. Interconnection may occur via a network, PC to PC, business to business, peer to peer 852, a switch network, disparate, localized, or full scale network 870. FIGS. 23A, 23B, 23C, 23D, and 23E show flow charts 900 of UPPD processes according to the present invention. Initially, the payer/payee provides check issue data 902 (e.g., the date, amount, check number, MICR, bank number, routing number, payable to the order of, any desirable security features, etc.). All gathered data is then submitted for payment and is then compared to the check issue data 904. Any and all exception items can be identified and physically out sorted to remedy 906. Once exception items are identified, the payer/payee are notified of any incurable items where a NO PAY/PAY decision is made 908. Once the incurable items are identified, the payer/payee is notified. The items are either paid or returned pursuant to the payer/payee instructions 910. FIG. 23B shows how UPPD transaction records of financial transactions may correspond to any type of transaction account, such as a checking account, a savings account, a credit card account, a money market account, a liability account, a bills/payable account, an asset account, an invoice/receivables account, a cash account, an insurance policy account, an account for a will, an account for a trust, or any other financial account. In a similar manner, FIG. 23C shows how UPPD processes for use with reverse pay situations that deal with transaction records of financial transactions corresponding to any type of transaction account. FIG. 23D shows UPPD processes for an type of situation (e.g., Positive Pay, reverse pay, negative pay, etc.). FIG. 23E illustrates UPPD processes for networks with ATM systems.

The UPPD processes may be configured to receive origination attributes associated with a transaction instrument to the UPPD database and store the received origination attributes in the UPPD database. This enables the birth of the transaction instrument, e.g., the document, official item, debit card, debit check, smartcard, check(s) for the payer/payee, drawer/drawee bank(s), institution(s), company(s), origination attributes associated with the origination of the financial instrument to be uploaded from a paper mill, manufacturer, distributor, etc. The origination attributes can include the date of creation, the time of creation, security features, biometrics, plant location, the pressman, the date shipped, etc., and provides a payer/payee standing file residing within the UPPD database that is readable by all parties. Generally, the origination attributes may be an origination entity, an origination location, an origination date, an origination time, security features biometrics, origination personnel, origination shipping date, etc. Transaction records for any financial transaction may also be processed with the UPPD software.

Figure 24A:
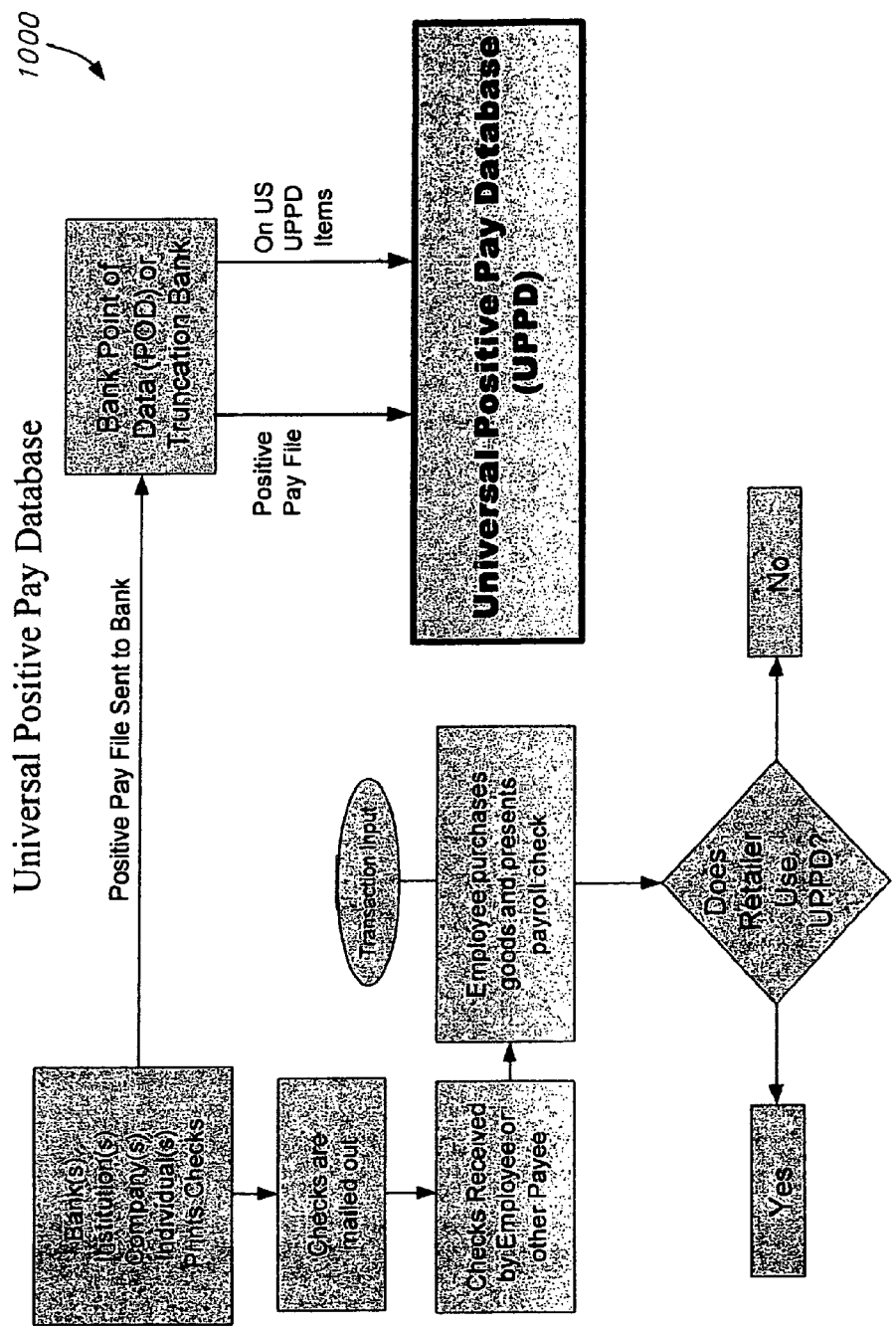
FIGS. 24A, 24B, 24C, 24D, 24E, and 24F are functional diagrams of UPPD processes according to the present invention.
Figure 24B:
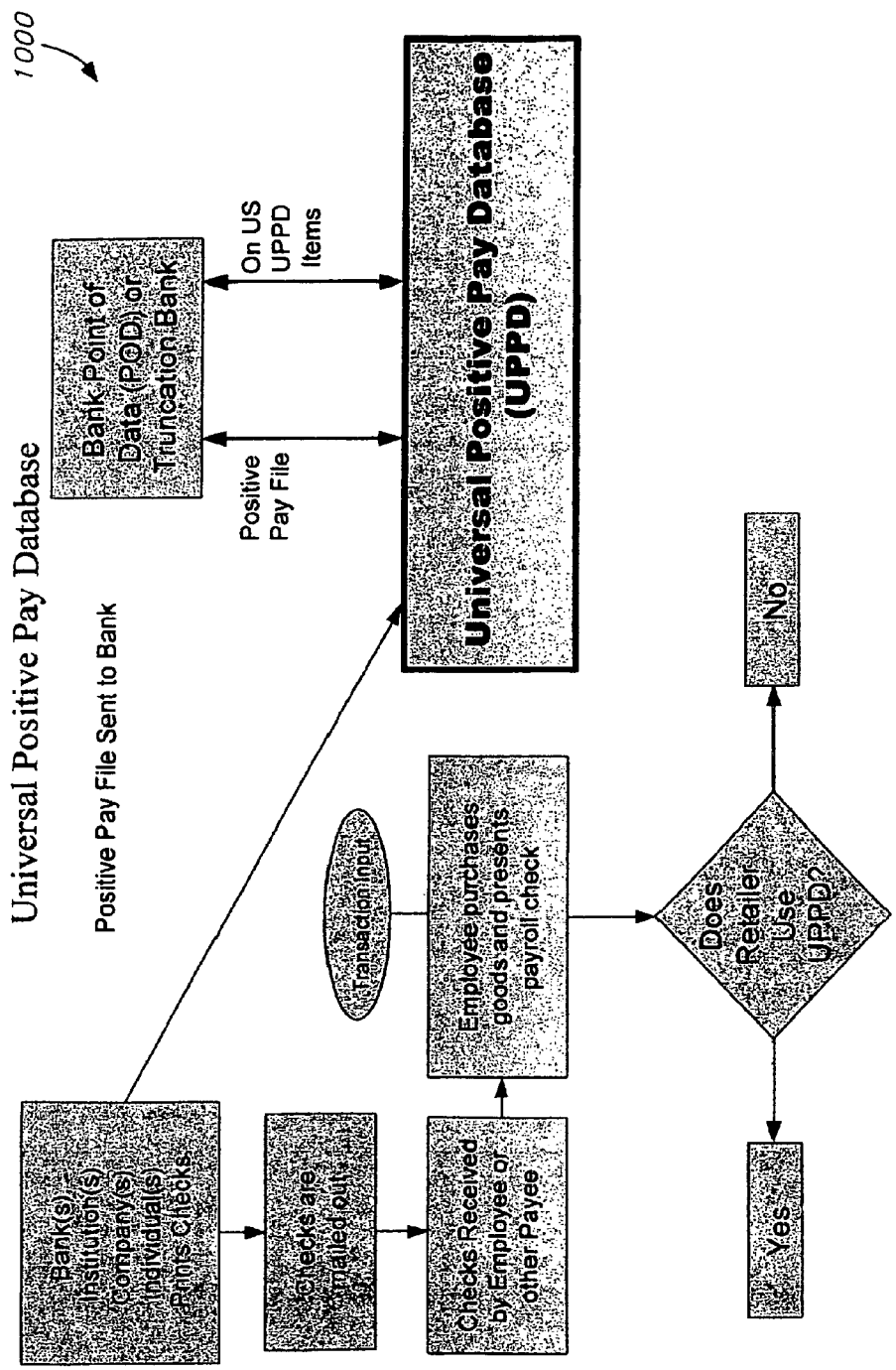
Figure 24C:
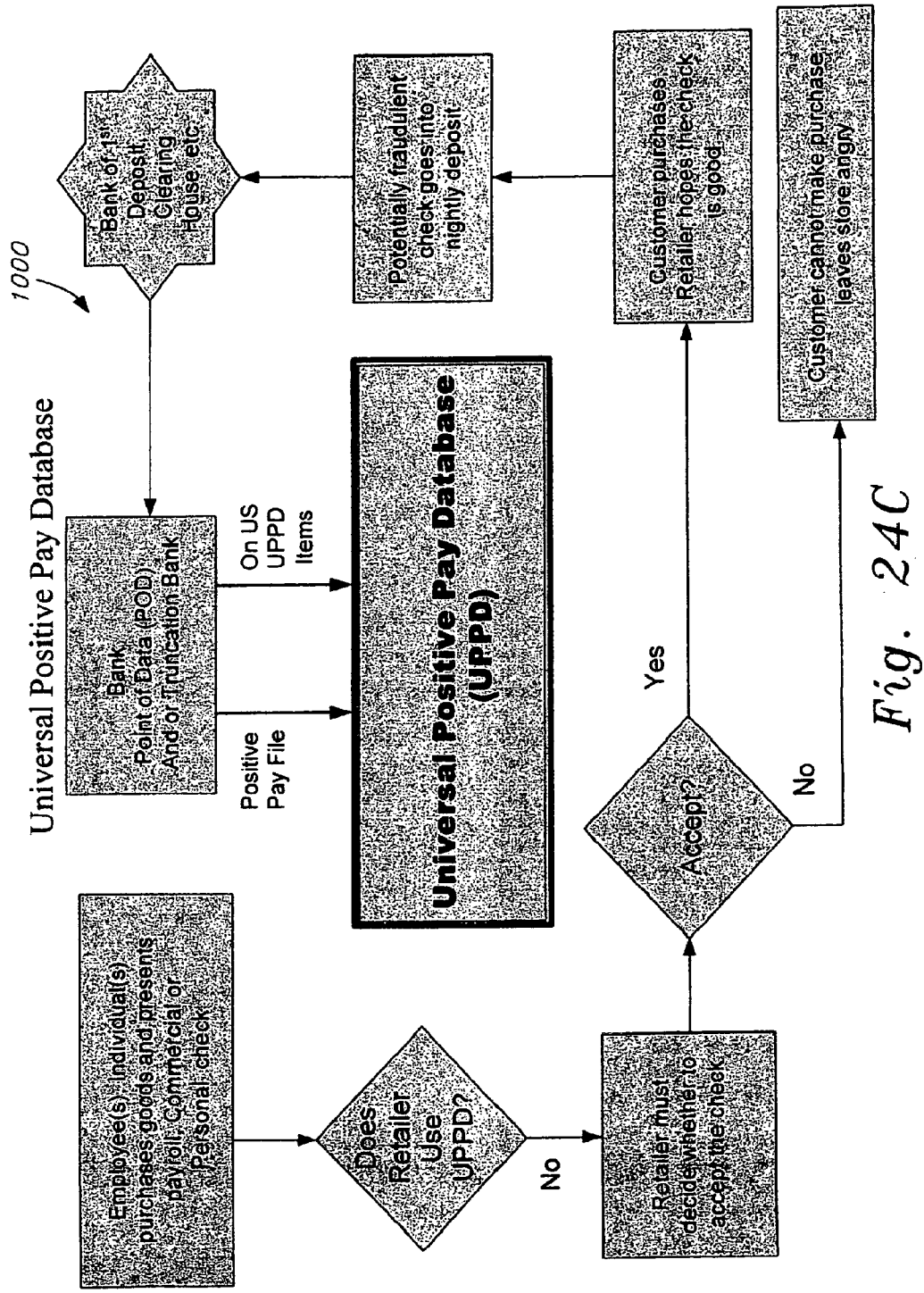
Figure 24D:
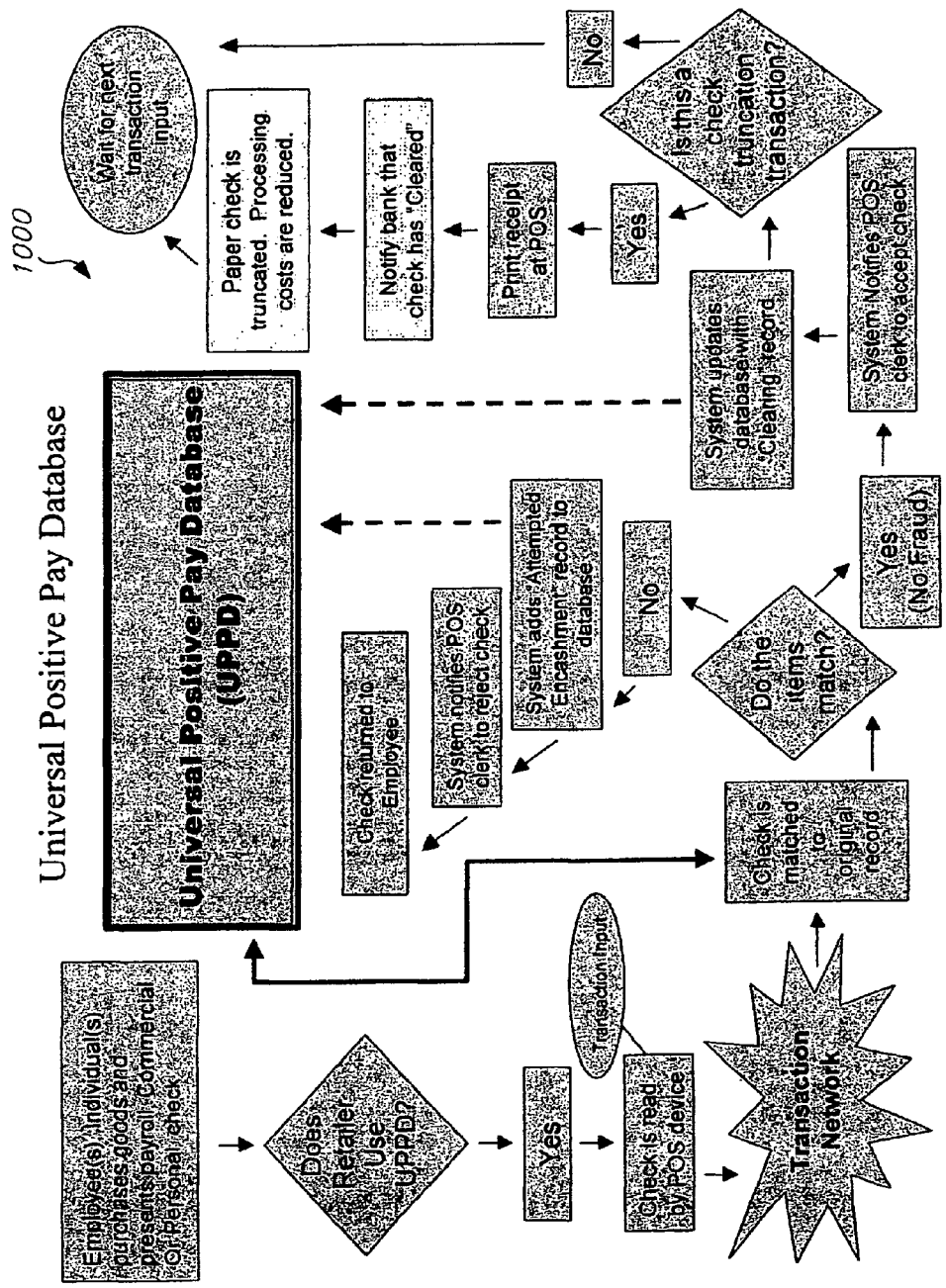
Figure 24E:
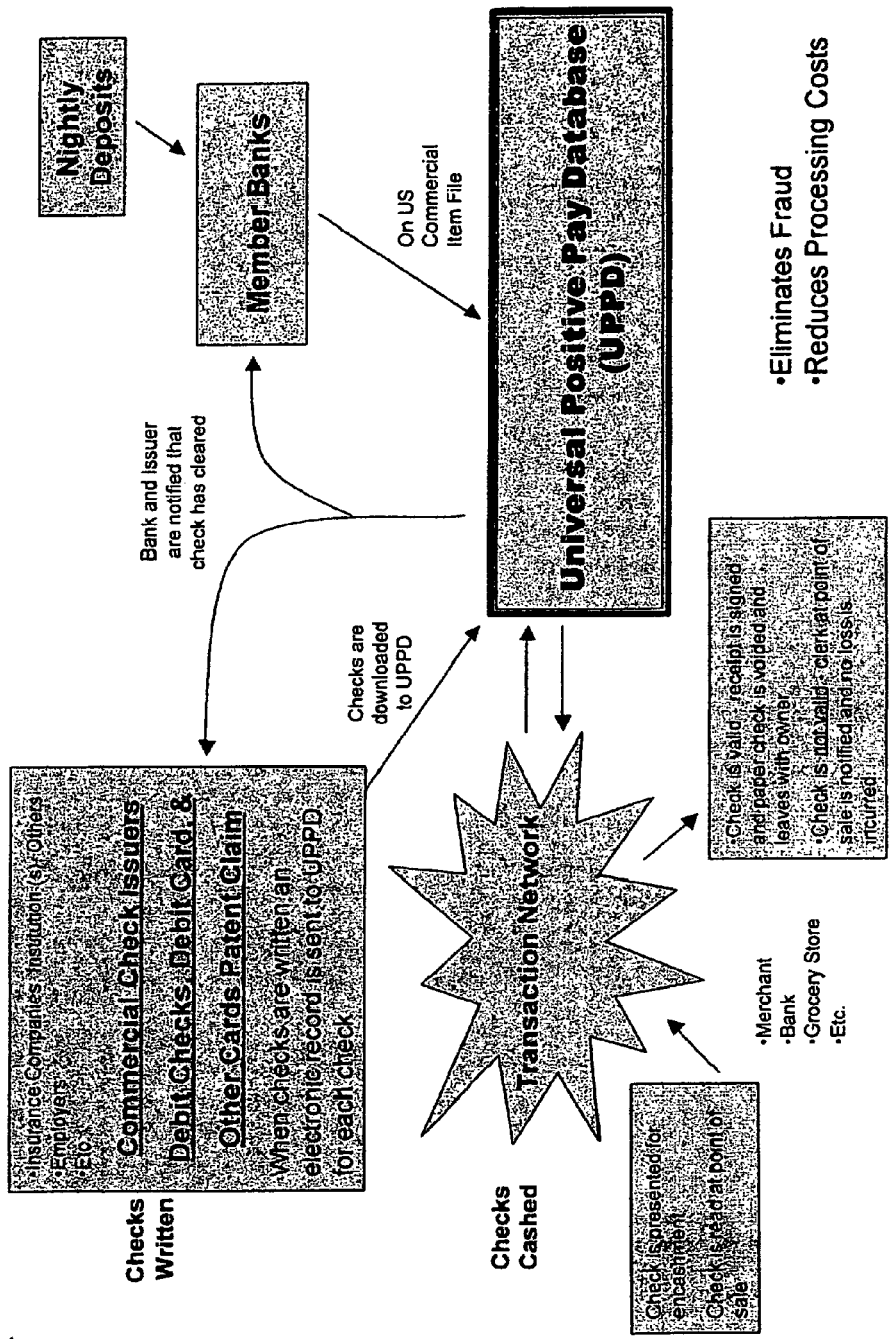
Figure 24F:
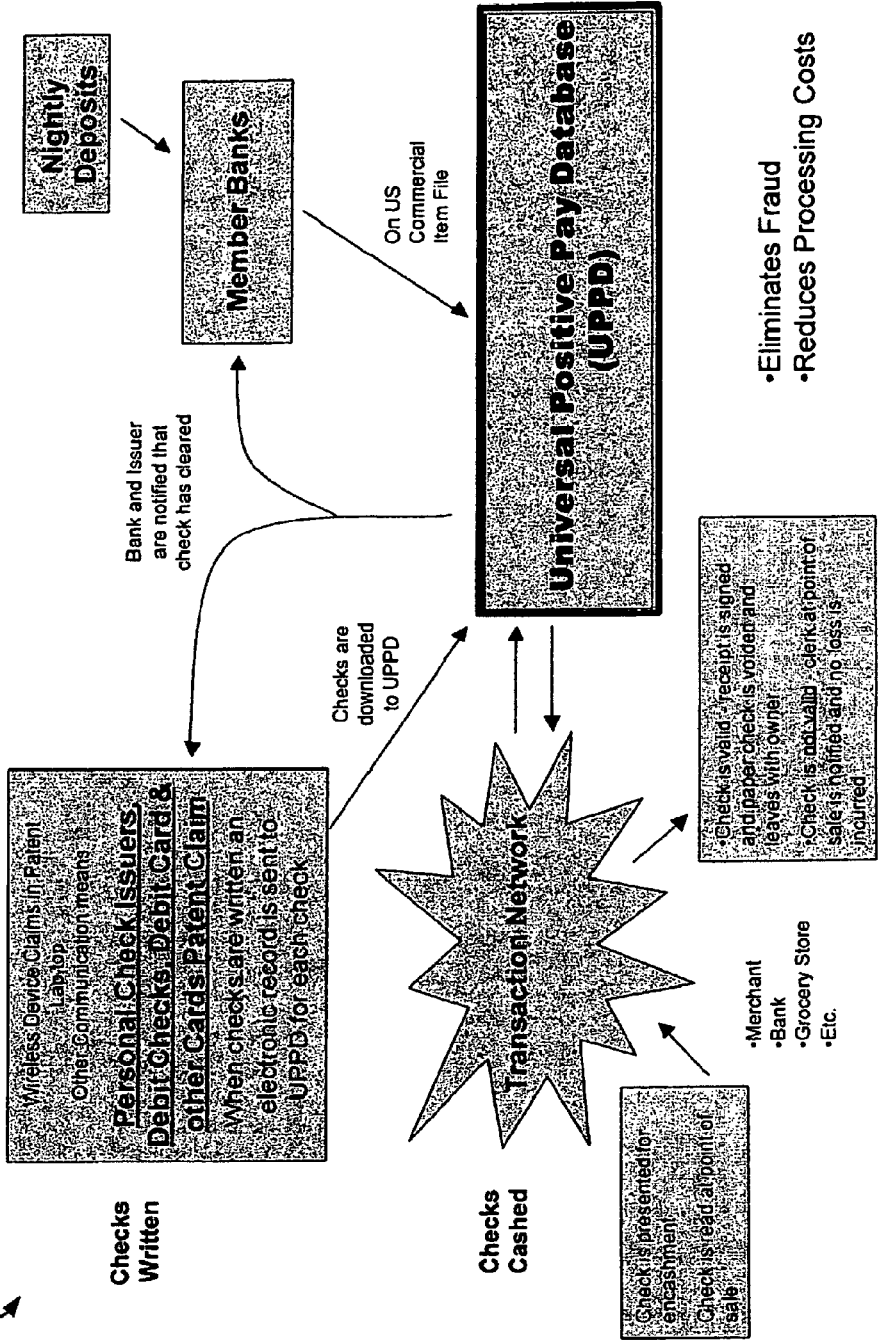

Functional diagrams 1000 of UPPD processes according to the present invention are shown in FIGS. 24A, 24B, 24C, 24D, 24E, and 24F. These diagrams 1000 show the use of truncation banks with the UPPD system and what occurs when the payer presents a transaction instrument at a POS financial transaction. FIG. 24D illustrates what occurs when the UPPD checks whether a retailer is using a UPPD payroll check.

Figure 25:
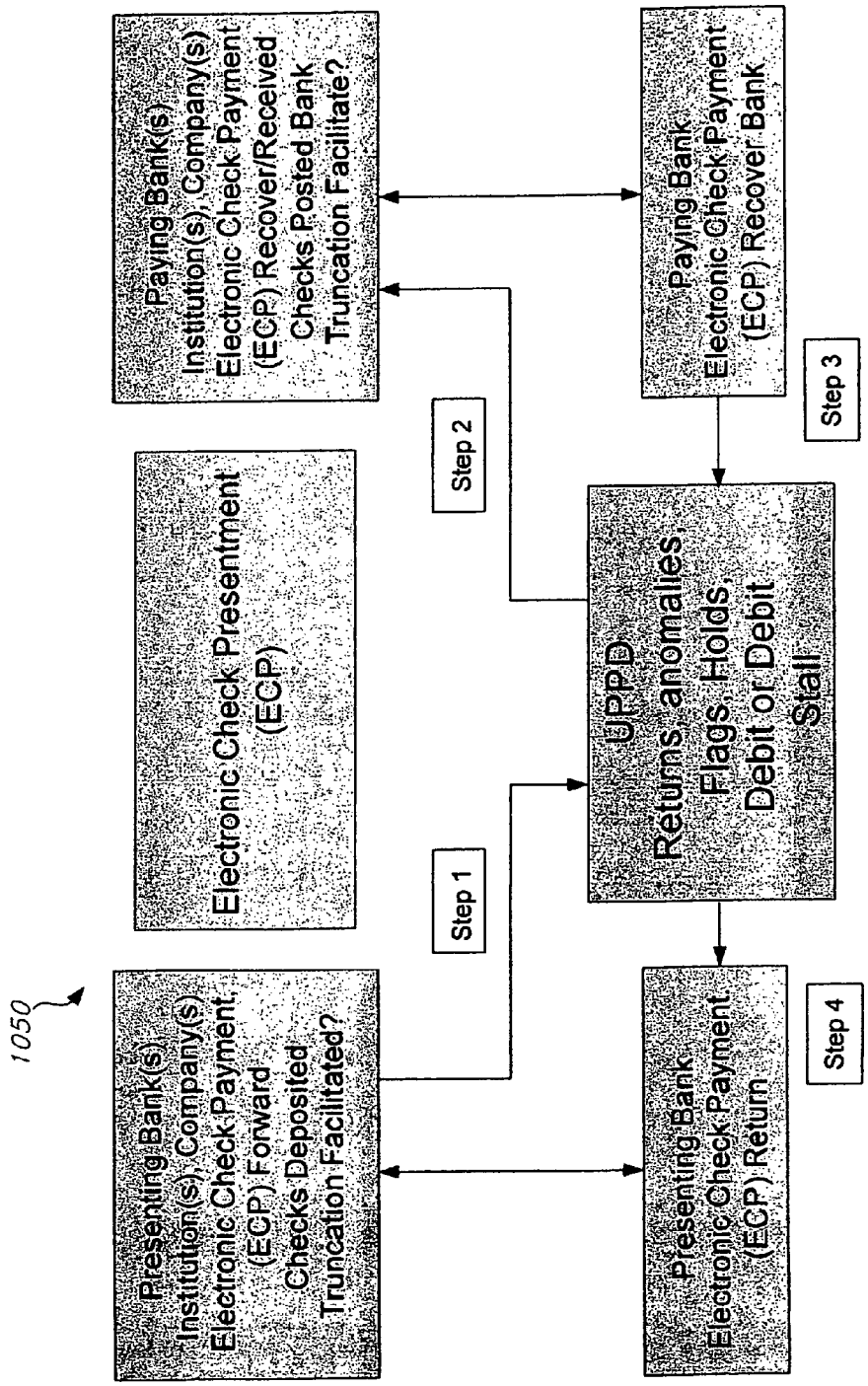
FIG. 25 is a functional diagram of a UPPD process according to the present invention.
Figure 26A:
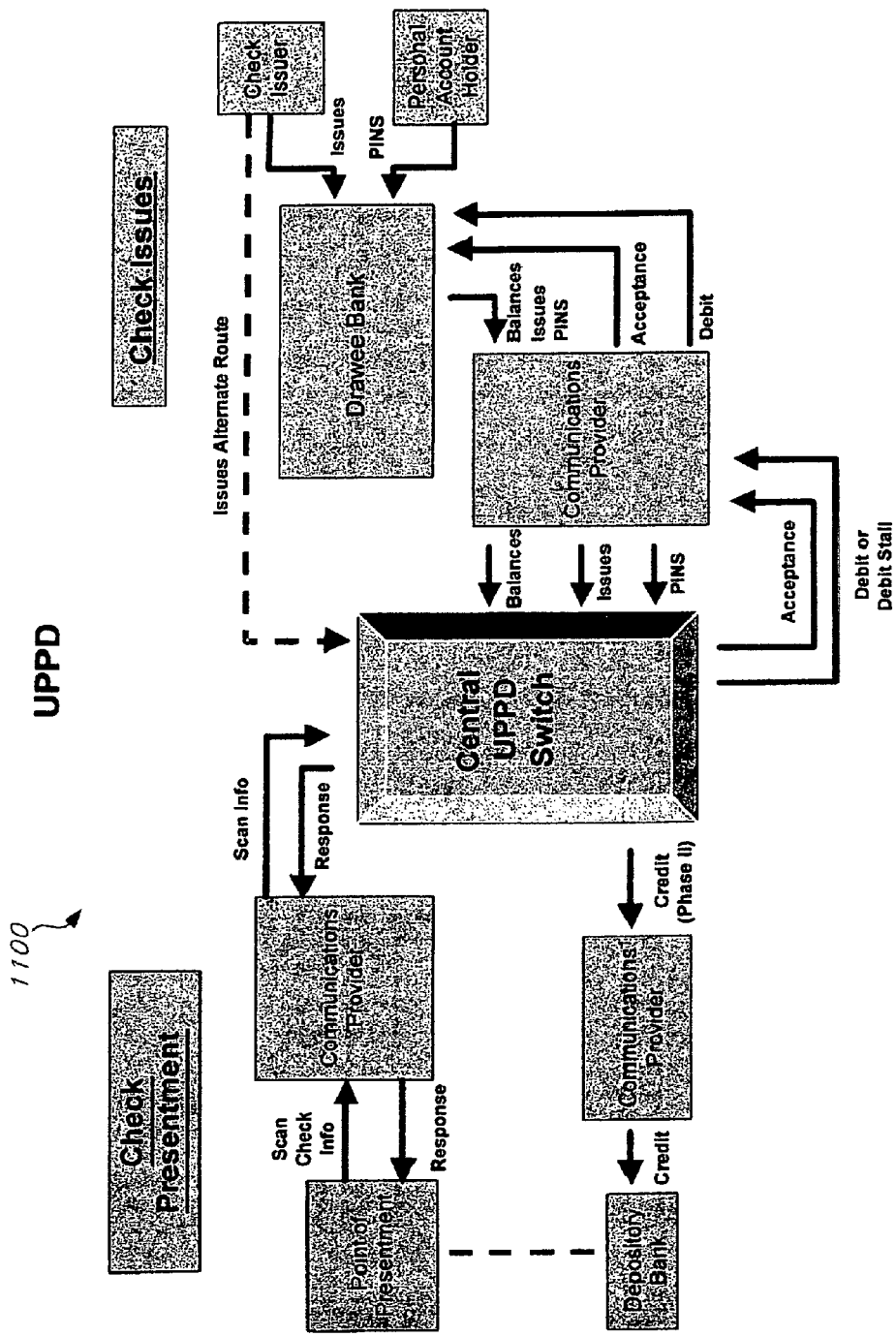
FIGS. 26A, 26B, 26C, 26D, and 26E are functional diagrams of UPPD processes according to the present invention.
Figure 26B:
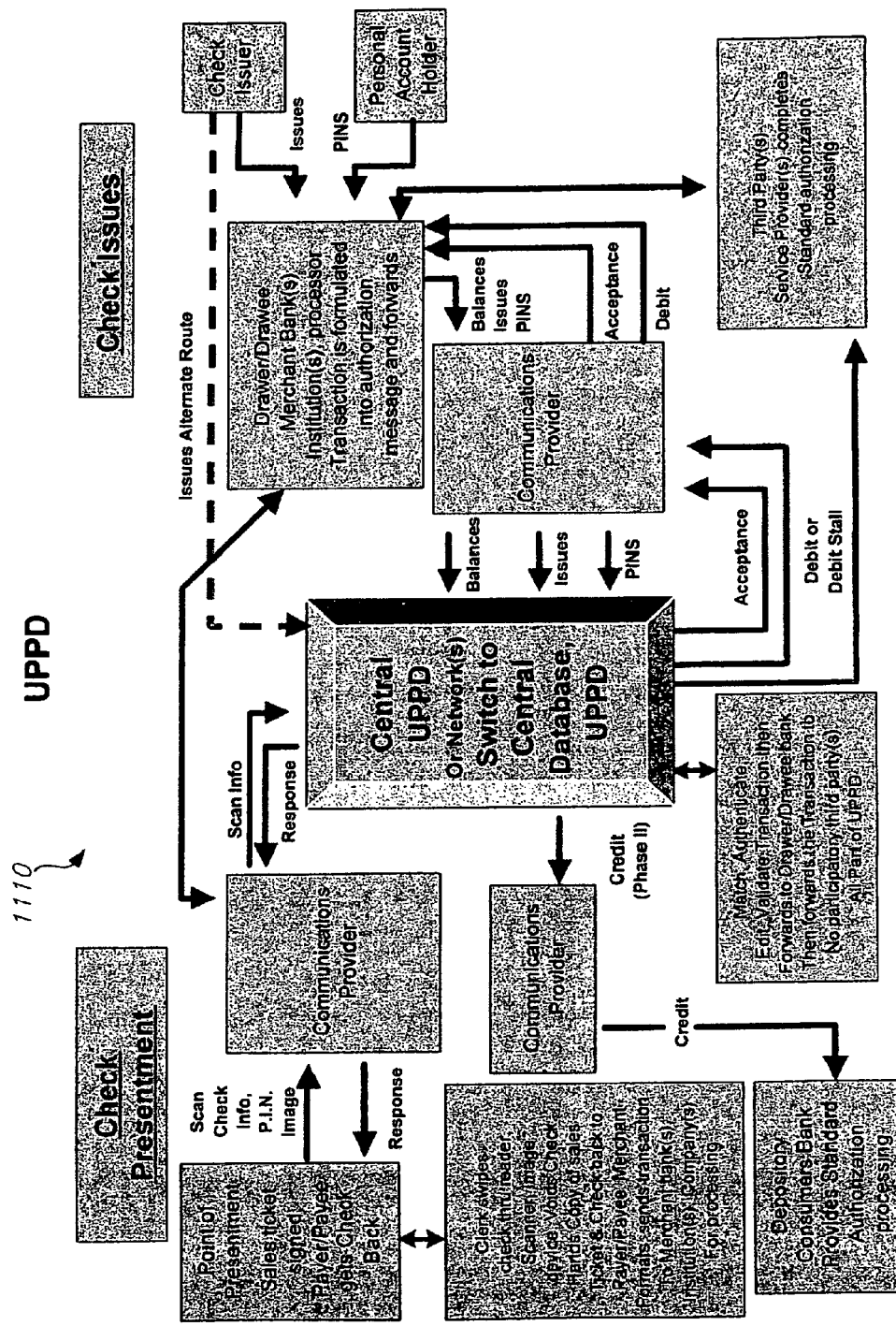
Figure 26C:
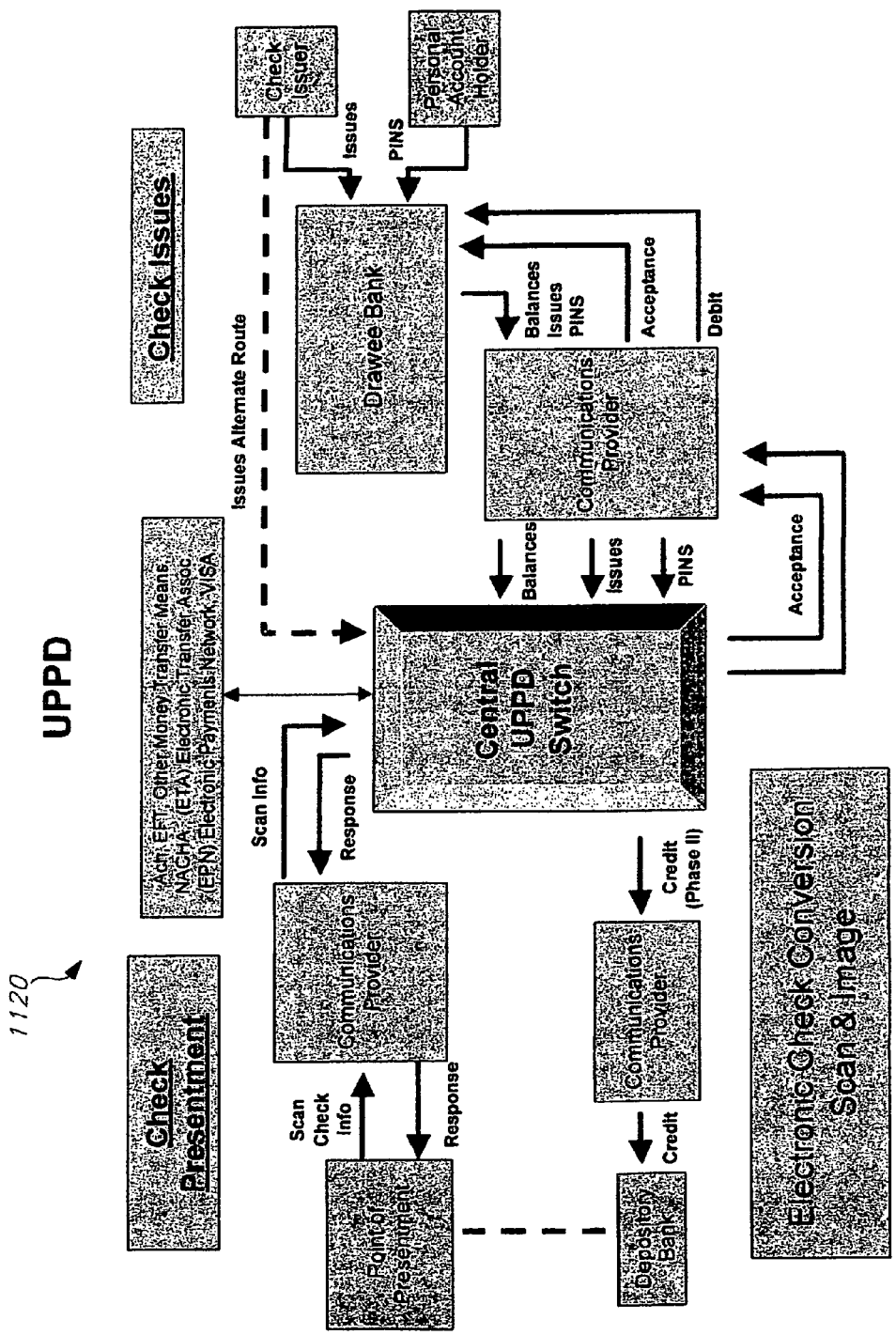
Figure 26D:
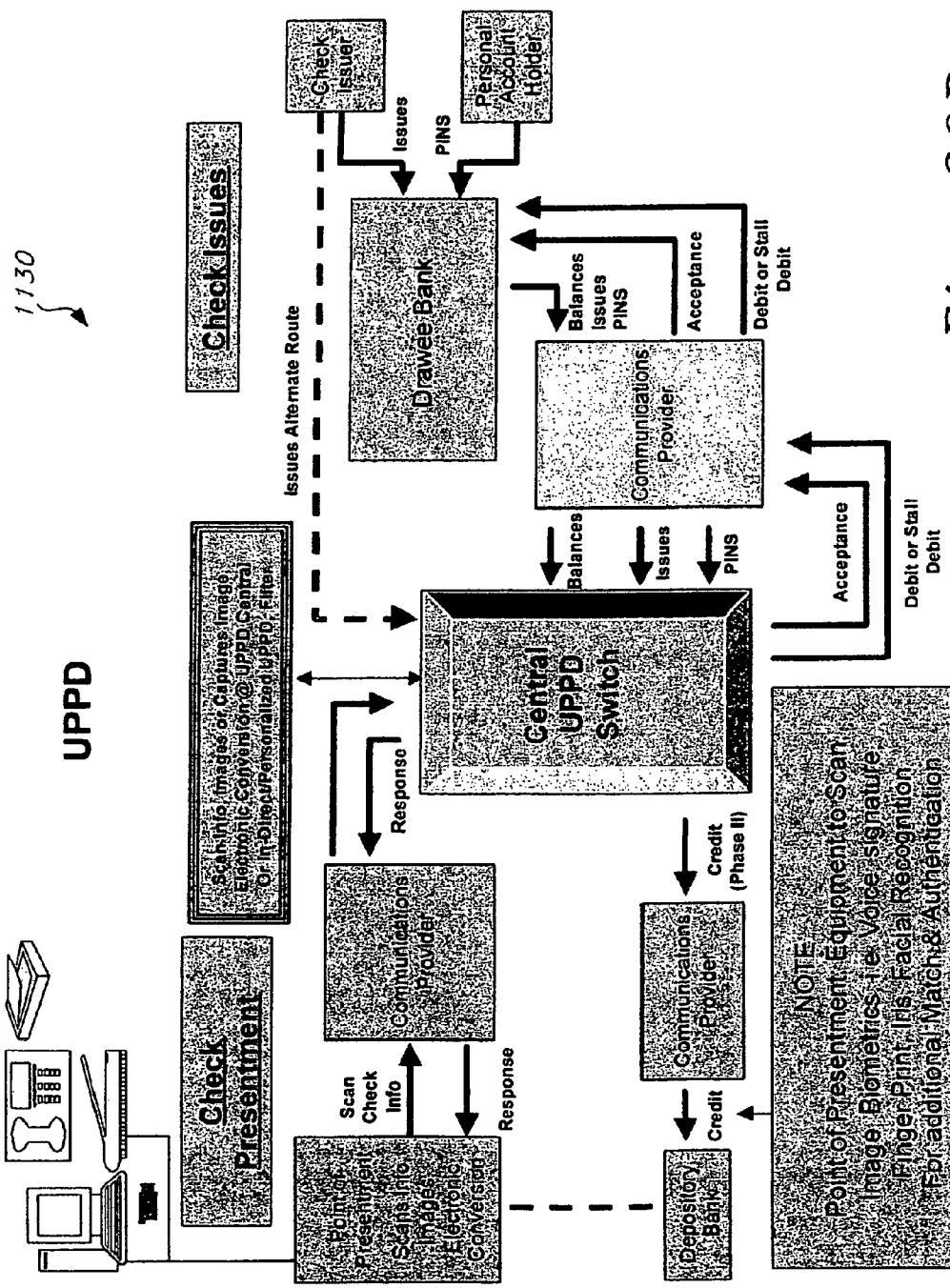
Figure 26E:
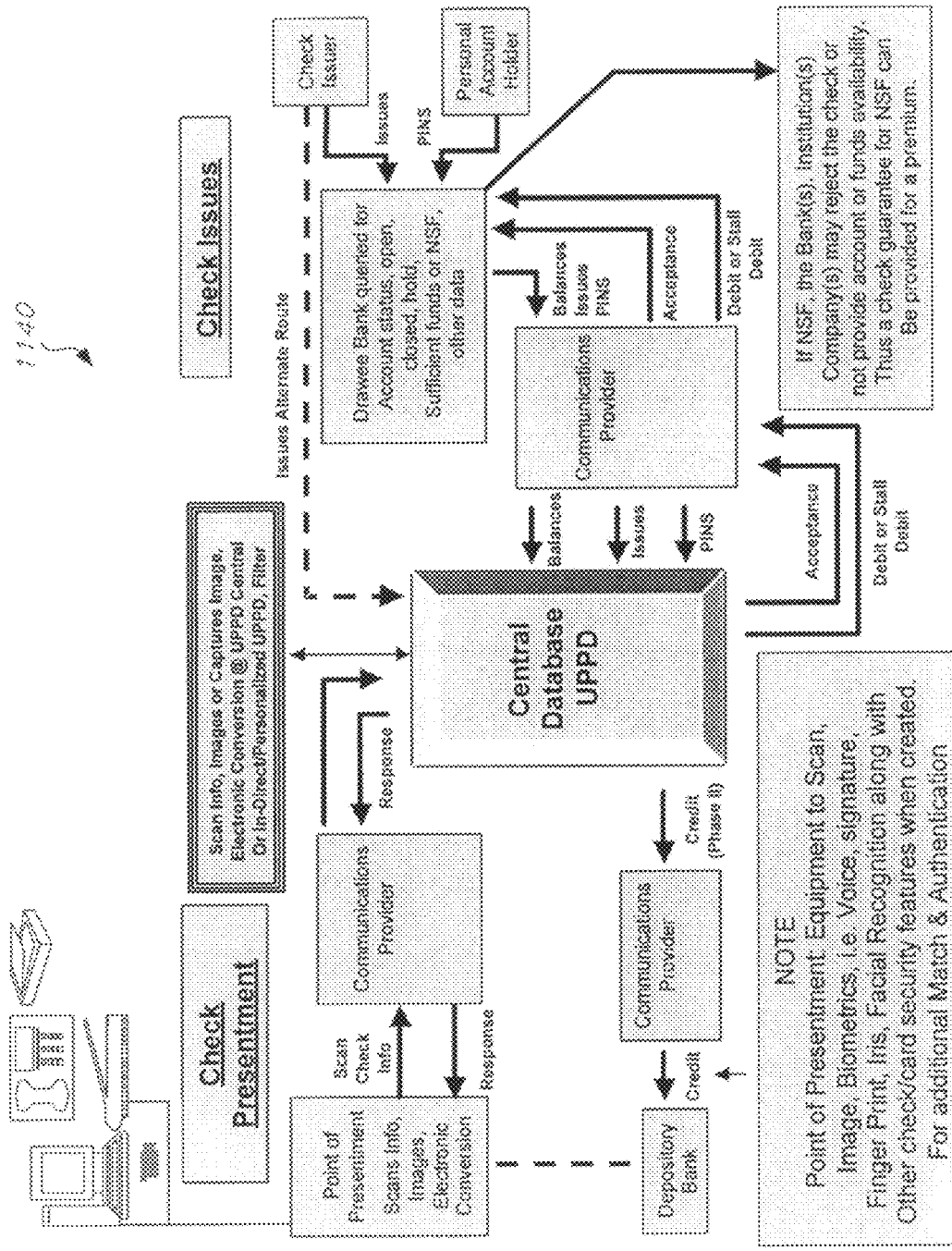
Figure 27:
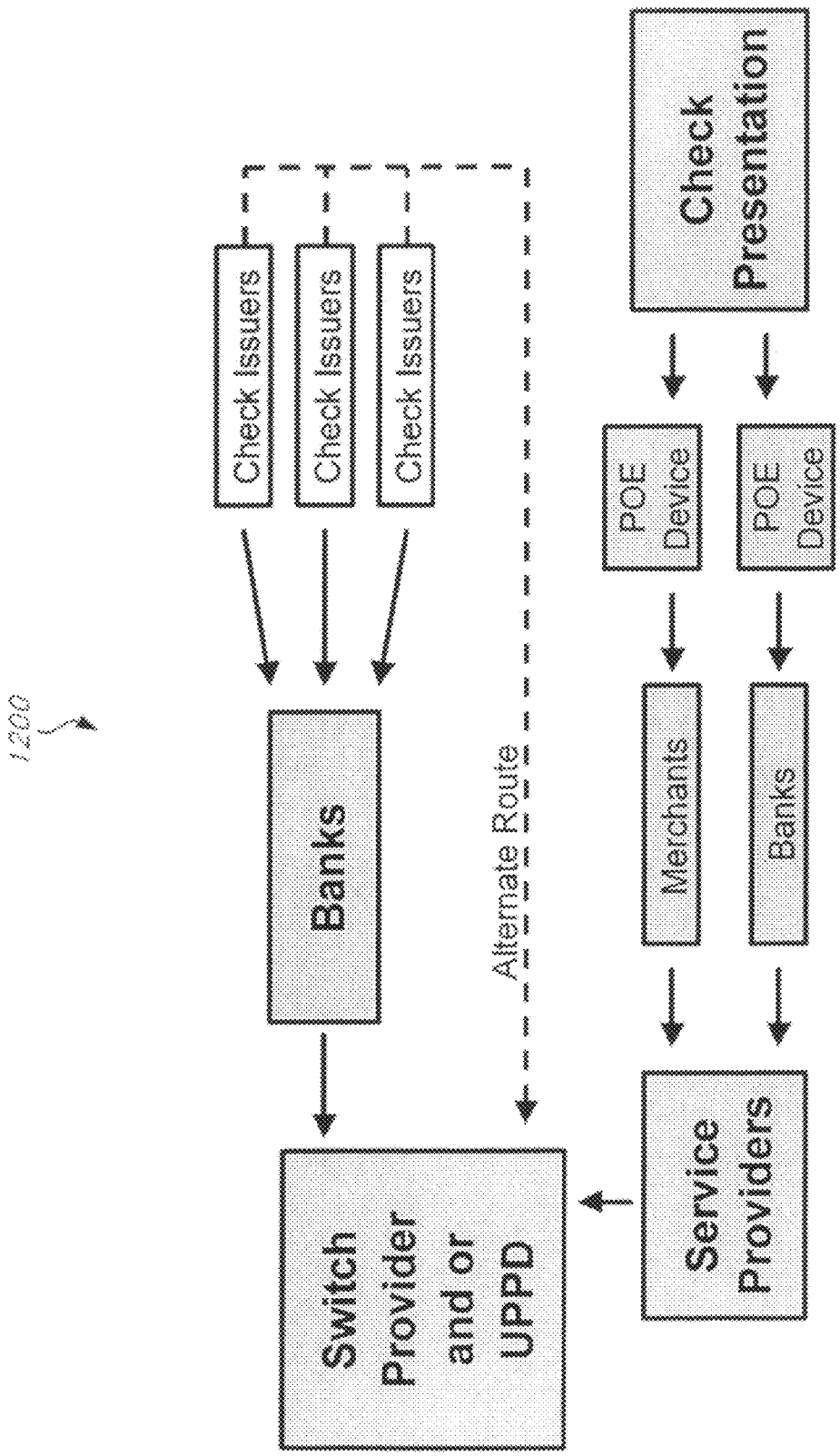
FIG. 27 is a functional diagram of a UPPD system according to the present invention.
Figure 28A:
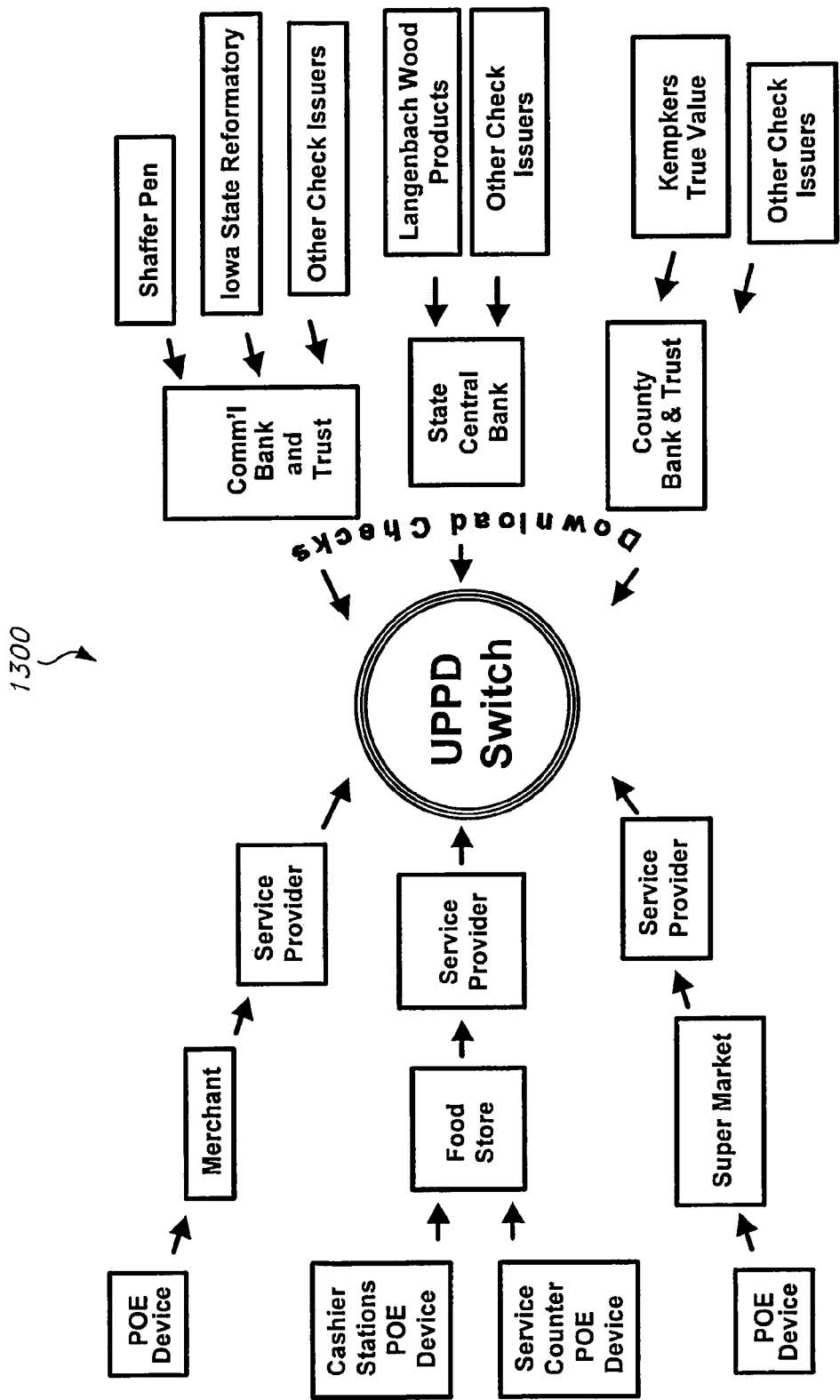
FIGS. 28A and 28B are functional diagrams of UPPD processes according to the present invention.
Figure 28B:
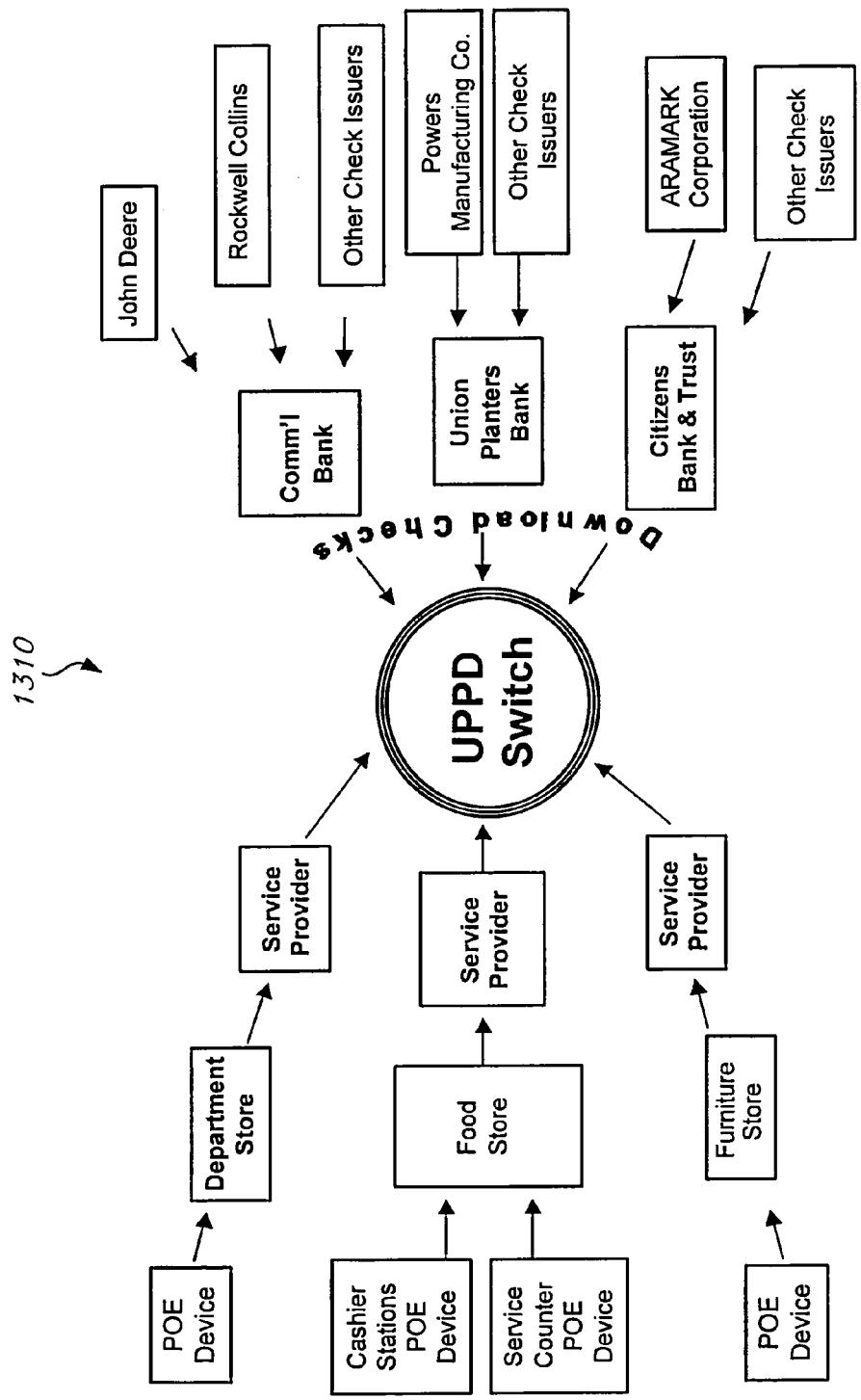

A functional diagram 1050 of a UPPD process regarding an electronic check presentment according to the present invention is shown in FIG. 25. Functional diagrams 1100 of UPPD processes regarding POE, POP, and POS financial transactions according to the present invention are shown in FIGS. 26A, 26B, 26C, 26D, and 26E. A functional diagram 1200 of a UPPD system according to the present invention is shown in FIG. 27. Functional diagrams 1300 and 1310 of UPPD processes according to the present invention are shown, respectively, in FIGS. 28A and 28B.

Figure 29:
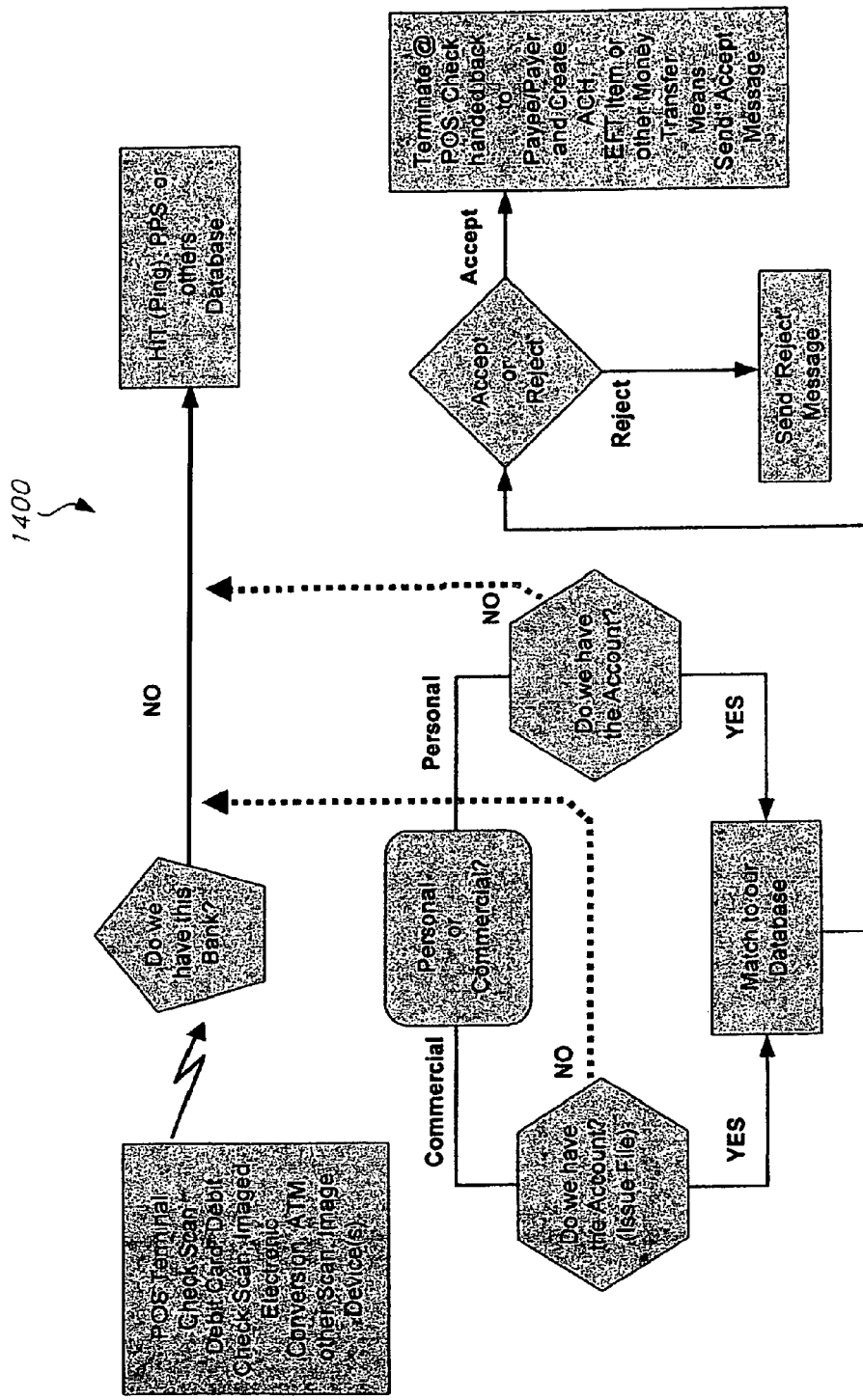
FIG. 29 is a functional diagram of a point of sate transaction utilizing a UPPD system according to the present invention.
Figure 30:
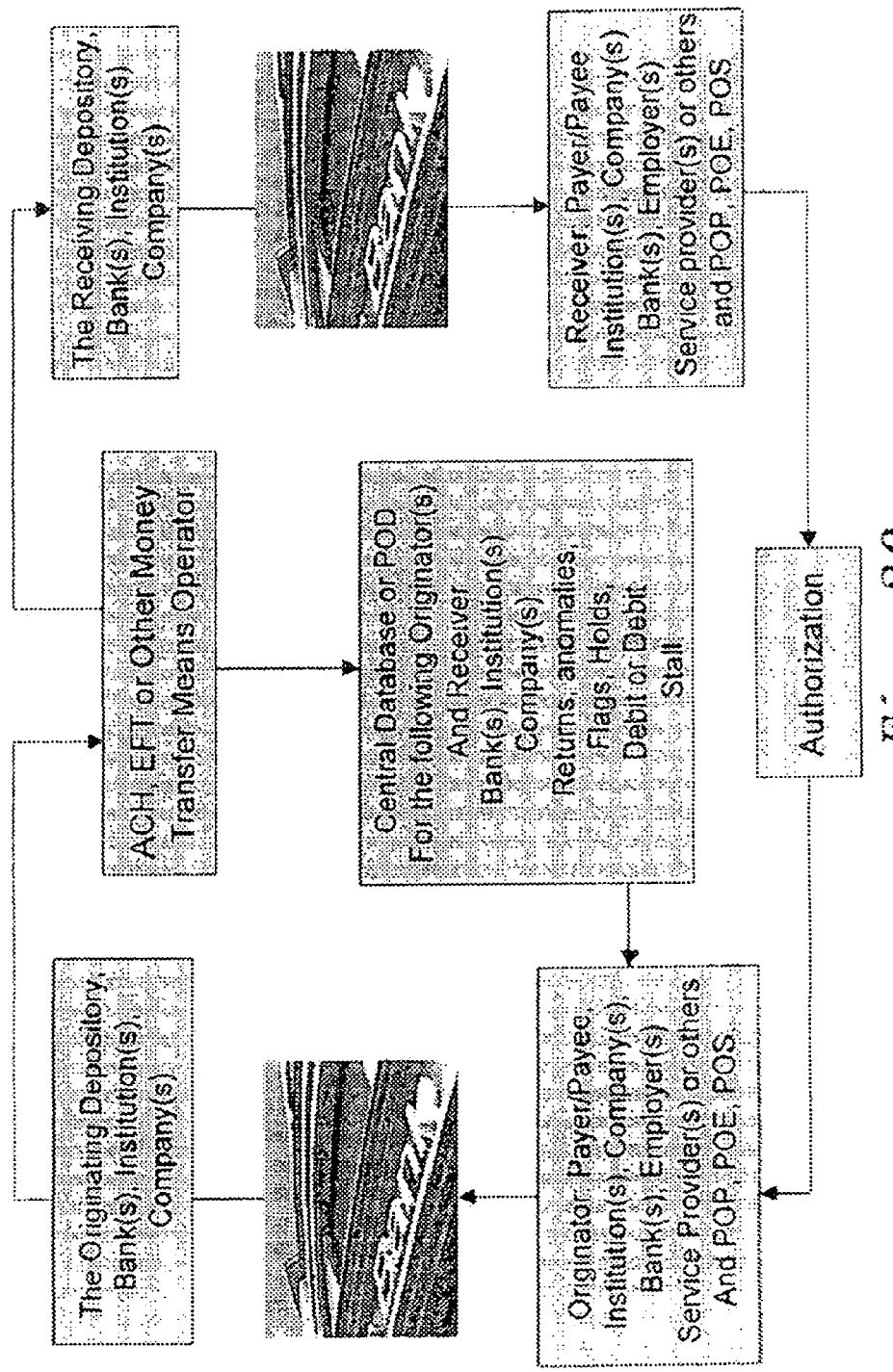
FIG. 30 is a functional diagram of a UPPD system according to the present invention.
Figure 31:
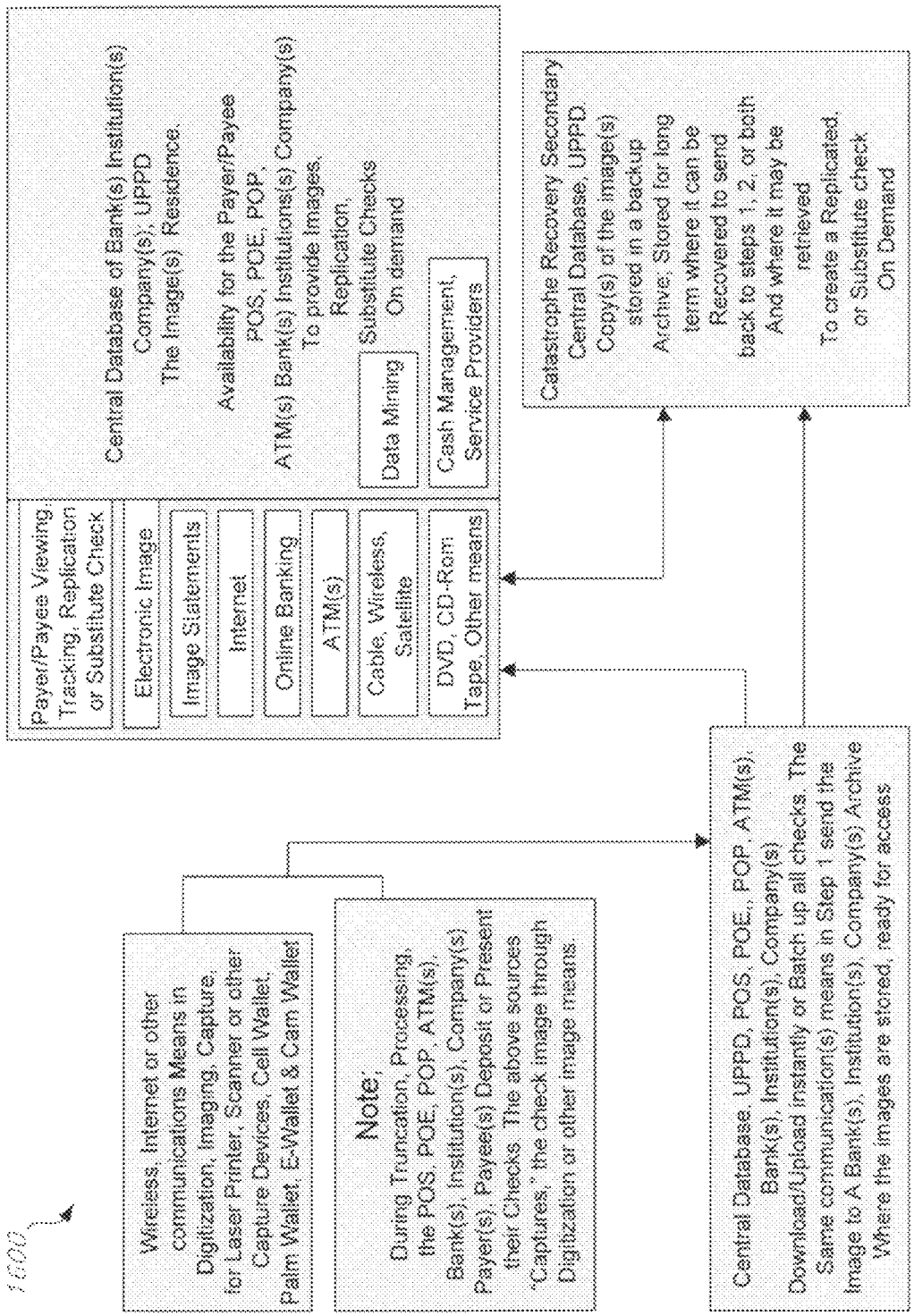
FIG. 31 is a functional diagram of a UPPD system according to the present invention.
Figure 32A:
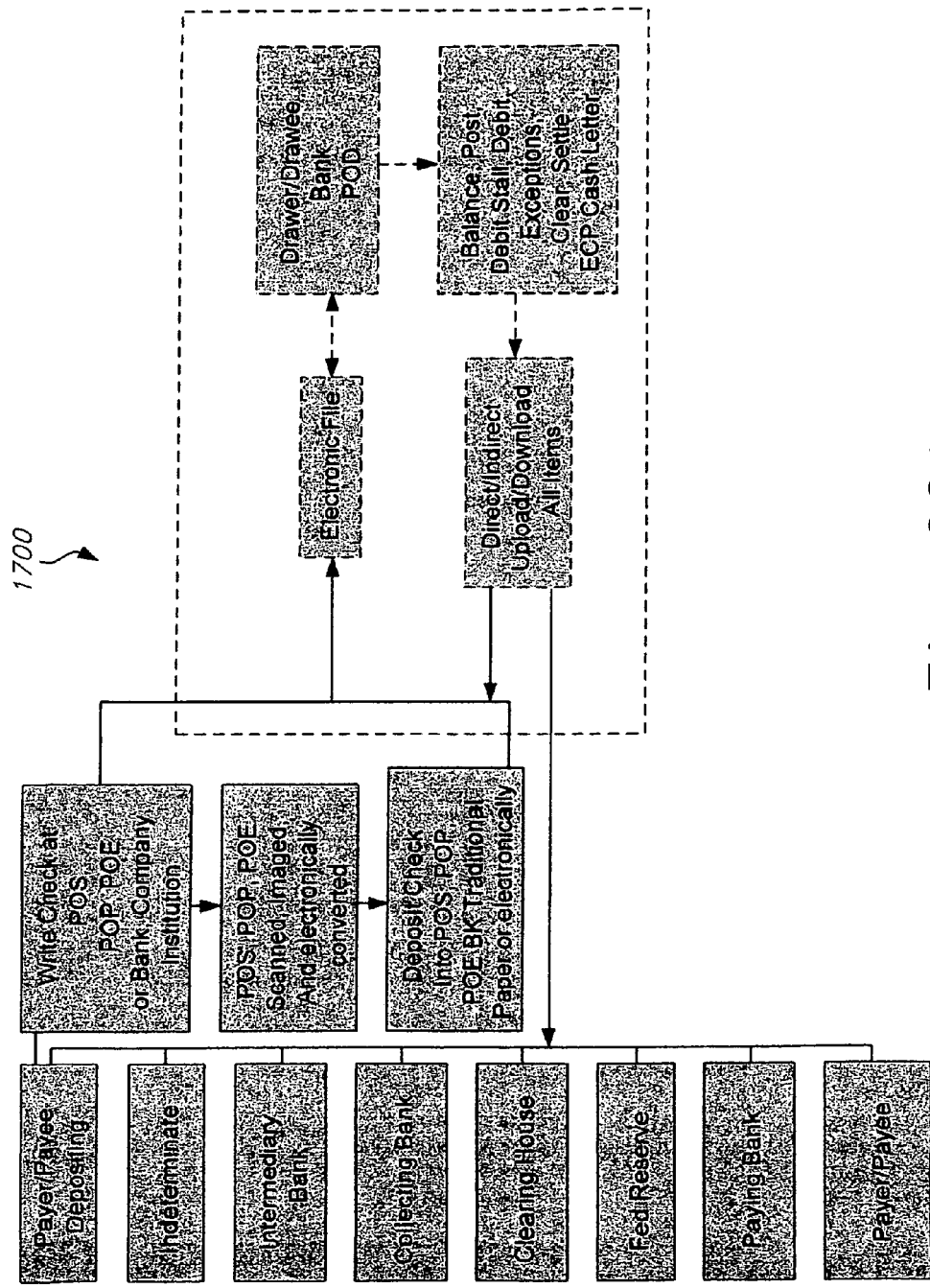
FIGS. 32A, 32B, 32C, 32D, 32E, and 32F, are functional diagrams of a UPPD processes according to the present invention.
Figure 32B:
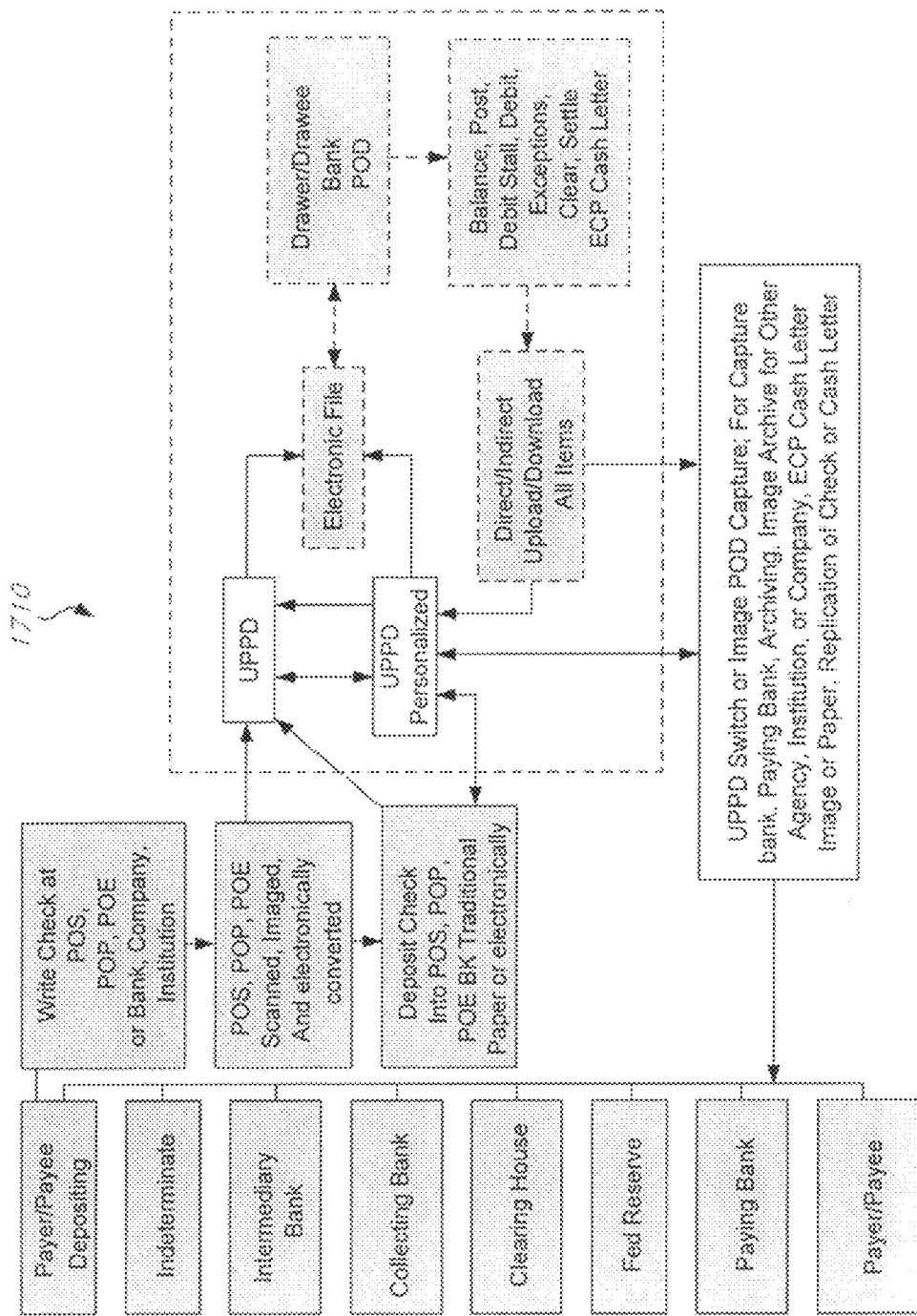
Figure 32C:
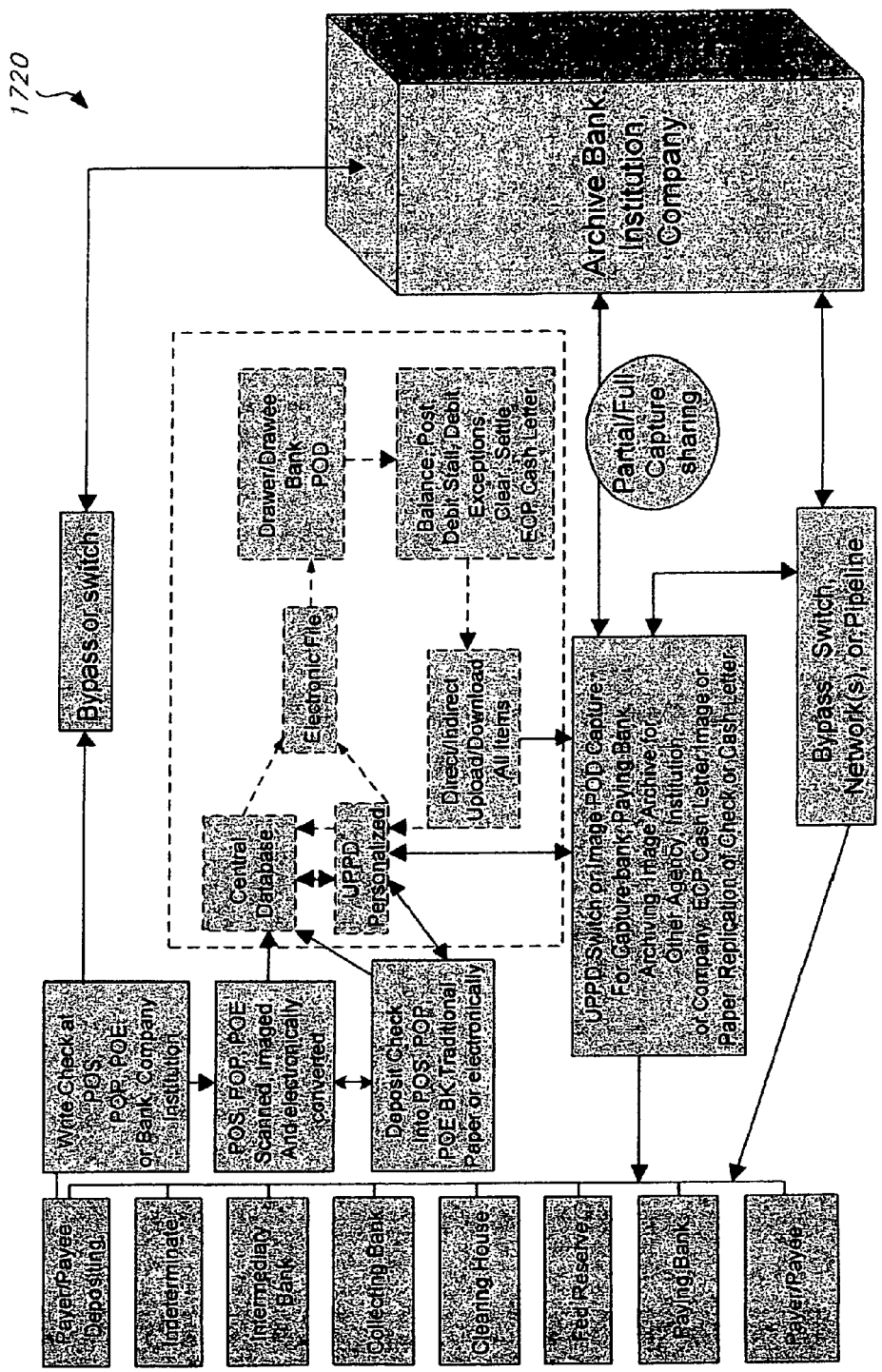
Figure 32D:
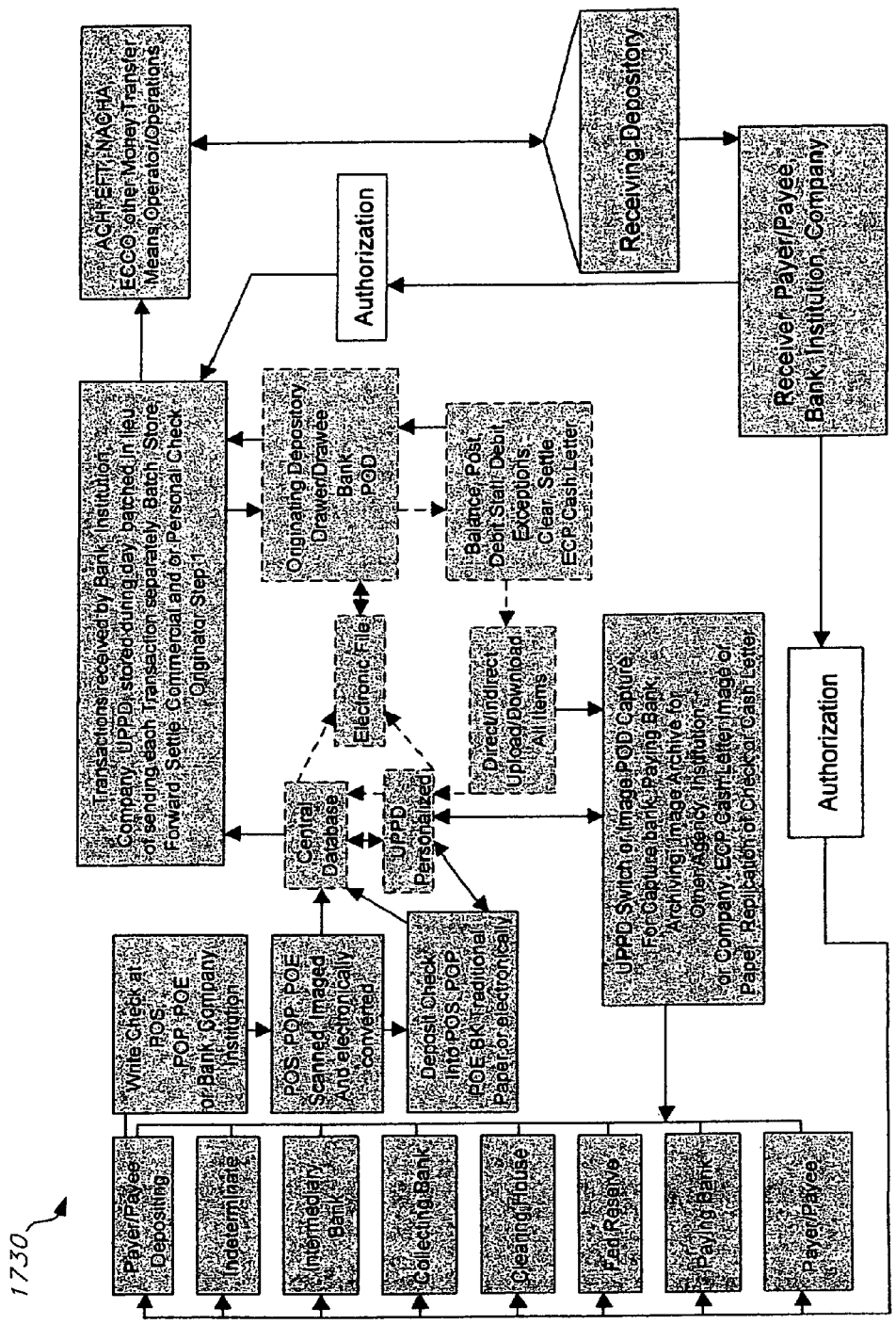
Figure 32E:
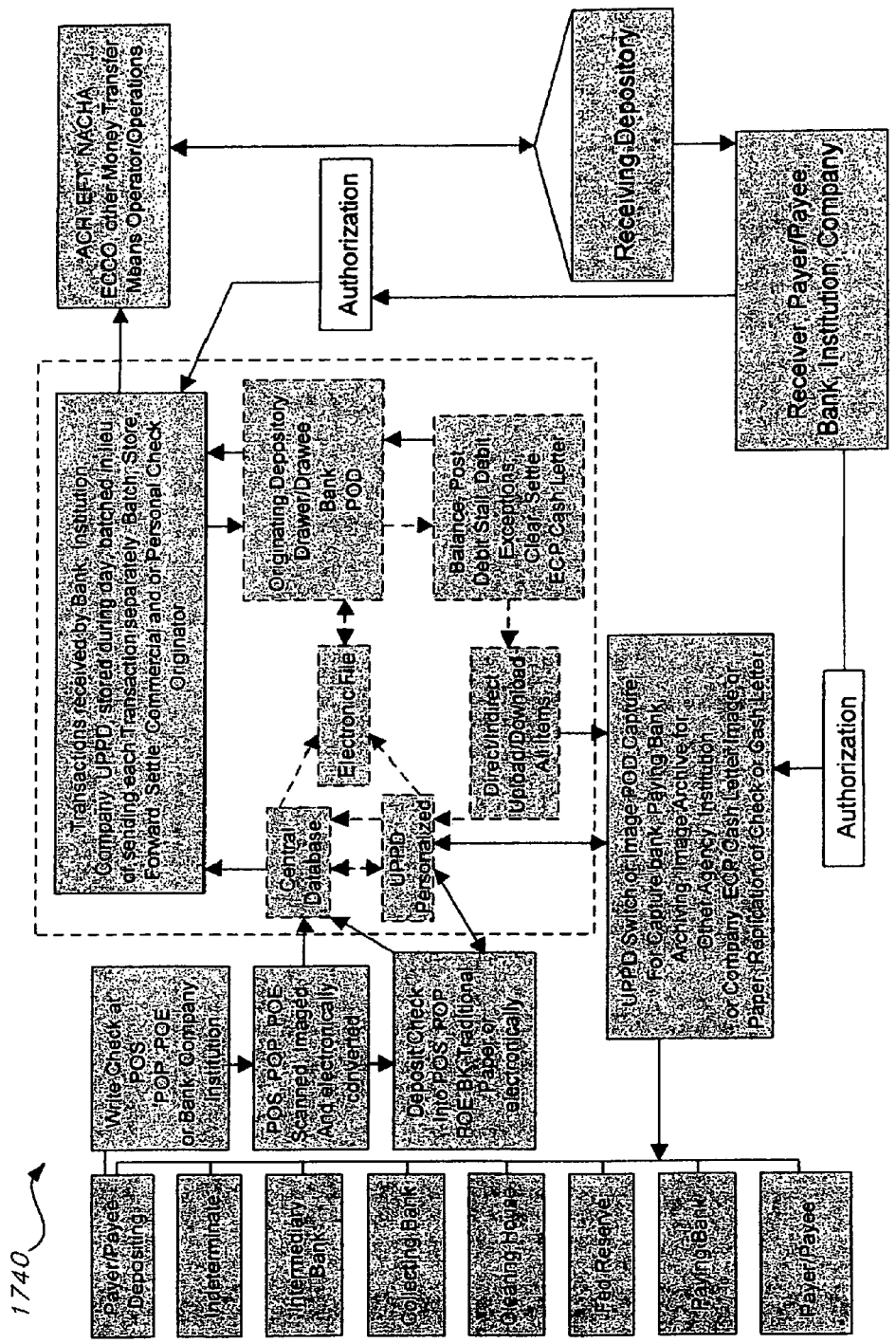
Figure 32F:
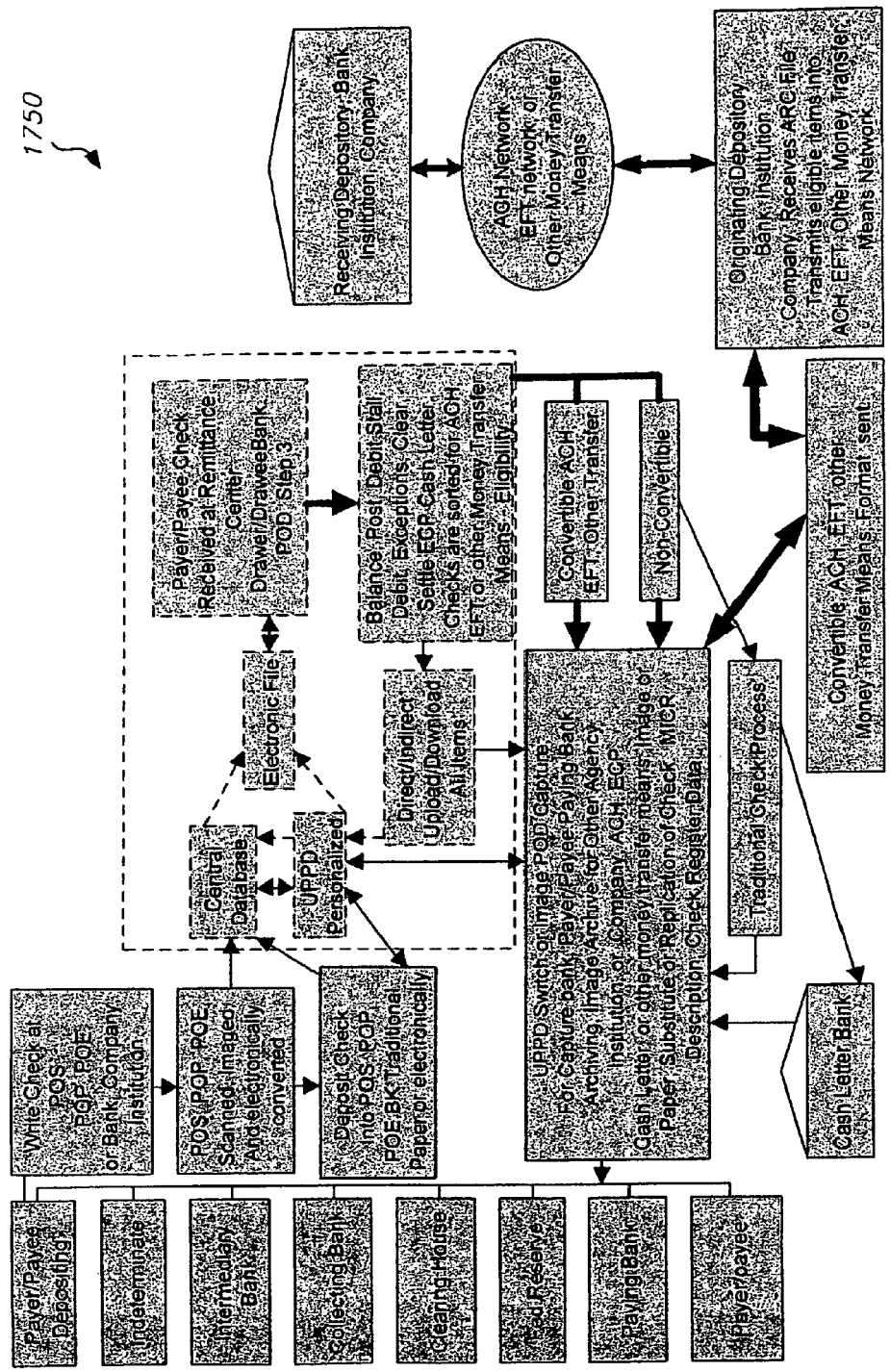

A functional diagram 1400 of a point of sale transaction utilizing a UPPD system according to the present invention is shown in FIG. 29. This diagram 1400 illustrates the process that occurs when a POS, POE, or POP terminal asks whether a bank associated with a financial instrument presented for a POS, POE, or POP financial transaction is a UPPD member. A functional diagram 1500 of a UPPD system regarding ACH, EFT, or other money transfer processes according to the present invention is shown in FIG. 30. A functional diagram 1600 of a UPPD system regarding Check 21, wireless, imaging, ACH, EFT, etc., according to the present invention is shown in FIG. 31.

Figure 33:
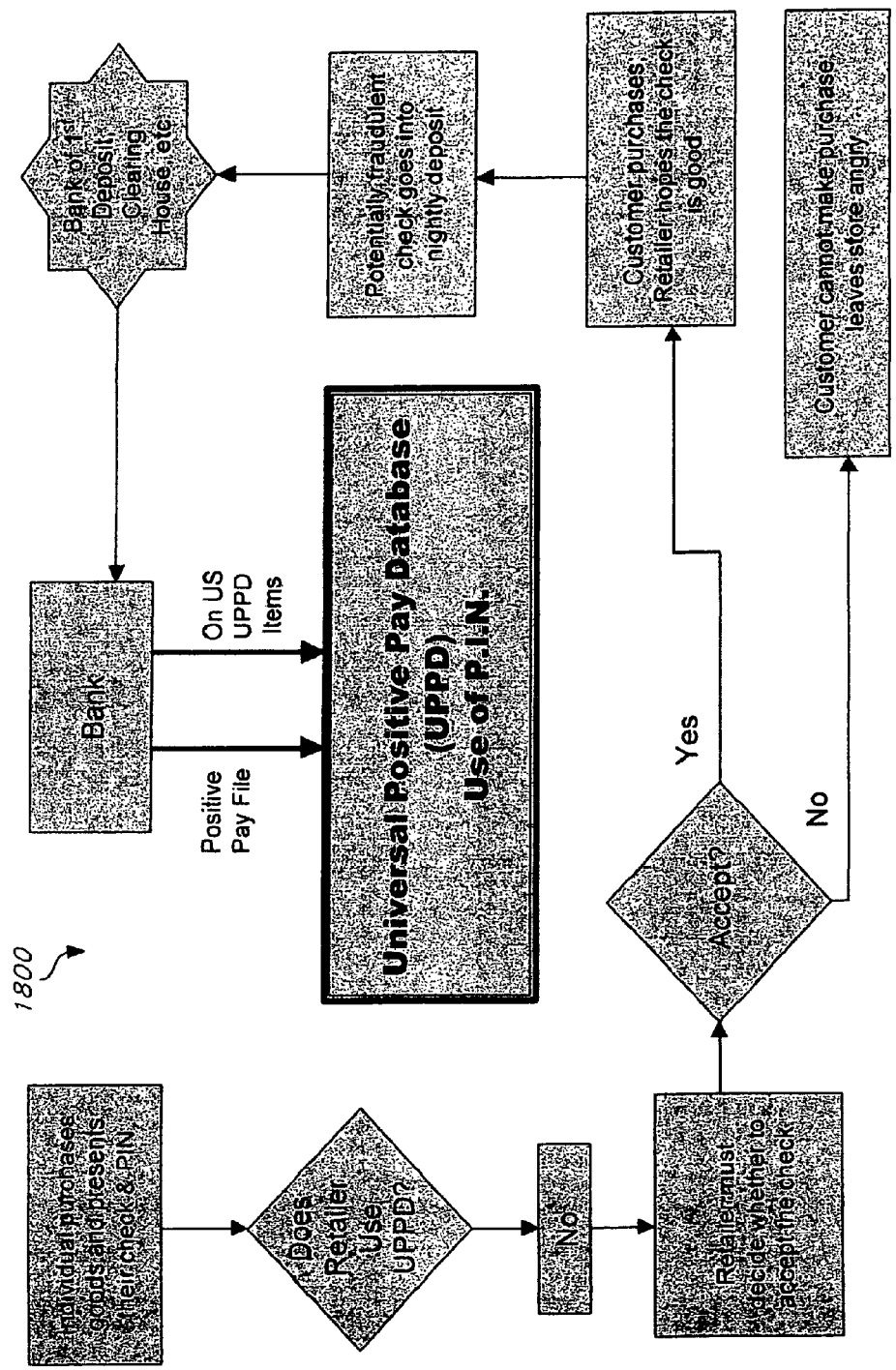
FIG. 33 is a functional diagram of the use of a PIN with a UPPD system according to the present invention.
Figure 34A:
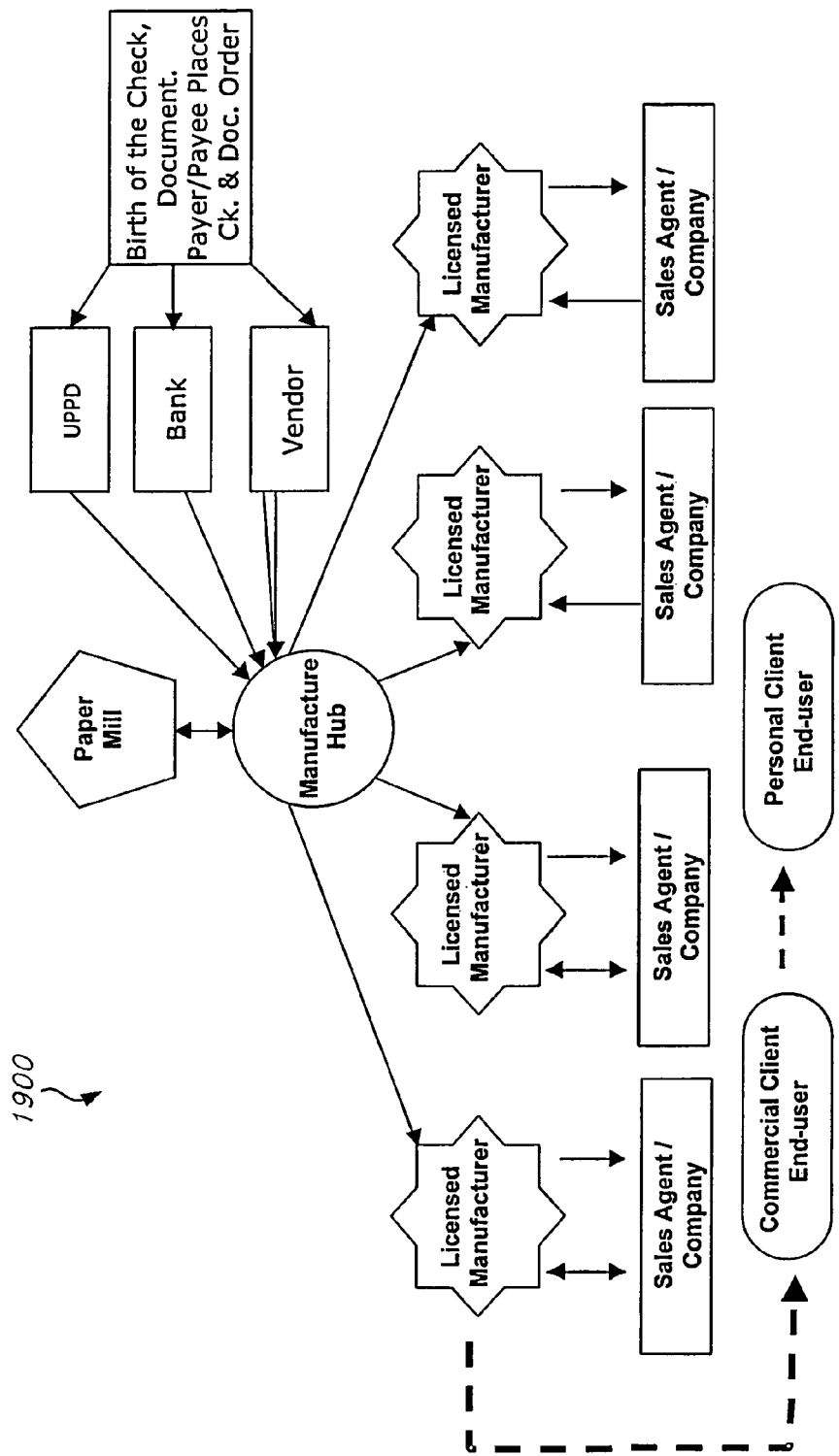
FIGS. 34A and 34B are functional diagrams of UPPD processes according to the present invention.
Figure 34B:
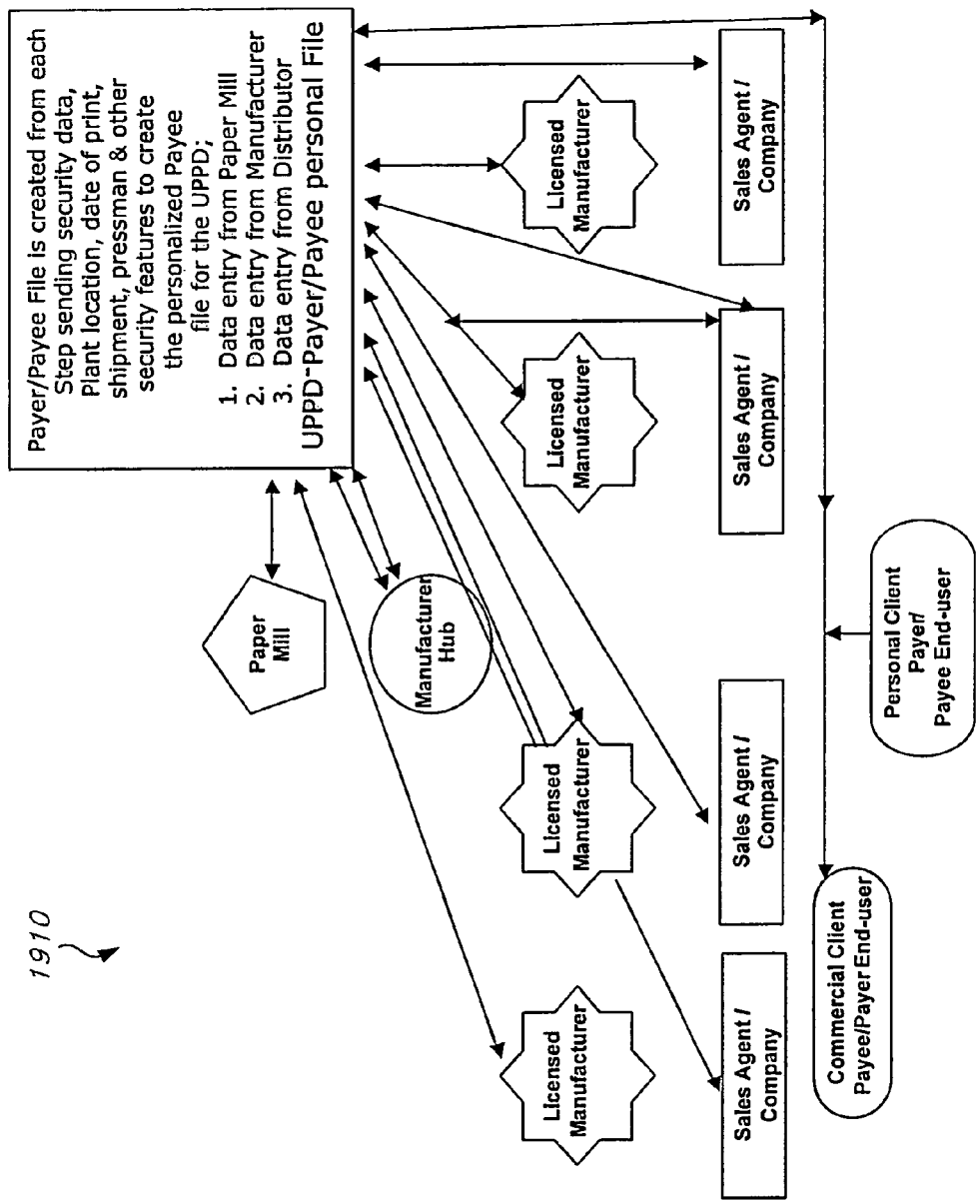

Functional diagrams 1700, 1710, 1720, 1730, 1740, 1750 of UPPD processes regarding transparency according to the present invention are shown, respectively, in FIGS. 32A, 32B, 32C, 32D, 32E, and 32F. A functional diagram 1800 of the use of a personal identification number (PIN) with a UPPD system according to the present invention is shown in FIG. 33. Functional diagrams 1900 and 1910 of UPPD processes according to the present invention are shown, respectively, in FIGS. 34A and 34B.

Figure 35A:
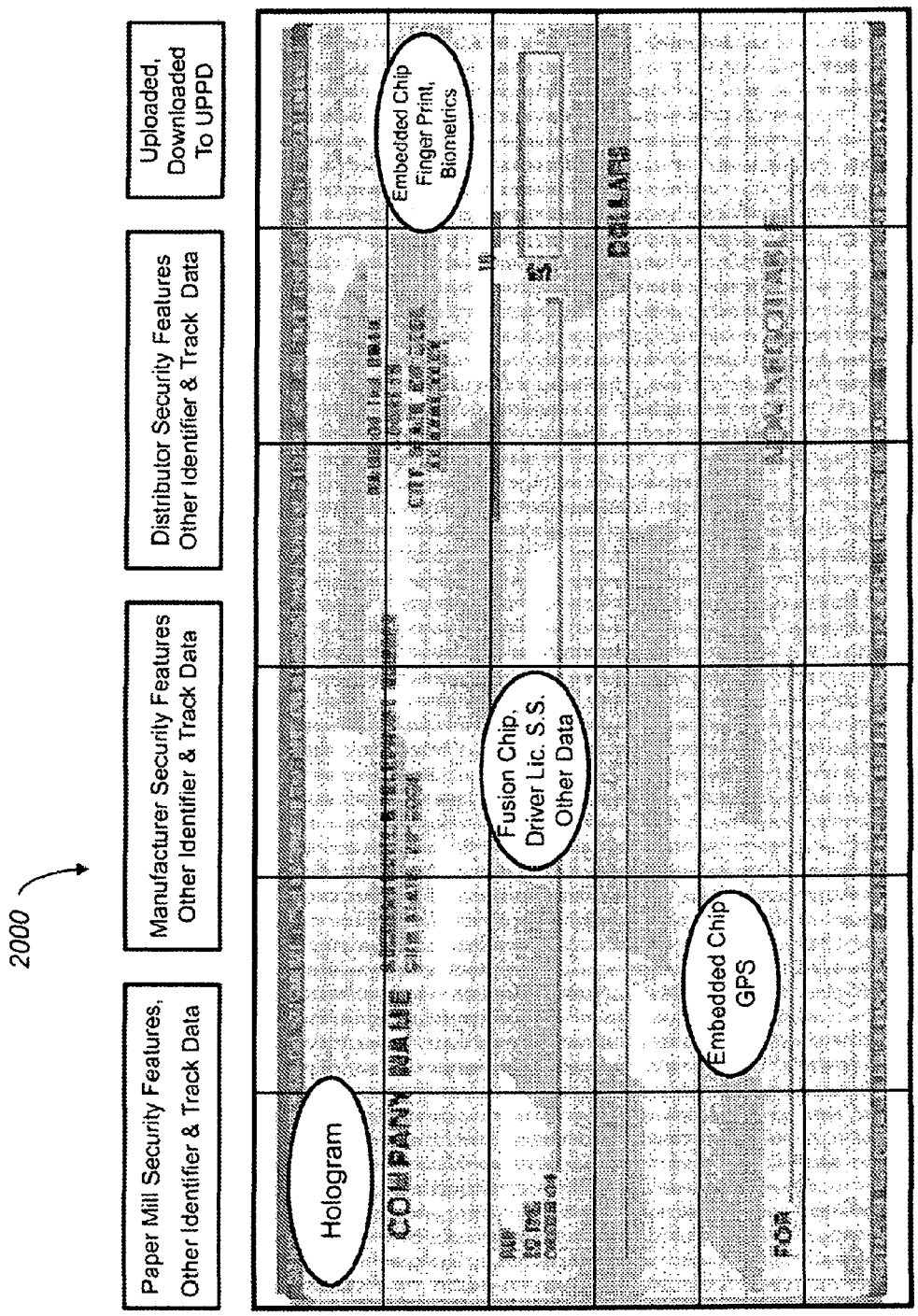
FIGS. 35A and 35B are diagrams of security measure for use with a UPPD system according to the present invention.
Figure 35B:
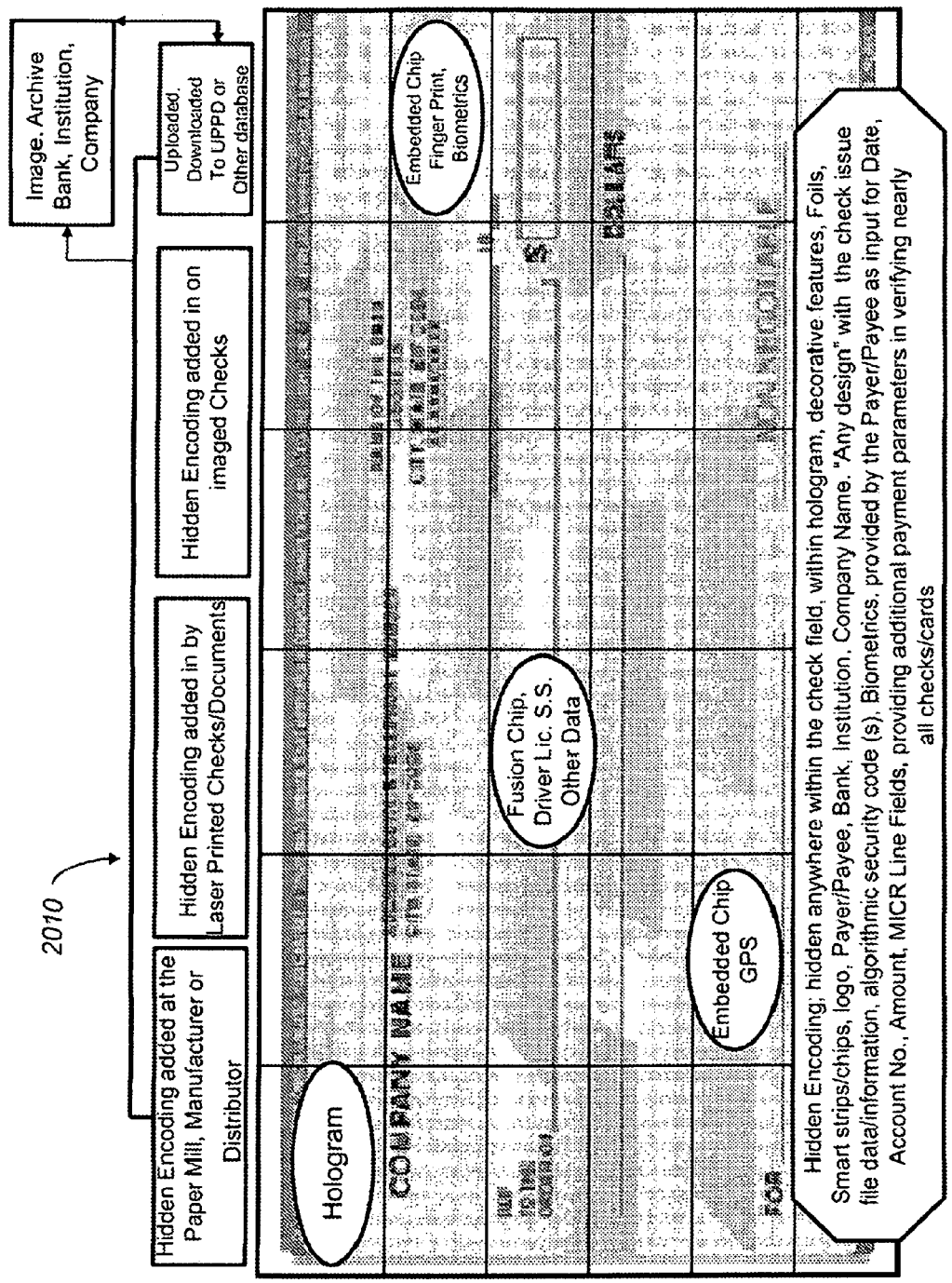
Figure 36:
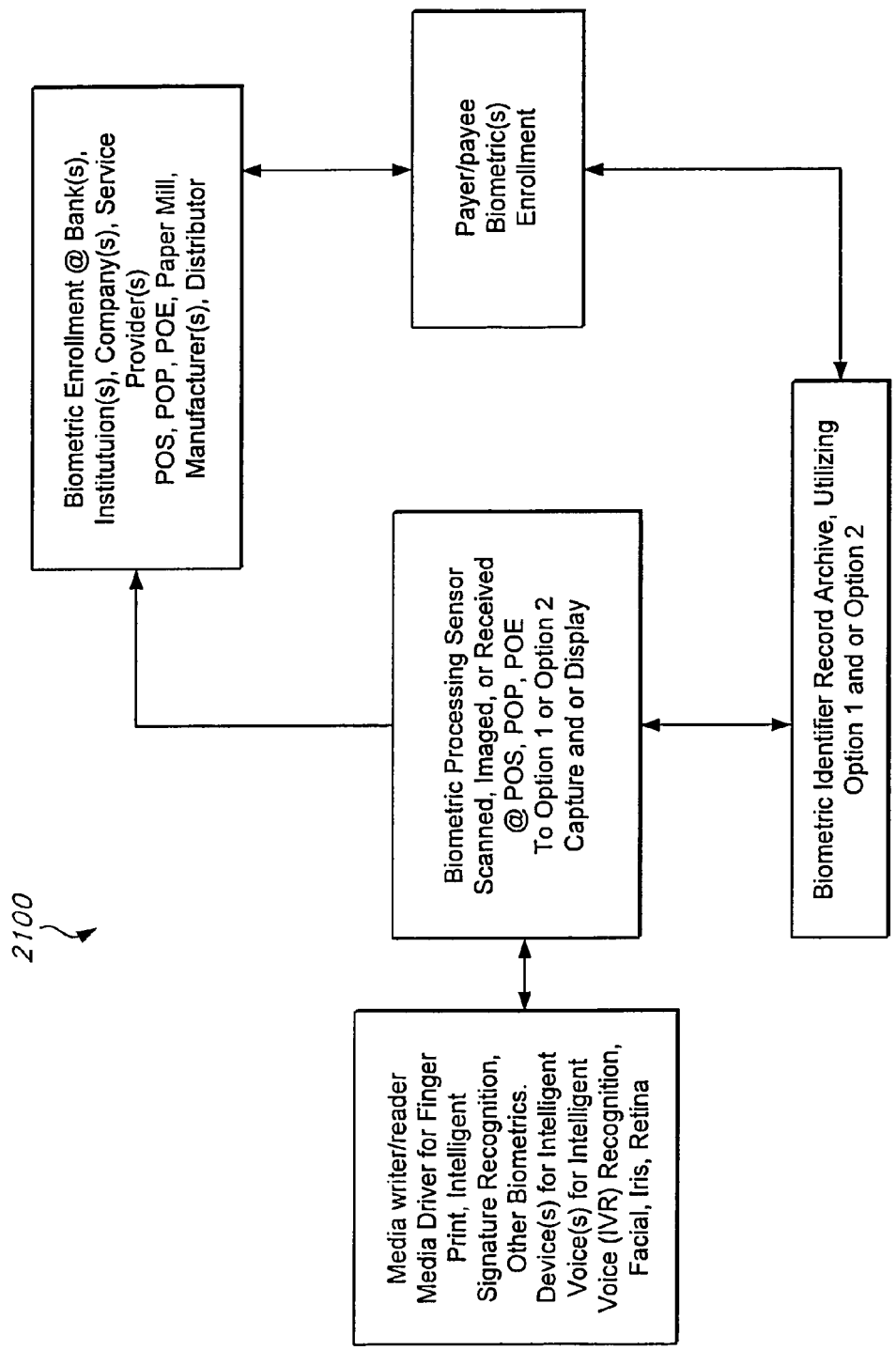
FIG. 36 is a functional diagram of biometric security measures for use with a UPPD system according to the present invention.
Figure 37:
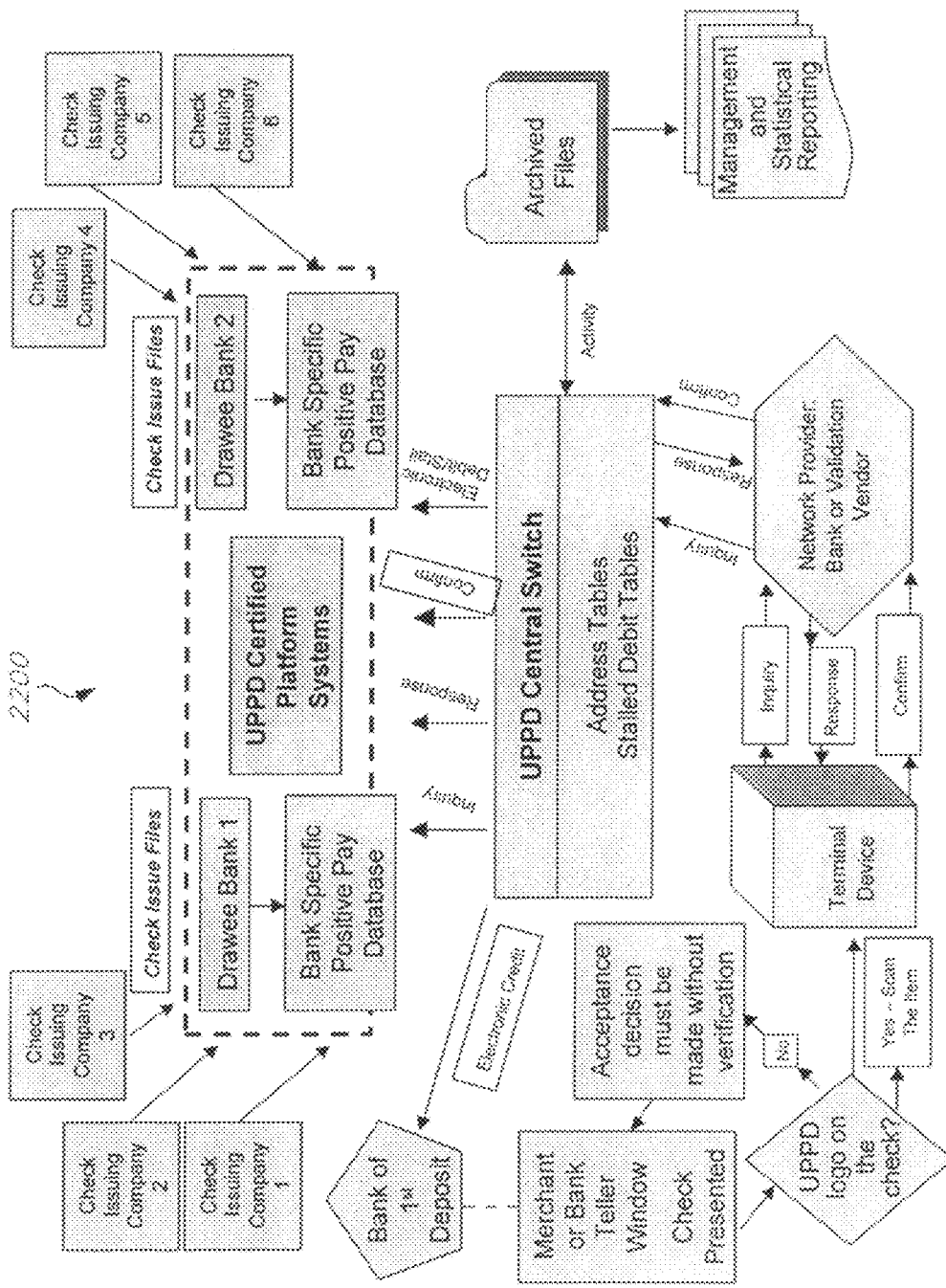
FIG. 37 is a functional diagram of a UPPD system according to the present invention.

Diagrams 2000 and 2010 of security measures for use with a UPPD system according to the present invention are shown, respectively, in FIGS. 35A and 35B. A functional diagram 2100 of biometric security measures for use with a UPPD system according to the present invention is shown in FIG. 36. A functional diagram 2200 of a UPPD system according to the present invention is shown in FIG. 37.

A UPPD system, method, and/or computer useable medium according to the invention can reposition the way commercial and personal checks, debit cards, and debit check are processed. The UPPD system, method, and/or computer useable medium eliminates the potential fraud associated with these checks, but can drive down transaction costs associated with such checks, to the benefit of all parties involved in the process.

The UPPD system, method, and/or computer useable medium can, thru third party vendors currently in business, verify the validity of a commercial check, at the point of sale, and move the associated funds electronically, avoiding both paper processing, and the Federal Reserve ACH. In doing so, fraud is eliminated and transaction costs are greatly reduced. Parties that can benefit through use of the UPPD database include the merchant, the check guarantee vendor, the check issuer, the on-us bank, etc.

By providing service via the UPPD system, merchants can now take commercial checks as payment for goods. This brings customers into their businesses, and increases sales, without the risk of loss. Given that the checks can be terminated at the point of sale, thru existing equipment, the cost for depositing that item goes down, saving the merchants depository fees, as well as staff time in preparing and balancing check deposits.

Most check guarantee vendors charge their merchants on a per transaction basis. By adding commercial checks to the offering via the UPPD system, the volume of checks guaranteed may increase, resulting in increased revenue to the check guarantee provider.

The UPPD system offers companies issuing checks an increased likelihood that any attempts at defrauding the company thru check manipulation may be stopped at the point of encashment. Additionally, since the checks are cleared electronically, cost is driven from the transaction, giving the check issuing company an opportunity for a reduction in bank related fees.

Since the checks of an on-us bank may be verified at the point of encashment with the UPPD system, the potential for fraud is eliminated, reducing exposure for both the bank, and the banks check issuing client. Additionally, since the check is processed entirely by the UPPD system, the bank may not incur either paper processing costs, or ACH fees. This allows the bank the option of increased, margin, while passing a savings to its client.

The inventive UPPD system, method, and/or computer useable medium is the first technology to authenticate a paper check for all processes within a financial institution's check clearing chain. Any point along the clearing chain that finds a discrepancy can stop the check process indefinitely or until the discrepancy has been validated. To make participation easy, the UPPD system, method, and/or computer useable medium relies on an Issue File format which coincides with the Positive Pay file format, as well as enables the use of additional features. When the account holder produces checks, the UPPD database can be updated instantly with the correct check information. This way the UPPD system, method, and/or computer useable medium offers far greater check security for the most common types of check fraud—the forged or stolen check.

Since the UPPD system, method, and/or computer useable medium can eliminate the clearing chain, it can provide an even greater level of protection against check and debit check fraud. For one of many examples, when a UPPD Check Issuer, located in Houston, prints checks, an electronic record of each check is loaded into the UPPD. If one of those checks is presented at Home Depot in Chicago, then several scenarios could occur.

If Home Depot is not a member of the UPPD network, they then must make a blind decision on whether to cash the check or not, and wait a number of days to learn whether the check was valid. If Home Depot is a UPPD member, they would scan the check, and the electronic record would be transmitted to the UPPD database, and matched against the original check issue, which could yield the following results: (1) The match is successful, and Home Depot can accept the check as payment for the merchandise; (2) The match is unsuccessful, and Home Depot rejects the check, and avoids a loss from a fraudulent instrument.

Depending on the level of matching information, the Check Issuer, and his bank can receive warnings of attempted encashments against the bank and the account. By building a history of attempted fraudulent encashments, the UPPD system, method, and/or computer useable medium can become instrumental in the pinpointing of patterns, and be able to predict future attempts. This information will become valuable in the eventual identification of habitual perpetrators, and the elimination fraud rings.

With the UPPD system, method, and/or computer useable medium, as soon as the fraud is identified, the UPPD database will be updated and the check stopped before it clears, protecting the account holders' funds.

UPPD offers the greatest possibility to eliminate check fraud over any other check fraud detection system. As the numbers of participating financial institutions and merchants grow, the possibility of check fraud is diminished. This is based on the fact that the UPPD database provides a single repository of information for all financial institutions and check issuers to populate, and all merchants to use to validate the authenticity of the check. The following is a simple example of how the UPPD system, method, and/or computer useable medium would work.

Via existing technology using traditional phone, data lines or over the Internet, a business or other check issuing entity may routinely send to the UPPD system an Issue File that provides information regarding checks written against their account. The file includes a record of each check's issue date, amount, check number, account number, and the payee name. When the check is presented for encashment, the UPPD system can be accessed to verify that the information on the check matches the Issue File downloaded by the check issuer to the UPPD system. If the information is inconsistent or unavailable, the UPPD system can notify the requestor. If the check has been forged or altered, the payment process can be interrupted and the loss avoided.

While the invention has been described with references to it preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. A computer implemented method for detecting fraud in financial transactions during a payment clearing process, said method comprising:

receiving through one of a payer bank and a third party, a first record of an electronic financial transaction from at least one of the following group: a payer, a point-of-sale terminal, an online account and a portable electronic device;

storing in a database accessible by each party to said payment clearing process of said electronic financial transaction, said first record of said electronic financial transaction, said first record comprising more than one parameter;

receiving at said database at least a second record of said electronic financial transaction from one or more of a payee bank and any other party to said payment clearing process as said transaction moves along said payment clearing process, wherein said second record comprises at least one parameter which is the same as said more than one parameter of said first record;

each of said first and second records received at said database comprise at least two of the same said more than one parameters;

determining by a computer when there is a match between at least two of said parameters of said second record of said first financial transaction received at said database and the same parameters of said first record of said financial transaction stored in said database, and wherein any party to said payment clearing process is capable of verifying said parameters at each point along said financial transaction payment clearing process;

sending a notification to said payee bank participant with authorization to process said electronic financial transaction when said parameters match; and sending a notification to said payee bank participant to not process said electronic financial transaction when said parameters do not match.

2. The computer implemented method of claim 1 for detecting fraud in financial transactions, wherein said parameters include at least two of the following: check number, amount, account number, routing number, issue date, and payee.

3. The computer implemented method of claim 1 for detecting fraud in financial transactions, wherein said first financial transaction may be at least one of check payment, credit card payment, debit card payment, and electronic payment.

4. The computer implemented method of claim 1 for detecting fraud in financial transactions, wherein said database receives said first record of said first financial transaction from one of the following: a point of sale (POS), a point of presentment (POP), a point of encashment (POE), a point of data (POD), an automated teller machine, an online account, an internet point of sale, and a mobile device.

5. The computer implemented method of claim 1 for detecting fraud in financial transactions, wherein said computer performs at least two of the following steps: archiving check register information in a record, storing check register information in a record, matching data in a record, verifying data in a record, and authenticating data in a record.

6. The computer implemented method of claim 1 for detecting fraud in financial transactions, wherein said computer performs the step of compiling a behavior matrix for a payer based upon the financial transaction records of said payer stored in said database.

7. The computer implemented method of claim 1 for detecting fraud in financial transactions, wherein said computer performs the step of authenticating said record of said first financial transaction received from a participant in said payment clearing process with information in said first record and communicating to said participant results of said authenticating.

8. A computer implemented method for detecting fraud in a check clearing process, said method comprising:

providing a computer having a database accessible by each participant to said check clearing process;

receiving at said computer a first record of a check from a payer including check register information;

storing in said database said first record of said check received by said payer, said first record comprising at least two of the following parameters: a check number, a date issued, a payee, a routing number, an account number, and an amount;

providing a network interface to said database accessed by one or more participants in said check clearing process selected from the group comprising: a payee of said check, a payee bank, a payer bank, banking institutions intermediate said payee bank and said payer bank, a clearing bank, a Federal Reserve Bank, and a third party processor;

enabling said one or more participants in said check clearing process to communicate separately with said database via said network interface as said check moves along said check clearing process;

receiving from said at least one or more participants in said check clearing process a second record of said check, said second record comprising at least two of the following parameters: a check number, a date issued, a payee, a routing number, an account number, and an amount, and wherein any participant in said check clearing process is capable of verifying said parameters at each point along said check clearing process;

determining by said computer correspondence between said parameters of said first record and said parameters of said second record of said check;

providing an electronic notification to said participant, wherein said notification includes results of said correspondence determination;

wherein said notification informs said participant to process said financial transaction when said first and second records correspond; and wherein said notification informs said participant to not process said financial transaction when said first and second records do not correspond.

9. The computer implemented method of claim 8 for detecting fraud in a check clearing process, wherein said check may be at least one of written check payment, electronic check payment, imaged check payment, check card payment, and debit card payment.

10. The computer implemented method of claim 8 for detecting fraud in a check clearing process, wherein said database receives said first record of said check from one of the following: a point of sale (POS), a point of presentment (POP), a point of encashment (POE), a point of data (POD), an automated teller machine, an online account, an internet point of sale, and a mobile device.

11. The computer implemented method of claim 8 for detecting fraud in a check clearing process, wherein said computer automatically polls for check register information for receiving and storing on said database.

12. The computer implemented method of claim 8 for detecting fraud in a check clearing process, wherein said computer performs at least two of the following steps: archiving check register information in a record, storing check register information in a record, matching data in a record, verifying data in a record, and authenticating data in a record.

13. The computer implemented method of claim 8 for detecting fraud in a check clearing process, wherein said computer performs the step of compiling a behavior matrix for a payer based upon checking account records of said payer stored in said database.

14. The computer implemented method of claim 8 for detecting fraud in a check clearing process, wherein said computer performs the step of authenticating said record of said check received from a participant in said check clearing process with information in said first record and communicating to said participant results of said authenticating.

15. A computer implemented method for detecting errors in processing financial transactions, said method comprising:

providing at least one computer having a processor, an area of main memory, and a storage device having a database, wherein said database is accessible by each participant involved in said processing of financial transactions;

storing in said database records of financial transactions relating to payments, comprising at least a first record of a first financial transaction received from at least one participant to said processing of said financial transaction selected from the following group: a payer, a point of sale terminal, an online account, and a portable electronic device, each financial transaction record including more than one parameter;

receiving at said computer a second record of said first financial transaction from a bank of first deposit as said first financial transaction moves through said error detection process, said second record including at least some of said more than one parameters that are in said first record of said first financial transaction;

determining by said computer whether there is a match between at least one of said parameters of said second record of said first financial transaction received at said computer and one of the same parameters in said first record of said first financial transaction stored in said database, and wherein any participant in said processing of said financial transaction is capable of verifying said parameters at each point along said error detection process;

providing a notification to said bank of first deposit with results from said matching of said parameters of said second record with said parameters of said first record; and providing a notification to said payer with results from said matching.

16. The computer implemented method of claim 15 for detecting errors in processing financial transactions, wherein said first financial transaction may be at least one of a check payment, a credit card payment, a debit card payment, a funds transfer payment and an electronic payment.

17. The computer implemented method of claim 15 for detecting errors in processing financial transactions, wherein said database receives said first record of said first financial transaction from one of the following: a point of sale (POS), a point of presentment (POP), a point of encashment (POE), a point of data (POD), an automated teller machine, an online account, an internet point of sale, and a mobile device.

18. The computer implemented method of claim 15 for detecting errors in processing financial transactions, wherein said computer automatically polls check register information for receiving at said computer and storing on said database.

19. The computer implemented method of claim 15 for detecting errors in processing financial transactions, wherein said computer performs at least two of the following steps: archiving check register information in a record, storing check register information in a record, matching data in a record, verifying data in a record, and authenticating data in a record.

20. The computer implemented method of claim 15 for detecting errors in processing financial transactions, wherein said computer compiles a behavior matrix for a payer based upon financial transaction records of the payer stored in said database.

* * * * *